(12) United States Patent
Yasugi et al.

(10) Patent No.: US 10,904,547 B2
(45) Date of Patent: Jan. 26, 2021

(54) IMAGE DECODING DEVICE, IMAGE ENCODING DEVICE, AND IMAGE DECODING METHOD

(71) Applicant: SHARP KABUSHIKI KAISHA, Osaka (JP)

(72) Inventors: Yukinobu Yasugi, Osaka (JP); Tomohiro Ikai, Osaka (JP); Tomoyuki Yamamoto, Osaka (JP)

(73) Assignee: SHARP KABUSHIKIKAISHA, Osaka (JP)

( * ) Notice: Subject to any disclaimer, the term of this patent is extended or adjusted under 35 U.S.C. 154(b) by 0 days.

(21) Appl. No.: 16/375,959

(22) Filed: Apr. 5, 2019

(65) Prior Publication Data

US 2019/0238874 A1 Aug. 1, 2019

Related U.S. Application Data

(60) Continuation of application No. 15/044,836, filed on Feb. 16, 2016, now Pat. No. 10,306,251, which is a
(Continued)

(30) Foreign Application Priority Data

May 13, 2010 (JP) .................................. 2010-111475
Mar. 9, 2011 (JP) .................................. 2011-052178

(51) Int. Cl.
  *H04N 19/44* (2014.01)
  *H04N 19/90* (2014.01)
  (Continued)

(52) U.S. Cl.
  CPC ........... *H04N 19/44* (2014.11); *H04N 19/124* (2014.11); *H04N 19/167* (2014.11);
  (Continued)

(58) Field of Classification Search
  CPC ........ H04N 19/44; H04N 19/90; H04N 19/65; H04N 19/167; H04N 19/91; H04N 19/176;
  (Continued)

(56) References Cited

U.S. PATENT DOCUMENTS 5,227,878 A 7/1993 Puri et al.
6,037,985 A 3/2000 Wong
(Continued)

FOREIGN PATENT DOCUMENTS

| EP | 0720375 A2 | 12/1995 |
|---|---|---|
| JP | 2010-11075 A | 1/2010 |
| JP | 2010-502102 A | 1/2010 |

OTHER PUBLICATIONS

H.264AVC Textbook, revised third edition, p. 160, Shinya Kakuno, et al. (with partial translation).
(Continued)

*Primary Examiner* — Zaihan Jiang
(74) *Attorney, Agent, or Firm* — Birch, Stewart, Kolasch & Birch, LLP

(57) ABSTRACT

A video encoding device (2) includes a side information determination section (21) and a side information encoding section (22). The side information determination section (21) sets a quantization parameter for each macroblock in such a manner that a difference between quantization parameters for each pair of macroblocks with successive encoding orders is equal to one of n difference values, and transforms the difference into one of n indices with respect to each pair. The side information encoding section (22) generates a binary sequence having a length corresponding to the size of the absolute value of the index. The total of absolute values of the n indices is smaller than the total of absolute values of the n difference values.

3 Claims, 34 Drawing Sheets

Related U.S. Application Data division of application No. 13/697,247, filed as application No. PCT/JP2011/060444 on Apr. 28, 2011, now abandoned.

(51) Int. Cl.
| | | |
|---|---|---|
| *H04N 19/65* | (2014.01) | |
| *H04N 19/167* | (2014.01) | |
| *H04N 19/196* | (2014.01) | |
| *H04N 19/176* | (2014.01) | |
| *H04N 19/463* | (2014.01) | |
| *H04N 19/124* | (2014.01) | |
| *H04N 19/70* | (2014.01) | |
| *H04N 19/91* | (2014.01) | |

(52) U.S. Cl.
CPC ......... *H04N 19/176* (2014.11); *H04N 19/198* (2014.11); *H04N 19/463* (2014.11); *H04N 19/65* (2014.11); *H04N 19/70* (2014.11); *H04N 19/90* (2014.11); *H04N 19/91* (2014.11)

(58) Field of Classification Search
CPC .... H04N 19/124; H04N 19/463; H04N 19/70; H04N 19/198
USPC ...................................................... 375/240.03
See application file for complete search history.

(56) References Cited

U.S. PATENT DOCUMENTS

| | | | |
|---|---|---|---|
| 6,088,392 A | 7/2000 | Rosenberg | |
| 6,181,822 B1 | 1/2001 | Miller et al. | |
| 7,539,248 B2* | 5/2009 | Kwon | H04N 19/159 375/240.24 |
| 7,801,214 B2 | 9/2010 | Ichihashi et al. | |
| 7,894,523 B2 | 2/2011 | Jeon et al. | |
| 7,970,053 B2 | 6/2011 | Song et al. | |
| 8,045,614 B2 | 10/2011 | Gish et al. | |
| 8,175,149 B2 | 5/2012 | Jun et al. | |
| 8,199,821 B2 | 6/2012 | Jeon et al. | |
| 8,675,726 B2 | 3/2014 | Zan et al. | |
| 2004/0151385 A1* | 8/2004 | Oneda | H04N 19/132 382/232 |
| 2005/0180502 A1 | 8/2005 | Puri | |
| 2005/0190836 A1* | 9/2005 | Lu | H04N 19/136 375/240.03 |
| 2005/0249287 A1 | 11/2005 | Kondo et al. | |
| 2007/0009026 A1 | 1/2007 | Kwon et al. | |
| 2007/0076967 A1* | 4/2007 | Kim | H04N 19/126 382/239 |
| 2007/0104272 A1 | 5/2007 | He et al. | |
| 2008/0226183 A1* | 9/2008 | Lei | H04N 19/159 382/233 |
| 2009/0123066 A1* | 5/2009 | Moriya | H04N 19/186 382/166 |
| 2009/0196517 A1 | 8/2009 | Divorra Escoda et al. | |
| 2009/0296808 A1* | 12/2009 | Regunathan | H04N 19/124 375/240.03 |
| 2010/0086028 A1 | 4/2010 | Tanizawa et al. | |
| 2010/0086032 A1* | 4/2010 | Chen | H04N 19/103 375/240.12 |
| 2010/0098173 A1 | 4/2010 | Horiuchi et al. | |
| 2011/0102601 A1 | 5/2011 | Davis | |
| 2011/0116543 A1 | 5/2011 | Malvar | |
| 2011/0150077 A1 | 6/2011 | Kishore et al. | |
| 2011/0235699 A1* | 9/2011 | Huang | H04N 19/61 375/240.02 |
| 2011/0274162 A1* | 11/2011 | Zhou | H04N 19/13 375/240.03 |
| 2012/0114034 A1* | 5/2012 | Huang | H04N 19/70 375/240.03 |
| 2012/0300850 A1* | 11/2012 | Yie | H04N 19/513 375/240.16 |
| 2012/0308017 A1 | 12/2012 | Lang et al. | |
| 2012/0314764 A1 | 12/2012 | Tidemann et al. | |
| 2013/0071039 A1* | 3/2013 | Sato | H04N 19/124 382/251 |
| 2013/0156099 A1* | 6/2013 | Sasai | H04N 19/12 375/240.03 |
| 2013/0315311 A1 | 11/2013 | Song et al. | |
| 2014/0341277 A1 | 11/2014 | Jeon et al. | |

OTHER PUBLICATIONS

ITU-T Recommendation H. 264 (Mar. 2009).
Working draft 1 of High-Efficiency Video Coding, Joint Collaborative Team on Video Coding (JCT-VC) of ITU-T SG16 WP3 and ISO/IEC JTC1/SC29/WG11 JCTVC-C403 (137 pp) Oct. 2010.
Advisory Action for U.S. Appl. No. 15/044,836 dated Apr. 4, 2018.
Notice of Allowance for U.S. Appl. No. 15/044,836 dated Jan. 14, 2019.
Office Action for U.S. Appl. No. 13/697,247 dated May 22, 2015.
Office Action for U.S. Appl. No. 15/044,836 dated Dec. 15, 2017.
Office Action for U.S. Appl. No. 15/044,836 dated Jun. 16, 2017.
Office Action for U.S. Appl. No. 15/044,836 dated Sep. 13, 2018.

* cited by examiner

| mb_qp_delta_index | -6 | -5 | -4 | -3 | -2 | -1 | 0 | 1 | 2 | 3 | 4 | 5 | 6 |
|---|---|---|---|---|---|---|---|---|---|---|---|---|---|
| mb_qp_delta | -8 | -7 | -6 | -3 | -2 | -1 | 0 | 1 | 2 | 4 | 7 | 9 | 12 |

(b)

| mb_qp_delta_index | -4 | -3 | -2 | -1 | 0 | 1 | 2 | 3 | 4 |
|---|---|---|---|---|---|---|---|---|---|
| mb_qp_delta | -8 | -6 | -4 | -2 | 0 | 2 | 4 | 6 | 8 |

(c)

| mb_qp_delta_index | -4 | -3 | -2 | -1 | 0 | 1 | 2 | 3 | 4 |
|---|---|---|---|---|---|---|---|---|---|
| mb_qp_delta | -8 | -4 | -2 | -1 | 0 | 1 | 2 | 4 | 8 |

(d)

| mb_qp_delta_index | -4 | -3 | -2 | -1 | 0 | 1 | 2 | 3 | 4 |
|---|---|---|---|---|---|---|---|---|---|
| mb_qp_delta | -9 | -2 | -1 | -6 | 0 | 4 | 1 | 3 | 8 |

Order of frequency (e)

| mb_qp_delta_index | -1 | 0 | 1 |
|---|---|---|---|
| mb_qp_delta | -2 | 0 | 2 |

| Index (mb_qp_delta_index) | Code number (codenum) | Output binary sequence |
|---|---|---|
| 0 | 0 | 0 |
| 1 | 1 | 10 |
| −1 | 2 | 110 |
| 2 | 3 | 1110 |
| −2 | 4 | 11110 |
| 3 | 5 | 111110 |
| −3 | 6 | 1111110 |
| ⋮ | ⋮ | ⋮ |

(b)

| Index (mb_qp_delta_index) | Output binary sequence |
|---|---|
| 0 | 00 |
| 1 | 01 |
| 2 | 10 |
| 3 | 11 |

| mb_qp_delta[-4..4] | -8 | -6 | -4 | -2 | 0 | 2 | 4 | 6 | 8 |
|---|---|---|---|---|---|---|---|---|---|
| Code number (codeNum) | 16 | 12 | 8 | 4 | 0 | 3 | 7 | 11 | 15 |
| Amount of codes in unary bin. (bit) | 17 | 13 | 9 | 5 | 1 | 4 | 8 | 12 | 16 |

(b)

| | mb_qp_delta[0] | dd(1,0) | dd(2,1) | dd(3,2) | dd(4,3) | dd(0,-1) | dd(-1,-2) | dd(-2,-3) | dd(-3,-4) |
|---|---|---|---|---|---|---|---|---|---|
| Code number (codeNum) | 0 | 3 | 3 | 3 | 3 | 3 | 3 | 3 | 3 |
| Amount of codes in unary bin. (bit) | 1 | 4 | 4 | 4 | 4 | 4 | 4 | 4 | 4 |

FIG. 11

| QP difference value (mb_qp_delta) | Code number (codenum) | Output binary sequence |
|---|---|---|
| 0 | 0 | 0 |
| 1 | 1 | 10 |
| -1 | 2 | 110 |
| 2 | 3 | 1110 |
| -2 | 4 | 11110 |
| 3 | 5 | 111110 |
| -3 | 6 | 1111110 |
| ⋮ | ⋮ | ⋮ |

FIG. 16

| pic_parameter_set_rbsp( ) { | Descriptor |
|---|---|
| pic_parameter_set_id | ue(v) |
| seq_parameter_set_id | ue(v) |
| entropy_coding_mode_flag | u(1) |
| num_ref_idx_l0_default_active_minus1 | ue(v) |
| num_ref_idx_l1_default_active_minus1 | ue(v) |
| pic_init_qp_minus26 /* relative to 26 */ | se(v) |
| constrained_intra_pred_flag | u(1) |
| Log2_min_delta_qualt_coding_unit_size_minus4 | ue(2) |
| for (i=0;i<15;i++)} | |
| numAllowedFilters[i] | ue(v) |
| for(j=0;j<15;j++) | |
| filtIdx[i][j] | ue(v) |
| } | |
| } | |
| rbsp_trailing_bits( ) | |
| } | |

FIG. 17

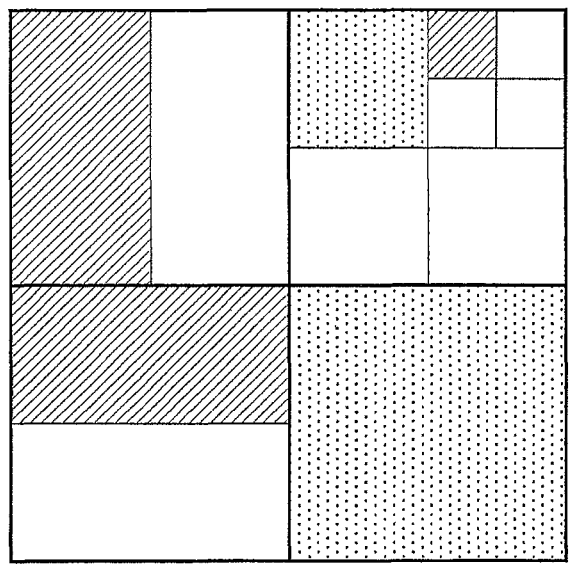

| | Descriptor |
|---|---|
| coding_unit( x0, y0, log2CUSize ) { | |
| if((x0%MinDeltaQuantCodingUnitSize)==0 && | |
| (y0%MinDeltaQuantCodingUnitSize)==0)) | |
| deltaQuantAvail=true | |
| if( slice_type != I ) | |
| skip_flag[ x0 ][ y0 ] | u(1) | ae(v) |
| if( skip_flag[ x0 ][ y0 ] ) | |
| prediction_unit( x0, y0, log2CUSize, log2CUSize ) | |
| else { | |
| if( deltaQuantAvail ){ | |
| cu_qp_delta | |
| deltaQuantAvail=false | |
| } | |
| if( NumMergeCandidates > 0 ) | |
| merge_flag[ x0 ][ y0 ] | u(1) | ae(v) |
| if( merge_flag[ x0 ][ y0 ] ) { | |
| PredMode = MODE_MERGE | |
| prediction_unit( x0, y0, log2CUSize, log2CUSize ) | |
| transform_tree( x0, y0, log2CUSize, 0, 0 ) | |
| } else { | |
| if( slice_type != I ) | |
| pred_mode | u(1) | ae(v) |
| x1 = x0 + ( ( 1 << log2CUSize ) >> 1 ) | |
| y1 = y0 + ( ( 1 << log2CUSize ) >> 1 ) | |
| if( PredMode == MODE_INTRA ) { | |

(b)

| | Descriptor |
|---|---|
| if( entropy_coding_mode_flag ) | |
| intra_split_flag | u(1) | ae(v) |
| if( !intra_split_flag ) { | |
| prediction_unit( x0, y0, log2CUSize, log2CUSize ) | |
| transform_tree( x0, y0, log2CUSize, 0, 0 ) | |
| } else { | |
| prediction_unit( x0, y0, log2CUSize − 1, log2CUSize − 1 ) | |
| prediction_unit( x1, y0, log2CUSize − 1, log2CUSize − 1 ) | |
| prediction_unit( x0, y1, log2CUSize − 1, log2CUSize − 1 ) | |
| prediction_unit( x1, y1, log2CUSize − 1, log2CUSize − 1 ) | |
| transform_tree( x0, y0, log2CUSize, 0, 0 ) | |
| } | |
| } else if( PredMode == MODE_INTER ) { | |
| inter_partitioning_idc | ue(v) | ae(v) |
| if( PartMode == PART_2Nx2N ) { | |
| prediction_unit( x0, y0, log2CUSize, log2CUSize ) | |
| transform_tree( x0, y0, log2CUSize, 0, 0 ) | |
| } else if( PartMode == PART_2NxN ) { | |
| prediction_unit( x0, y0, log2CUSize, log2CUSize − 1 ) | |
| prediction_unit( x0, y1, log2CUSize, log2CUSize − 1 ) | |
| transform_tree( x0, y0, log2CUSize, 0, 0 ) | |
| } else if( PartMode == PART_Nx2N ) { | |
| prediction_unit( x0, y0, log2CUSize − 1, log2CUSize ) | |
| prediction_unit( x1, y0, log2CUSize − 1, log2CUSize ) | |
| transform_tree( x0, y0, log2CUSize, 0, 0 ) | |
| } else { /* PART_NxN */ | |
| prediction_unit( x0, y0, log2CUSize − 1, log2CUSize − 1 ) | |
| prediction_unit( x1, y0, log2CUSize − 1, log2CUSize − 1 ) | |
| prediction_unit( x0, y1, log2CUSize − 1, log2CUSize − 1 ) | |
| prediction_unit( x1, y1, log2CUSize − 1, log2CUSize − 1 ) | |
| transform_tree( x0, y0, log2CUSize, 0, 0 ) | |
| } | |
| } else { /* MODE_DIRECT */ | |
| prediction_unit( x0, y0, log2CUSize, log2CUSize ) | |
| transform_tree( x0, y0, log2CUSize, 0, 0 ) | |
| } | |

| coding_unit( x0, y0, log2CUSize ) { | Descriptor |
|---|---|
| if((x0%MinDeltaQuantCodingUnitSize)==0 && | |
| (y0%MinDeltaQuantCodingUnitSize)==0)) | |
| deltaQuantAvail=true | |
| if( slice_type != I ) | |
|   skip_flag[ x0 ][ y0 ] | u(1) \| ae(v) |
| if( skip_flag[ x0 ][ y0 ] ) | |
|   prediction_unit( x0, y0, log2CUSize, log2CUSize ) | |
| else { | |
|   if( NumMergeCandidates > 0 ) | |
|     merge_flag[ x0 ][ y0 ] | u(1) \| ae(v) |
|   if( merge_flag[ x0 ][ y0 ] ) { | |
|     PredMode = MODE_MERGE | |
|     prediction_unit( x0, y0, log2CUSize, log2CUSize ) | |
|     transform_tree( x0, y0, log2CUSize, 0, 0 ) | |
|   } else { | |
|     if( deltaQuantAvail ){ | |
|       cu_qp_delta | |
|       deltaQuantAvail=false | |
|     } | |
|     if( slice_type != I ) | |
|       pred_mode | u(1) \| ae(v) |
|     x1 = x0 + ( ( 1 << log2CUSize ) >> 1 ) | |
|     y1 = y0 + ( ( 1 << log2CUSize ) >> 1 ) | |
|     if( PredMode == MODE_INTRA ) { | |

(b)

| | |
|---|---|
|       if( entropy_coding_mode_flag ) | |
|         intra_split_flag | u(1) \| ae(v) |
|       if( !intra_split_flag ) { | |
|         prediction_unit( x0, y0, log2CUSize, log2CUSize ) | |
|         transform_tree( x0, y0, log2CUSize, 0, 0 ) | |
|       } else { | |
|         prediction_unit( x0, y0, log2CUSize – 1, log2CUSize – 1 ) | |
|         prediction_unit( x1, y0, log2CUSize – 1, log2CUSize – 1 ) | |
|         prediction_unit( x0, y1, log2CUSize – 1, log2CUSize – 1 ) | |
|         prediction_unit( x1, y1, log2CUSize – 1, log2CUSize – 1 ) | |
|         transform_tree( x0, y0, log2CUSize, 0, 0 ) | |
|       } | |
|     } else if( PredMode == MODE_INTER ) { | |
|       inter_partitioning_idc | ue(v) \| ae(v) |
|       if( PartMode == PART_2Nx2N ) { | |
|         prediction_unit( x0, y0, log2CUSize, log2CUSize ) | |
|         transform_tree( x0, y0, log2CUSize, 0, 0 ) | |
|       } else if( PartMode == PART_2NxN ) { | |
|         prediction_unit( x0, y0, log2CUSize – 1, log2CUSize ) | |
|         prediction_unit( x0, y1, log2CUSize – 1, log2CUSize ) | |
|         transform_tree( x0, y0, log2CUSize, 0, 0 ) | |
|       } else if( PartMode == PART_Nx2N ) { | |
|         prediction_unit( x0, y0, log2CUSize, log2CUSize – 1 ) | |
|         prediction_unit( x1, y0, log2CUSize, log2CUSize – 1 ) | |
|         transform_tree( x0, y0, log2CUSize, 0, 0 ) | |
|       } else { /* PART_NxN */ | |
|         prediction_unit( x0, y0, log2CUSize – 1, log2CUSize – 1 ) | |
|         prediction_unit( x1, y0, log2CUSize – 1, log2CUSize – 1 ) | |
|         prediction_unit( x0, y1, log2CUSize – 1, log2CUSize – 1 ) | |
|         prediction_unit( x1, y1, log2CUSize – 1, log2CUSize – 1 ) | |
|         transform_tree( x0, y0, log2CUSize, 0, 0 ) | |
|       } | |
|     } else { /* MODE_DIRECT */ | |
|       prediction_unit( x0, y0, log2CUSize, log2CUSize ) | |
|       transform_tree( x0, y0, log2CUSize, 0, 0 ) | |
|     } | |

| | Descriptor |
|---|---|
| coding_unit( x0, y0, log2CUSize ) { | |
| if((x0%MinDeltaQuantCodingUnitSize)==0 && | |
| (y0%MinDeltaQuantCodingUnitSize)==0)) | |
| deltaQuantAvail=true | |
| if( slice_type != I ) | |
|   skip_flag[ x0 ][ y0 ] | u(1) \| ae(v) |
| if( skip_flag[ x0 ][ y0 ] ) | |
|   prediction_unit( x0, y0, log2CUSize, log2CUSize ) | |
| if( NumMergeCandidates > 0 ) | |
|   merge_flag[ x0 ][ y0 ] | u(1) \| ae(v) |
| if( merge_flag[ x0 ][ y0 ] ) { | |
|   PredMode = MODE_MERGE | |
|   prediction_unit( x0, y0, log2CUSize, log2CUSize ) | |
|   transform_tree( x0, y0, log2CUSize, 0, 0 ) | |
| } else { | |
|   if( slice_type != I ) | |
|     pred_mode | |
|   x1 = x0 + ( ( 1 << log2CUSize ) >> 1 ) | |
|   y1 = y0 + ( ( 1 << log2CUSize ) >> 1 ) | |
|   if( PredMode == MODE_INTRA ) { | |

(b)

| | |
|---|---|
| if( entropy_coding_mode_flag ) | |
|   intra_split_flag | u(1) \| ae(v) |
| if( !intra_split_flag ) { | |
|   prediction_unit( x0, y0, log2CUSize, log2CUSize ) | |
|   transform_tree( x0, y0, log2CUSize, 0, 0 ) | |
| } else { | |
|   prediction_unit( x0, y0, log2CUSize − 1, log2CUSize − 1 ) | |
|   prediction_unit( x1, y0, log2CUSize − 1, log2CUSize − 1 ) | |
|   prediction_unit( x0, y1, log2CUSize − 1, log2CUSize − 1 ) | |
|   prediction_unit( x1, y1, log2CUSize − 1, log2CUSize − 1 ) | |
|   transform_tree( x0, y0, log2CUSize, 0, 0 ) | |
| } | |
| } else if( PredMode == MODE_INTER ) { | |
|   inter_partitioning_idc | ue(v) \| ae(v) |
|   if( PartMode == PART_2Nx2N ) { | |
|     prediction_unit( x0, y0, log2CUSize, log2CUSize ) | |
|     transform_tree( x0, y0, log2CUSize, 0, 0 ) | |
|   } else if( PartMode == PART_2NxN ) { | |
|     prediction_unit( x0, y0, log2CUSize, log2CUSize − 1 ) | |
|     prediction_unit( x0, y1, log2CUSize, log2CUSize − 1 ) | |
|     transform_tree( x0, y0, log2CUSize, 0, 0 ) | |
|   } else if( PartMode == PART_Nx2N ) { | |
|     prediction_unit( x0, y0, log2CUSize − 1, log2CUSize ) | |
|     prediction_unit( x1, y0, log2CUSize − 1, log2CUSize ) | |
|     transform_tree( x0, y0, log2CUSize, 0, 0 ) | |
|   } else { /* PART_NxN */ | |
|     prediction_unit( x0, y0, log2CUSize − 1, log2CUSize − 1 ) | |
|     prediction_unit( x1, y0, log2CUSize − 1, log2CUSize − 1 ) | |
|     prediction_unit( x0, y1, log2CUSize − 1, log2CUSize − 1 ) | |
|     prediction_unit( x1, y1, log2CUSize − 1, log2CUSize − 1 ) | |
|     transform_tree( x0, y0, log2CUSize, 0, 0 ) | |
|   } | |
| } else { /* MODE_DIRECT */ | |
|   prediction_unit( x0, y0, log2CUSize, log2CUSize ) | |
|   transform_tree( x0, y0, log2CUSize, 0, 0 ) | |
| } | |

FIG. 21

| transform_tree( x0, y0, log2TrafoSize, trafoDepth, blkIdx ) { | Descriptor |
|---|---|
|   if (trafoDepth == 0){ | |
|     if( !entropy_coding_mode_flag ) { | |
|       cbp_yuv_root | vlc(n,v) |
|       cbf_luma[ x0 ][ y0 ] [trafoDepth ] = cbp_yuv_root & 1 | |
|       cbf_cb[x0][y0] [trafoDepth ] = (cbp_yuv_root >> 1) & 1 | |
|       cbf_cr[x0][y0] [trafoDepth ] = (cbp_yuv_root >> 2) & 1 | |
|       residualDataPresentFlag = (cbp_yuv_root != 0) | |
|     } | |
|     else { | |
|       no_residual_data_flag | u(1) \| ae(v) |
|       residualDataPresentFlag = !no_residual_data_flagb | |
|     } | |
|   } | |
|   else { | |
|     if(residualDataPresentFlag) { | |
|       if(deltaQuantAvail) { | |
|         cu_qp_delta | |
|         deltaQuantAvail=false | |
|       } | |
|       if( log2TrafoSize <= Log2MaxTrafoSize &&<br>        log2TrafoSize > Log2MinTrafoSize &&<br>        trafoDepth < maxDepth) | |
|       split_transform_flag[ x0 ][ y0 ][ trafoDepth ] | u(1) \| ae(v) |
|       if( split_transform_flag[ x0 ][ y0 ][ trafoDepth ] ) { | |
|         x1 = x0 + ( ( 1 << log2TrafoSize ) >> 1 ) | |
|         y1 = y0 + ( ( 1 << log2TrafoSize ) >> 1 ) | |
|         if ( !entropy_coding_mode_flag ) {<br>          cbp_luma[ trafoDepth+1 ] | vlc(n,v) |
|         cbp_cb[ trafoDepth+1 ] | vlc(n,v) |
|         cbp_cr[ trafoDepth+1 ] | vlc(n,v) |
|         } | |
|         transform_tree( x0, y0, log2TrafoSize – 1, trafoDepth + 1, 0 ) | |
|         transform_tree( x1, y0, log2TrafoSize – 1, trafoDepth + 1, 1 ) | |
|         transform_tree( x0, y1, log2TrafoSize – 1, trafoDepth + 1, 2 ) | |
|         transform_tree( x1, y1, log2TrafoSize – 1, trafoDepth + 1, 3 ) | |
|       } | |
|       else if( entropy_coding_mode_flag ){ | |
|         coded_block_flag_luma[ x0 ][ y0 ][ trafoDepth ] | u(1) \| ae(v) |
|         coded_block_flag_cb[ x0 ][ y0 ][ trafoDepth ] | u(1) \| ae(v) |
|         coded_block_flag_cr[ x0 ][ y0 ][ trafoDepth ] | u(1) \| ae(v) |
|       } | |
|     } | |
|   } | |
| } | |

FIG. 23

| transform_tree( x0, y0, log2TrafoSize, trafoDepth, blkIdx ) { | Descriptor |
|---|---|
| if((x0%MinDeltaQuantUnitSize)==0 &&(y0%MinDeltaQuantUnitSize)==0)) | |
| deltaQuantAvail=true | vlc(n,v) |
| coded_block_flag_luma[ x0 ][ y0 ][ trafoDepth ] | |
| coded_block_flag_cb[ x0 ][ y0 ][ trafoDepth ] | |
| coded_block_flag_cr[ x0 ][ y0 ][ trafoDepth ] | |
| residualDataPresentFlag = <br> coded_block_flag_luma[ x0 ][ y0 ][ trafoDepth ]!=0 \|\| <br> coded_block_flag_cb[ x0 ][ y0 ][ trafoDepth ]!= 0 \|\| <br> coded_block_flag_cr[ x0 ][ y0 ][ trafoDepth ] !=0 | |
| if ( residualDataPresentFlag) { | |
| if (dataQuantAvail){ | |
| cu_qp_delta | |
| deltaQuantAvail = false | |
| } | |
| if( log2TrafoSize <= Log2MaxTrafoSize && <br> log2TrafoSize > Log2MinTrafoSize && <br> trafoDepth < maxDepth) | |
| split_transform_flag[ x0 ][ y0 ][ trafoDepth ] | u(1) \| ae(v) |
| if( split_transform_flag[ x0 ][ y0 ][ trafoDepth ] ) { | |
| x1 = x0 + ( ( 1 << log2TrafoSize ) >> 1 ) | |
| y1 = y0 + ( ( 1 << log2TrafoSize ) >> 1 ) | |
| transform_tree( x0, y0, log2TrafoSize – 1, trafoDepth + 1, 0 ) | |
| transform_tree( x1, y0, log2TrafoSize – 1, trafoDepth + 1, 1 ) | |
| transform_tree( x0, y1, log2TrafoSize – 1, trafoDepth + 1, 2 ) | |
| transform_tree( x1, y1, log2TrafoSize – 1, trafoDepth + 1, 3 ) | |
| } | |
| } | |
| } | |

FIG. 24

| transform_tree( x0, y0, log2TrafoSize, trafoDepth, blkIdx ,deltaQuantAvail) { | Descriptor |
|---|---|
| coded_block_flag_luma[ x0 ][ y0 ][ trafoDepth ] | u(1) \| ae(v) |
| coded_block_flag_cb[ x0 ][ y0 ][ trafoDepth ] | u(1) \| ae(v) |
| coded_block_flag_cr[ x0 ][ y0 ][ trafoDepth ] | u(1) \| ae(v) |
| residualDataPresentFlag = <br> coded_block_flag_luma[ x0 ][ y0 ][ trafoDepth ]!=0 \|\| <br> coded_block_flag_cb[ x0 ][ y0 ][ trafoDepth ]!= 0 \|\| <br> coded_block_flag_cr[ x0 ][ y0 ][ trafoDepth ] !=0 | |
| if ( residualDataPresentFlag ) { | |
| If (deltaQuantAvail && trafoDepth==0) { | |
| cu_qp_delta | |
| } | |
| if( log2TrafoSize <= Log2MaxTrafoSize && <br> log2TrafoSize > Log2MinTrafoSize && <br> trafoDepth < maxDepth) | |
| split_transform_flag[ x0 ][ y0 ][ trafoDepth ] | u(1) \| ae(v) |
| if( split_transform_flag[ x0 ][ y0 ][ trafoDepth ] ) { | |
| x1 = x0 + ( ( 1 << log2TrafoSize ) >> 1 ) | |
| y1 = y0 + ( ( 1 << log2TrafoSize ) >> 1 ) | |
| transform_tree( x0, y0, log2TrafoSize – 1, trafoDepth + 1, 0 ) | |
| transform_tree( x1, y0, log2TrafoSize – 1, trafoDepth + 1, 1 ) | |
| transform_tree( x0, y1, log2TrafoSize – 1, trafoDepth + 1, 2 ) | |
| transform_tree( x1, y1, log2TrafoSize – 1, trafoDepth + 1, 3 ) | |
| } | |
| } | |
| } | |

| | Descriptor |
|---|---|
| coding_unit( x0, y0, log2CUSize ) { | |
|   if((x0%MinIntraDeltaQuantCodingUnitSize==0&& | |
|   (y0%MinDeltaQuantCodingUnitSize==0)) | |
|   deltaQuantAvail=true | |
|   if( slice_type != I ) | |
|     skip_flag[ x0 ][ y0 ] | u(1) \| ae(v) |
|   if( skip_flag[ x0 ][ y0 ] ) | |
|     prediction_unit( x0, y0, log2CUSize, log2CUSize ) | |
|   else { | |
|     deltaQuantAvailIntra=true | |
|     if (dataQuantAvail){ | |
|       cu_qp_delta | se(v) |
|       deltaQuantAvail = false | |
|       deltaQuantAvailIntra = false | |
|     } | |
|     if( NumMergeCandidates > 0 ) | |
|       merge_flag[ x0 ][ y0 ] | u(1) \| ae(v) |
|     if( merge_flag[ x0 ][ y0 ] ) { | |
|       PredMode = MODE_MERGE | |
|       prediction_unit( x0, y0, log2CUSize, log2CUSize ) | |
|       transform_tree( x0, y0, log2CUSize, 0, 0 ) | |
|     } else { | |
|       if( slice_type != I ) | |
|         pred_mode | u(1) \| ae(v) |
|       x1 = x0 + ( ( 1 << log2CUSize ) >> 1 ) | |
|       y1 = y0 + ( ( 1 << log2CUSize ) >> 1 ) | |
|       if( PredMode == MODE_INTRA ) { | |
|         if((x0%MinIntraDeltaQuantCodingUnitSize)==0&&(y0%MinIntraDeltaQuantCodingUnitSize)==0 && (y0%MinIntraDelta | |
|         QuantCodingUnitSize)==0) && deltaQuantAvailIntra) | |
|           cu_qp_delta | se(v) |
|         if( entropy_coding_mode_flag) | |

(b)

| | Descriptor |
|---|---|
| if( !intra_split_flag ) { | |
|   prediction_unit( x0, y0, log2CUSize, log2CUSize ) | |
|   transform_tree( x0, y0, log2CUSize, 0, 0 ) | |
| } else { | |
|   prediction_unit( x0, y0, log2CUSize – 1, log2CUSize – 1 ) | |
|   prediction_unit( x1, y0, log2CUSize – 1, log2CUSize – 1 ) | |
|   prediction_unit( x0, y1, log2CUSize – 1, log2CUSize – 1 ) | |
|   prediction_unit( x1, y1, log2CUSize – 1, log2CUSize – 1 ) | |
|   transform_tree( x0, y0, log2CUSize, 0, 0 ) | |
| } | |
| } else if( PredMode == MODE_INTER ) { | |
|   inter_partitioning_idc | ue(v) \| ae(v) |
|   if(PartMode == PART_2Nx2N) { | |
|     prediction_unit( x0, y0, log2CUSize, log2CUSize) | |
|     transform_tree( x0, y0, log2CUSize, 0, 0 ) | |
|   } else if(PartMode == PART_Nx2N ) { | |
|     prediction_unit( x0, y0, log2CUSize – 1, log2CUSize ) | |
|     prediction_unit( x1, y0, log2CUSize – 1, log2CUSize ) | |
|     transform_tree( x0, y0, log2CUSize, 0, 0 ) | |
|   } else if(PartMode == PART_Nx2N ) { | |
|     prediction_unit( x0, y0, log2CUSize, log2CUSize – 1) | |
|     prediction_unit( x0, y1, log2CUSize, log2CUSize – 1) | |
|     transform_tree( x0, y0, log2CUSize, 0, 0 ) | |
|   } else { /* PART_NxN */ | |
|     prediction_unit( x0, y0, log2CUSize – 1, log2CUSize – 1 ) | |
|     prediction_unit( x1, y0, log2CUSize – 1, log2CUSize – 1 ) | |
|     prediction_unit( x0, y1, log2CUSize – 1, log2CUSize – 1 ) | |
|     prediction_unit( x1, y1, log2CUSize – 1, log2CUSize – 1 ) | |
|     transform_tree( x0, y0, log2CUSize, 0, 0 ) | |
|   } | |
| } else { /* MODE_DIRECT */ | |
|   prediction_unit( x0, y0, log2CUSize, log2CUSize ) | |
|   transform_tree( x0, y0, log2CUSize, 0, 0 ) | |
| } | |

| | Descriptor |
|---|---|
| coding_unit( x0, y0, log2CUSize ) { | |
| if((x0%MinDeltaQuantCodingUnitSize)==0&&(y0%MinDeltaQuantCodingUnitSize)==0)){ | |
| deltaQuantAvail=true | |
| if( slice_type != I ) | |
| skip_flag[ x0 ][ y0 ] | u(1) \| ae(v) |
| if( skip_flag[ x0 ][ y0 ] ) | |
| prediction_unit( x0, y0, log2CUSize, log2CUSize ) | |
| else { | |
| merge_flag[ x0 ][ y0 ] | u(1) \| ae(v) |
| if( merge_flag[ x0 ][ y0 ] ) { | |
| PredMode = MODE_MERGE | |
| prediction_unit( x0, y0, log2CUSize, log2CUSize ) | |
| if (dataQuantAvail){ | |
| cu_qp_delta | se(v) |
| deltaQuantAvail = false | |
| } | |
| prediction_unit( x0, y0, log2CUSize, log2CUSize ) | |
| transform_tree( x0, y0, log2CUSize, 0, 0 ) | |
| } else { | |
| if( slice_type != I ) | |
| pred_mode | u(1) \| ae(v) |
| x1 = x0 + ( ( 1 << log2CUSize ) >> 1 ) | |
| y1 = y0 + ( ( 1 << log2CUSize ) >> 1 ) | |
| if( PredMode == MODE_INTRA ) { | |
| if((x0%MinIntraDeltaQuantCodingUnitSize)==0&&(y0%MinIntraDeltaQuantCodingUnitSize)==0){ | |
| cu_qp_delta | se(v) |
| deltaQuantAvail=false} | |
| if( entropy_coding_mode_flag) | |
| intra_split_flag | u(1) \| ae(v) |
| if( !intra_split_flag ) { | |
| prediction_unit( x0, y0, log2CUSize, log2CUSize ) | |
| transform_tree( x0, y0, log2CUSize, 0, 0 ) | |
| } else { | |
| prediction_unit( x0, y0, log2CUSize – 1, log2CUSize ) | |
| prediction_unit( x1, y0, log2CUSize – 1, log2CUSize ) | |
| prediction_unit( x0, y1, log2CUSize – 1, log2CUSize ) | |
| prediction_unit( x1, y1, log2CUSize – 1, log2CUSize ) | |
| transform_tree( x0, y0, log2CUSize, 0, 0 ) | |
| } | |
| } else if( PredMode == MODE_INTER ){ | |
| if (dataQuantAvail){ | |
| cu_qp_delta | se(v) |
| deltaQuantAvail = false | |

(b)

| | Descriptor |
|---|---|
| inter_partitioning_idc | ue(v) \| ae(v) |
| if(PartMode == PART_2Nx2N ) { | |
| prediction_unit( x0, y0, log2CUSize, log2CUSize ) | |
| transform_tree( x0, y0, log2CUSize, 0, 0 ) | |
| } else if(PartMode == PART_2NxN ) { | |
| prediction_unit( x0, y0, log2CUSize, log2CUSize - 1, log2CUSize ) | |
| prediction_unit( x0, y1, log2CUSize, log2CUSize - 1, log2CUSize ) | |
| transform_tree( x0, y0, log2CUSize, 0, 0 ) | |
| } else if(PartMode == PART_Nx2N ) { | |
| prediction_unit( x0, y0, log2CUSize - 1, log2CUSize ) | |
| prediction_unit( x1, y0, log2CUSize - 1, log2CUSize ) | |
| transform_tree( x0, y0, log2CUSize, 0, 0 ) | |
| } else { /* PART_NxN */ | |
| prediction_unit( x0, y0, log2CUSize - 1, log2CUSize - 1, log2CUSize ) | |
| prediction_unit( x1, y0, log2CUSize - 1, log2CUSize - 1, log2CUSize ) | |
| prediction_unit( x0, y1, log2CUSize - 1, log2CUSize - 1, log2CUSize ) | |
| prediction_unit( x1, y1, log2CUSize - 1, log2CUSize - 1, log2CUSize ) | |
| transform_tree( x0, y0, log2CUSize, 0, 0 ) | |
| } | |
| } else { /* MODE_DIRECT */ | |
| if (dataQuantAvail){ | |
| cu_qp_delta | se(v) |
| deltaQuantAvail = false | |
| } | |
| prediction_unit( x0, y0, log2CUSize, log2CUSize ) | |
| transform_tree( x0, y0, log2CUSize, 0, 0 ) | |
| } | |

| | Descriptor |
|---|---|
| coding_unit( x0, y0, log2CUSize ) { | |
| if((x0%max_coding_unit_width)==0&&(y0% max_coding_unit_height)==0)) | |
| deltaQuantAvailLCU=true | |
| if((x0%MinDeltaQuantCodingUnitSize)==0&&(y0%MinDeltaQuantCo dingUnitSize)==0) && deltaQuantAvailCU) | |
| deltaQuantAvail=true | |
| if( slice_type != I ) | |
| skip_flag[ x0 ][ y0 ] | u(1) \| ae(v) |
| if( skip_flag[ x0 ][ y0 ]){ | |
| prediction_unit( x0, y0, log2CUSize, log2CUSize ) | |
| else { | |
| if (dataQuantAvailCU){ | |
| qp_delta | |
| deltaQuantAvailCU | |
| deltaQuantAvailLCU=false } | |
| if (dataQuantAvail){ | |
| qp_delta | |
| deltaQuantAvail = false | |
| } | |
| if( NumMergeCandidates > 0 ) | |
| merge_flag[ x0 ][ y0 ] | u(1) \| ae(v) |
| if( merge_flag[ x0 ][ y0 ] ) { | |
| PredMode = MODE_MERGE | |
| prediction_unit( x0, y0, log2CUSize, log2CUSize ) | |
| transform_tree( x0, y0, log2CUSize, 0, 0) | |
| } else { | |
| if( slice_type != I ) | |
| pred_mode | |
| x1 = x0 + ( ( 1 << log2CUSize ) >> 1 ) | |
| y1 = y0 + ( ( 1 << log2CUSize ) >> 1 ) | |
| if( PredMode == MODE_INTRA ) { | |
| if( entropy_coding_mode_flag) | |

(b)

| | |
|---|---|
| intra_split_flag | u(1) \| ae(v) |
| if( !intra_split_flag ) { | |
| prediction_unit( x0, y0, log2CUSize, log2CUSize ) | |
| transform_tree( x0, y0, log2CUSize, 0, 0 ) | |
| } else { | |
| prediction_unit( x0, y0, log2CUSize − 1, log2CUSize − 1 ) | |
| prediction_unit( x1, y0, log2CUSize − 1, log2CUSize − 1 ) | |
| prediction_unit( x0, y1, log2CUSize − 1, log2CUSize − 1 ) | |
| prediction_unit( x1, y1, log2CUSize − 1, log2CUSize − 1 ) | |
| transform_tree( x0, y0, log2CUSize, 0, 0) | |
| } | |
| } else if( PredMode == MODE_INTER ) { | |
| inter_partitioning_idc | ue(v) \| ae(v) |
| if(PartMode == PART_2Nx2N) { | |
| prediction_unit( x0, y0, log2CUSize, log2CUSize) | |
| transform_tree( x0, y0, log2CUSize, 0, 0) | |
| } else if(PartMode == PART_2NxN) { | |
| prediction_unit( x0, y0, log2CUSize − 1, log2CUSize) | |
| prediction_unit( x0, y1, log2CUSize − 1, log2CUSize) | |
| transform_tree( x0, y0, log2CUSize, 0, 0) | |
| } else if(PartMode == PART_Nx2N) { | |
| prediction_unit( x0, y0, log2CUSize, log2CUSize − 1) | |
| prediction_unit( x1, y0, log2CUSize, log2CUSize − 1) | |
| transform_tree( x0, y0, log2CUSize, 0, 0) | |
| } else { /* PART_NxN */ | |
| prediction_unit( x0, y0, log2CUSize − 1, log2CUSize − 1) | |
| prediction_unit( x1, y0, log2CUSize − 1, log2CUSize − 1) | |
| prediction_unit( x0, y1, log2CUSize − 1, log2CUSize − 1) | |
| prediction_unit( x1, y1, log2CUSize − 1, log2CUSize − 1) | |
| transform_tree( x0, y0, log2CUSize, 0, 0) | |
| } | |
| } else { /* MODE_DIRECT */ | |
| prediction_unit( x0, y0, log2CUSize, log2CUSize ) | |
| transform_tree( x0, y0, log2CUSize, 0, 0) | |
| } | |

| | Descriptor |
|---|---|
| coding_unit( x0, y0, log2CUsize ) { | |
| if((x0%MinIDeltaQuantCodingUnitSize)==0 && | |
| (y0%MinIDeltaQuantCodingUnitSize)==0)&&slice_type=I) | |
| deltaQuantAvail=true | |
| if((x0%MinPDeltaQuantCodingUnitSize)==0 && | |
| (y0%MinPDeltaQuantCodingUnitSize)==0)&&slice_type=P) | |
| deltaQuantAvail=true | |
| if((x0%MinBDeltaQuantCodingUnitSize)==0 && | |
| (y0%MinBDeltaQuantCodingUnitSize)==0)&&slice_type=B) | |
| deltaQuantAvail=true | |
| if( slice_type != I ) | |
| skip_flag[ x0 ][ y0 ] | u(1) \| ae(v) |
| if( skip_flag[ x0 ][ y0 ] ) | |
| prediction_unit( x0, y0, log2CUSize, log2CUSize ) | |
| else { | |
| if (deltaQuantAvail){ | |
| cu_qp_delta | |
| deltaQuantAvail = false | |
| } | |
| if( NumMergeCandidates > 0 ) | |
| merge_flag[ x0 ][ y0 ] | u(1) \| ae(v) |
| if( merge_flag[ x0 ][ y0 ] ) { | |
| PredMode = MODE_MERGE | |
| prediction_unit( x0, y0, log2CUSize, log2CUSize ) | |
| transform_tree( x0, y0, log2CUSize, 0, 0 ) | |
| } else { | |
| if( slice_type != I ) | |
| pred_mode | u(1) \| ae(v) |
| x1 = x0 + ((1 << log2CUSize) >> 1) | |
| y1 = y0 + ((1 << log2CUSize) >> 1) | |
| if( PredMode == MODE_INTRA ) { | |
| if( entropy_coding_mode_flag) | |
| intra_split_flag | u(1) \| ae(v) |
| if( intra_split_flag ) { | |
| prediction_unit( x0, y0, log2CUSize, log2CUSize ) | |
| transform_tree( x0, y0, log2CUSize, 0, 0 ) | |

(b)

| | Descriptor |
|---|---|
| } else { | |
| prediction_unit( x0, y0, log2CUSize – 1, log2CUSize – 1 ) | |
| prediction_unit( x1, y0, log2CUSize – 1, log2CUSize – 1 ) | |
| prediction_unit( x0, y1, log2CUSize – 1, log2CUSize – 1 ) | |
| prediction_unit( x1, y1, log2CUSize – 1, log2CUSize – 1 ) | |
| transform_tree( x0, y0, log2CUSize, 0, 0 ) | |
| } | |
| } else if( PredMode == MODE_INTER ) { | |
| inter_partitioning_idc | ue(v) \| ae(v) |
| if(PartMode == PART_2Nx2N) { | |
| prediction_unit( x0, y0, log2CUSize, log2CUSize ) | |
| transform_tree( x0, y0, log2CUSize, 0, 0 ) | |
| } else if(PartMode == PART_2NxN ) { | |
| prediction_unit( x0, y0, log2CUSize, log2CUSize – 1 ) | |
| prediction_unit( x0, y1, log2CUSize, log2CUSize – 1 ) | |
| transform_tree( x0, y0, log2CUSize, 0, 0 ) | |
| } else if(PartMode == PART_Nx2N ) { | |
| prediction_unit( x0, y0, log2CUSize – 1, log2CUSize ) | |
| prediction_unit( x1, y0, log2CUSize – 1, log2CUSize ) | |
| transform_tree( x0, y0, log2CUSize, 0, 0 ) | |
| } else { /* PART_NxN */ | |
| prediction_unit( x0, y0, log2CUSize – 1, log2CUSize – 1 ) | |
| prediction_unit( x1, y0, log2CUSize – 1, log2CUSize – 1 ) | |
| prediction_unit( x0, y1, log2CUSize – 1, log2CUSize – 1 ) | |
| prediction_unit( x1, y1, log2CUSize – 1, log2CUSize – 1 ) | |
| transform_tree( x0, y0, log2CUSize, 0, 0 ) | |
| } | |
| } else { /* MODE_DIRECT */ | |
| prediction_unit( x0, y0, log2CUSize, log2CUSize ) | |
| transform_tree( x0, y0, log2CUSize, 0, 0 ) | |
| } | |
| } | |

IMAGE DECODING DEVICE, IMAGE ENCODING DEVICE, AND IMAGE DECODING METHOD

This application is a Continuation of copending application Ser. No. 15/044,836, filed on Feb. 16, 2016, which is a Divisional of copending application Ser. No. 13/697,247, filed on Nov. 9, 2012 (abandoned), which was filed as PCT International Application No. PCT/JP2011/060444 on Apr. 28, 2011, which claims the benefit under 35 U.S.C. § 119(a) to Patent Application Nos. 2010/111475 and 2011-052178, filed in Japan on May 13, 2010 and Mar. 9, 2011, all of which are hereby expressly incorporated by reference into the present application.

TECHNICAL FIELD

The present invention relates to an encoding device for generating encoded data by encoding an image. Further, the present invention relates to a decoding device for decoding the encoded data generated by use of such an encoding device.

BACKGROUND ART

Video encoding devices have been used for efficiently transmitting or recording videos. Examples of a specific video encoding method encompass H.264/MPEG-4 AVC (hereinafter abbreviated as H264/AVC) (described in Non Patent Literature 1) and a method employed in KTA software which is a joint development codec in VCEG (Video Coding Expert Group).

According to such an encoding method, an image (picture) constituting a video is managed in a hierarchical structure which is constituted by (i) a plurality of slices into which the image is divided, (ii) a plurality of macroblocks into which each of the plurality of slices is divided, (iii) a plurality of sub blocks into which each of the plurality of macroblocks is divided, and (iv) a plurality of blocks into which each of the plurality of macroblocks or the plurality of sub blocks is divided.

A video encoding device based on H264/AVC (1) subjects an image to DCT transform, (2) quantizes a frequency component obtained by the DCT transform (Discrete Cosine Transform), and (3) variable-length-codes the quantized frequency component, thereby obtaining an encoded image. Quantization step employed in quantization is variable with respect to each macroblock, and the video encoding device is designed to encode a quantization parameter that designates the size of the quantization step and to supply the encoded quantization parameter as well as the encoded image to a video decoding device.

The process for encoding the quantization parameter is detailed below with reference to (a) of FIG. 7, FIG. 11, and FIG. 12.

(a) of FIG. 7 is a view schematically showing a slice constituted by macroblocks MB1 to MBn. FIG. 12 is a view showing examples of difference values of quantization parameters assigned to the macroblocks MB1 to MBn. FIG. 11 is a table showing relations among difference values of quantization parameters, code numbers, and binary sequences outputted when binarizing the code numbers.

As shown in FIG. 12, the video encoding device determines, with respect to each picture, a default value pic_init_qp of a quantization parameter of the picture (hereinafter "picture default QP value"). Furthermore, the video encoding device determines, with respect to each slice included in the picture, a default value (SliceQP$_Y$) of a quantization parameter of the slice (hereinafter "slice default QP value"). Furthermore, the video encoding device determines, with respect to each slice, a difference value slice_qp_delta obtained by subtracting, from the slice default QP value of the slice, the picture default QP value of the picture including the slice.

Furthermore, the video encoding device determines, with respect to each macroblock MBi (i=1-n) included in each slice, a quantization parameter QP$_Y$ in raster scan order, and determines, as a QP difference value of a macroblock MBi, a difference value mb_qp_delta (hereinafter "QP difference value") obtained by subtracting, from the determined quantization parameter, a quantization parameter of a macroblock MBi−1 previous by one to the macroblock MBi in raster scan order. It should be noted that a QP difference value mb_qp_delta of a first macroblock MB1 in raster scan order is obtained by subtracting, from a quantization parameter determined with respect to the macroblock MB1, a slice default QP value SliceQP$_Y$ of a slice including the macroblock MB1.

The video encoding device binarizes, based on the table shown in FIG. 11, the QP difference value mb_qp_delta generated as above. That is, the QP difference value is transformed, when the absolute value thereof is n, into a binary sequence whose length is 2n or 2n+1 by unary binarization.

Processes carried out by such a video encoding device and such a video decoding device have advantages below.

That is, 1) the amount of codes of an encoded image (main information) can be reduced efficiently without impairing subjective image quality of a decoded image decoded by a video decoding device, and 2) by regulating a quantization parameter suitably, the amount of codes of an encoded image with respect to each frame can be kept at a desired rate.

Furthermore, 3) by quantizing an image treated later as a reference image by a smaller quantization step, it is possible to reduce an amount of codes in prediction residual that is generated later, and thus to reduce an amount of codes in a video image as a whole, and 4) by regulating the amount of a quantization parameter so that RD (rate distortion) cost is small, an encoding efficiency can be increased.

CITATION LIST

Non-Patent Literature

Non-Patent Literature 1
ITU-T Recommendation H. 264 (March 2009)

SUMMARY OF INVENTION

Technical Problem

However, although the above configuration allows reducing the amount of codes of an encoded image (main information), the amount of codes of a QP difference value supplied as side information together with the main information to the video decoding device is not sufficiently reduced. For example, in some cases, the amount of codes of a QP difference value occupies approximately 10% of the whole encoded data supplied to a video decoding device. This is because the amount of codes of a QP difference value is in relation to the absolute value of the QP difference value as is seen from FIG. 11.

The present invention was made in view of the foregoing problem. A main object of the present invention is to realize an encoding device capable of reducing the amount of codes of a quantization parameter supplied to a decoding device compared with a conventional art, and a decoding device capable of inverse-quantization based on a quantization parameter supplied from such an encoding device.

Solution to Problem

In order to solve the foregoing problem, an encoding device of the present invention is an encoding device for quantizing, in accordance with a value of a quantization parameter, an image in each of a plurality of unit regions constituting an input image to be encoded, the encoding device comprising: setting means for setting a quantization parameter used in encoding each unit region, the setting means setting an quantization parameter for each unit region in such a manner that a difference between a quantization parameter for a unit region and a predetermined reference value is equal to one of n predetermined difference values; transform means for transforming, with respect to each unit region, the difference between the quantization parameter for the unit region and the predetermined reference value into an integer in accordance with a transform rule by which the n difference values are transformed into n number of integers, respectively; and binary sequence generation means for generating a binary sequence having a length corresponding to a size of an absolute value of the integer into which the difference is transformed by the transform means, a total of absolute values of the n integers being smaller than a total of absolute values of the n difference values.

A conventional encoding device is designed to generate a binary sequence having a length corresponding to the size of an absolute value of a difference between quantization parameters with respect to each unit region.

In contrast thereto, in the encoding device of the present invention, a difference between quantization parameters in each unit region is transformed into an integer, and a binary sequence having a length corresponding to the size of the absolute value of the integer is generated. Furthermore, since the total of the absolute values of the n integers is smaller than the total of the absolute values of the n difference values serving as candidates for the difference between the quantization parameters, the absolute value of the integer obtained by the transform is statistically smaller than the absolute value of the difference value to be transformed.

Consequently, the binary sequence generated from the difference between the quantization parameters has a smaller length in the encoding device of the present invention than in the conventional encoding device. This yields an effect of further reducing an amount of codes of quantization parameters supplied to a decoding device, compared with the conventional art.

In order to solve the foregoing problem, a decoding device of the present invention is a decoding device for decoding encoded data to set quantization parameters regarding unit regions constituting a decoded image, the decoding device comprising: extraction means for extracting data of binary sequences regarding the unit regions from the encoded data;

integer generation means for generating integers corresponding to lengths of the binary sequences regarding the unit regions from the data of binary sequences extracted by the extraction means; and specifying means for specifying, according to information in which n integers are related to n difference values regarding quantization parameters, respectively, difference values for the unit regions based on integers for the unit regions that are generated by the integer generation means, the quantization parameters for the unit regions being generated based on the difference values specified by the specifying means.

With the arrangement, when receiving encoded data including the binary sequence from the encoding device of the present invention, the decoding device of the present invention can appropriately specify difference values regarding individual unit regions based on the encoded data. That is, the decoding device of the present invention can suitably specify quantization parameters regarding individual unit regions supplied from the encoding device of the present invention.

Therefore, the decoding device of the present invention can carry out inverse-quantization based on quantization parameters supplied from the encoding device of the present invention.

Furthermore, in order to solve the foregoing problem, an encoding device of the present invention is an encoding device for quantizing, in accordance with a value of a quantization parameter, an image in each of a plurality of unit regions constituting an input image to be encoded, the encoding device comprising: selection means for selecting, in a predetermined order, a plurality of third unit regions constituting each of the plurality of unit regions; determination means for determining a difference value of a quantization parameter for one of third unit regions to be quantized in each of the plurality of unit regions, said one of third unit regions being firstly selected by the selection means; and calculation means for calculating the value of the quantization parameter to be referred to when quantizing images in the third unit regions to be quantized in each of the plurality of unit regions, the value of the quantization parameter being calculated based on the difference value of the quantization parameter for the unit region which is determined by the determination means. Here, "quantizing an image" may be one of quantizing a residual image between an input image and a predicted image and quantizing a transform coefficient obtained by frequency-transforming a residual image.

With the arrangement, the encoding device of the present invention determines a difference value of a quantization parameter for one third unit region selected from each unit region, and using the difference value of the quantization parameter, determines a quantization parameter of the third unit region to be quantized. In contrast thereto, an encoding device without the above features determines a quantization parameter for each third unit region to be quantized, and using the quantization parameter for each third unit region, determines a difference value of the quantization parameter for the third unit region.

That is, in order that a decoding device carries out inverse-quantization, the encoding device of the present invention is only required to determine one difference value of a quantization parameter per unit region and transmit the difference value to the decoding device, whereas an encoding device without the above features is required to transmit difference values of quantization parameters for individual third unit regions included in one unit region to the decoding device.

Therefore, the encoding device of the present invention can further reduce an amount of codes of a quantization parameter, compared with the conventional art.

A decoding device of the present invention is a decoding device for decoding encoded data to set quantization parameters regarding unit regions constituting a decoded image, the decoding device comprising: selection means for selecting, in a predetermined order, a plurality of third unit regions constituting each of the unit regions constituting the decoded image; reading means for reading, from the encoded data, a difference value of a quantization parameter for one of third unit regions to be inverse-quantized in each of the unit regions constituting the decoded image, said one of third unit regions being firstly selected by the selection means; and specifying means for specifying a value of the quantization parameter to be referred to when a quantization image in each third unit region to be inverse-quantized in each of the unit regions constituting the decoded image, the specifying being made based on the difference value of the quantization parameter read out in said each of the unit regions by the reading means. The quantization image is, for example, an image on a frequency domain constituted by quantized DCT coefficients decoded from encoded data. By subjecting the quantization image to inverse-quantization and inverse-frequency transformation, it is possible to obtain a decoded image on a spatial domain.

With the arrangement, the decoding device of the present invention reads out a difference value of a quantization parameter in one third unit region selected from each unit region, and using the difference value, determines quantization parameters for individual third unit regions to be inverse-quantized in the unit region.

In contrast thereto, a decoding device without the above features reads out difference values of quantization parameters from individual third unit regions to be inverse-quantized in each unit region, and using the read out difference values, determines quantization parameters for individual third unit regions to be inverse-quantized in the unit region.

Therefore, the decoding device of the present invention can specify, with a smaller load, quantization parameters to be used in inverse-quantization.

Advantageous Effects of Invention

As described above, the encoding device of the present invention can reduce an amount of codes in a quantization parameter to be supplied to a decoding device, compared with the conventional art. Furthermore, the decoding device can carry out inverse-quantization based on the quantization parameter supplied from such an encoding device.

Figure 7:
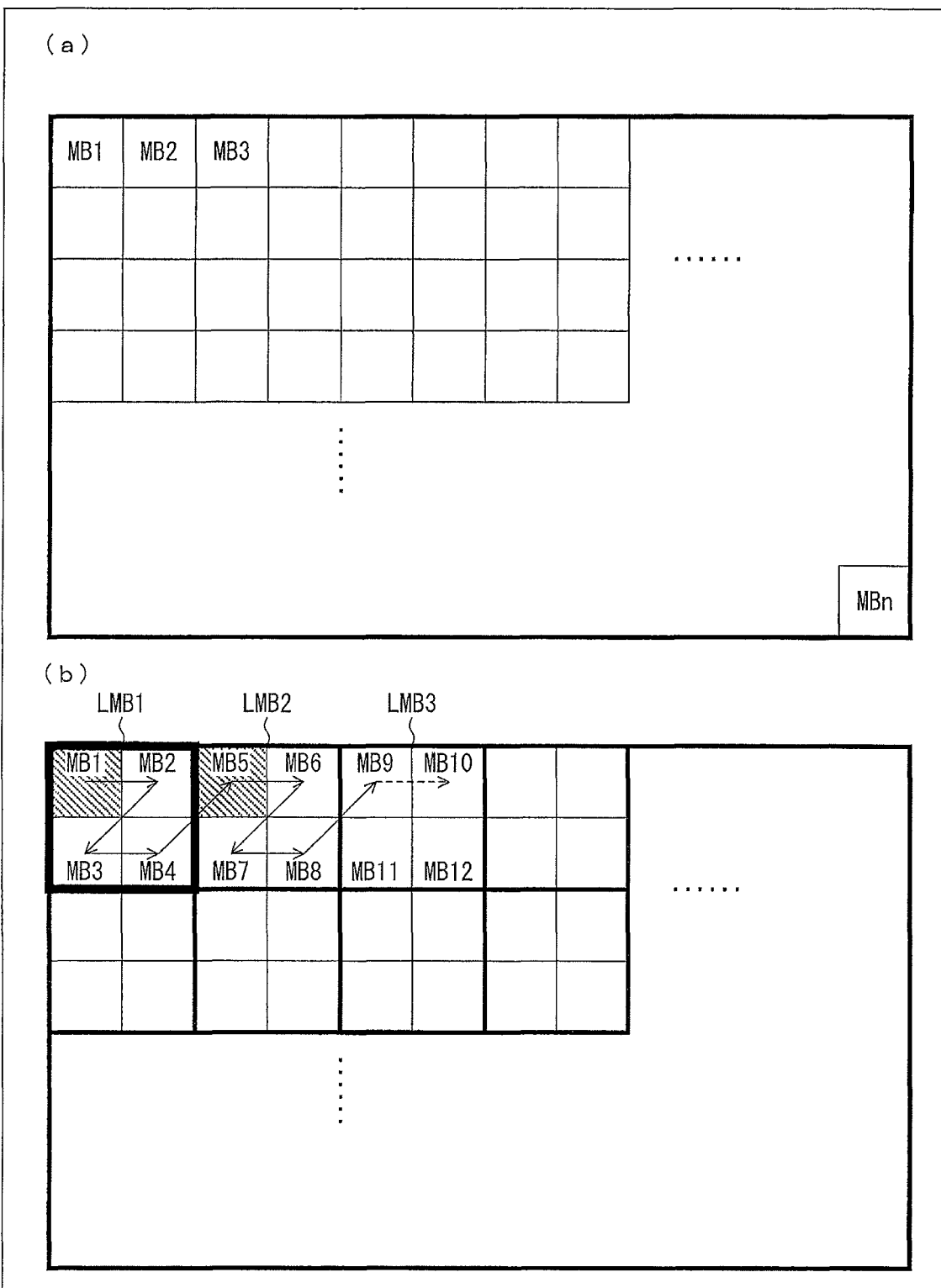
FIG. 7

(a) and (b) of FIG. 7 schematically show configurations of slices, respectively.

FIG. 8

(a) to (e) of FIG. 8 show specific examples of a QP difference value table.

FIG. 9

(a) of FIG. 9 shows relations among values of indices, code numbers serving as inputs for unary binarization, and binary sequences serving as outputs from unary binarization. (b) of FIG. 9 shows relations among values of indices and binary sequences serving as outputs from fixed-length binarization.

FIG. 10

(a) and (b) of FIG. 10 show examples of amount of codes in encoding a QP difference value table.

FIG. 11 is a view of a conventional art, showing relations among QP difference values, code numbers serving as inputs for unary binarization, and binary sequences serving as outputs from unary binarization.

Figure 12:
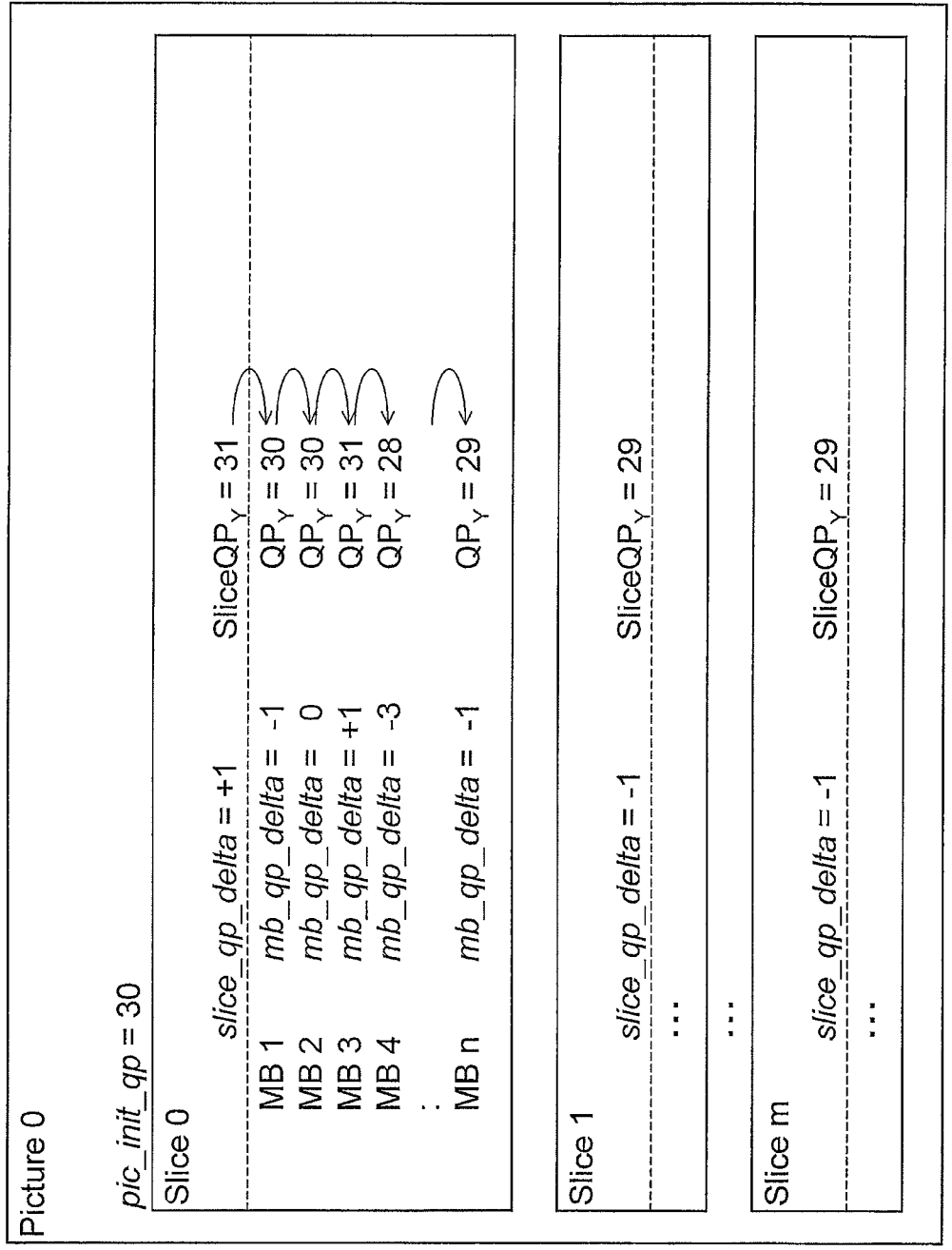

FIG. 12 is a view showing an example of a picture default QP value set with respect to each picture, a slice default QP value set with respect to each slice, and a QP value and a QP difference value that are set with respect to each macroblock.

Figure 13:
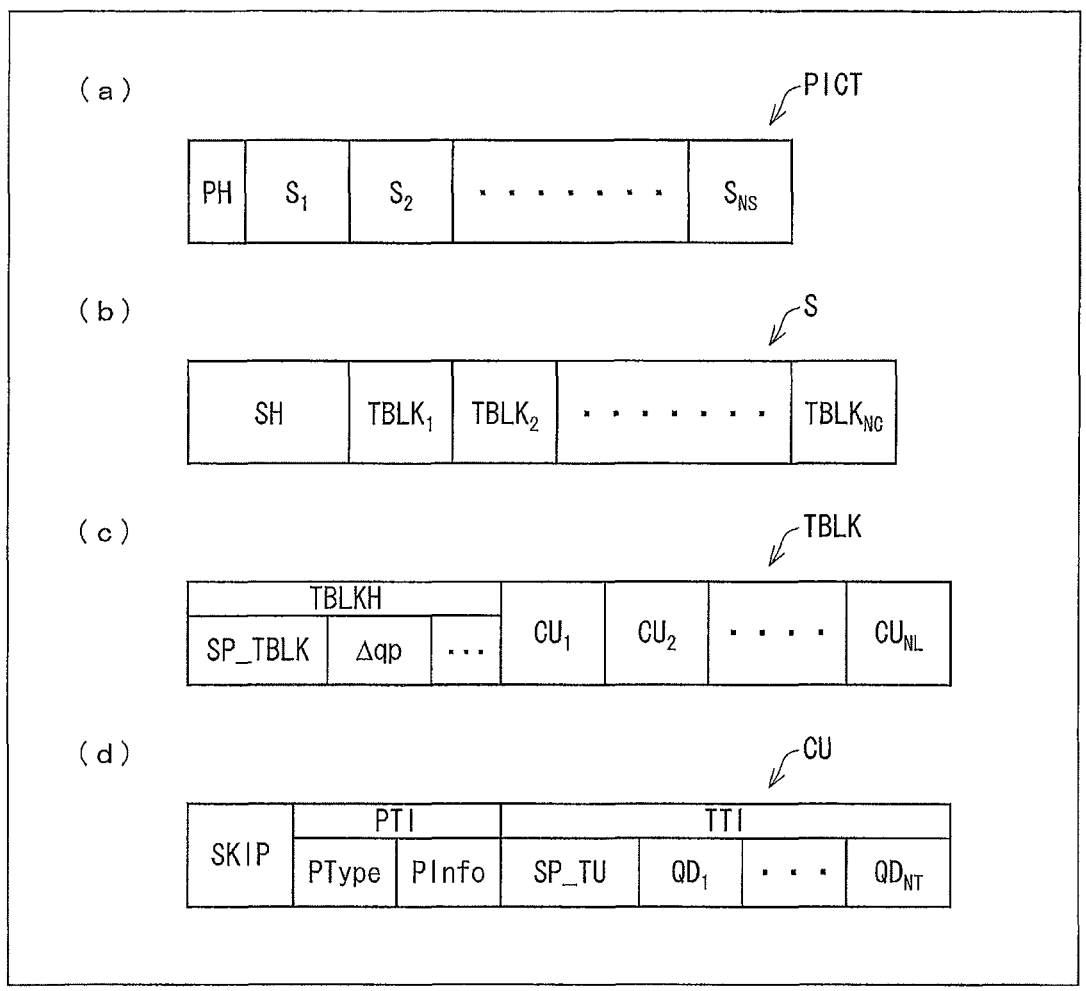

FIG. 13 is a view hierarchically showing individual information included in side information.

Figure 14:
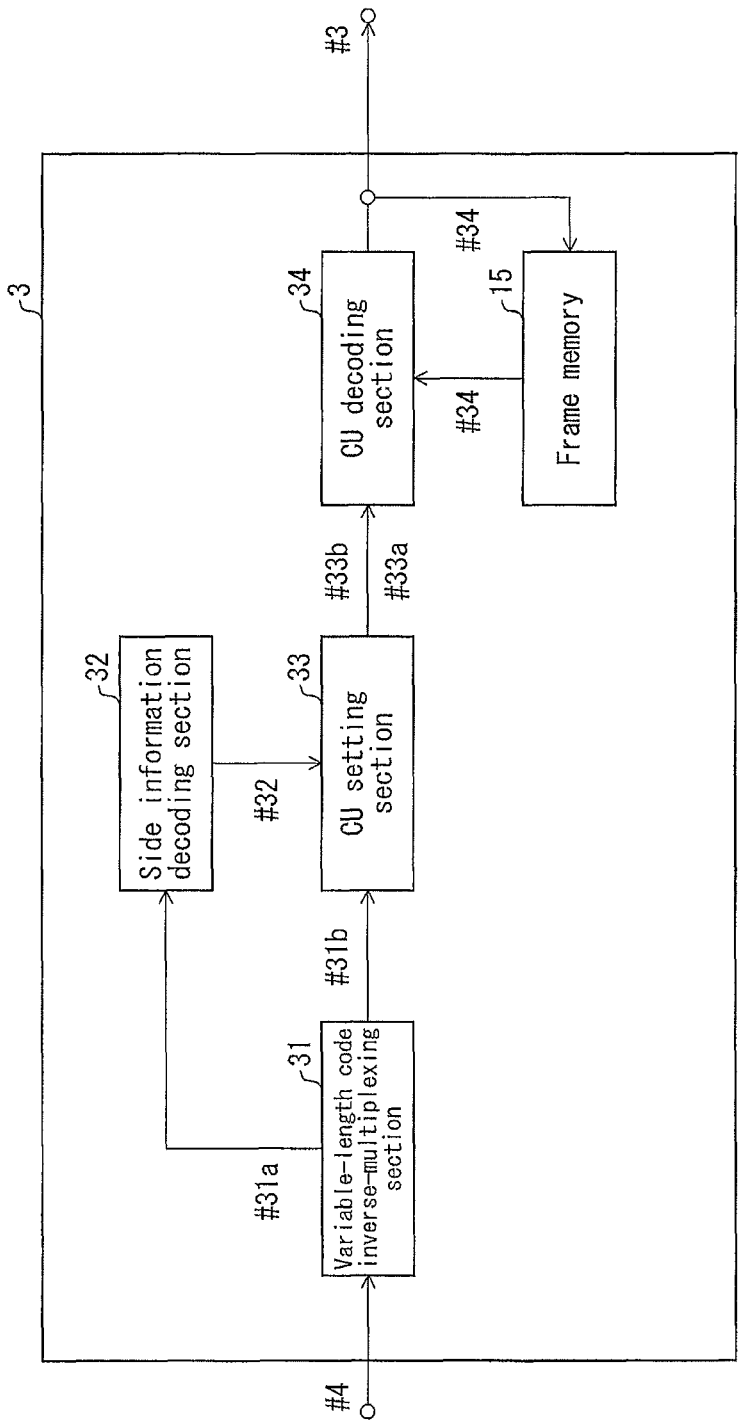

FIG. 14 is a block diagram showing a configuration of a video decoding device in accordance with another embodiment.

Figure 15:
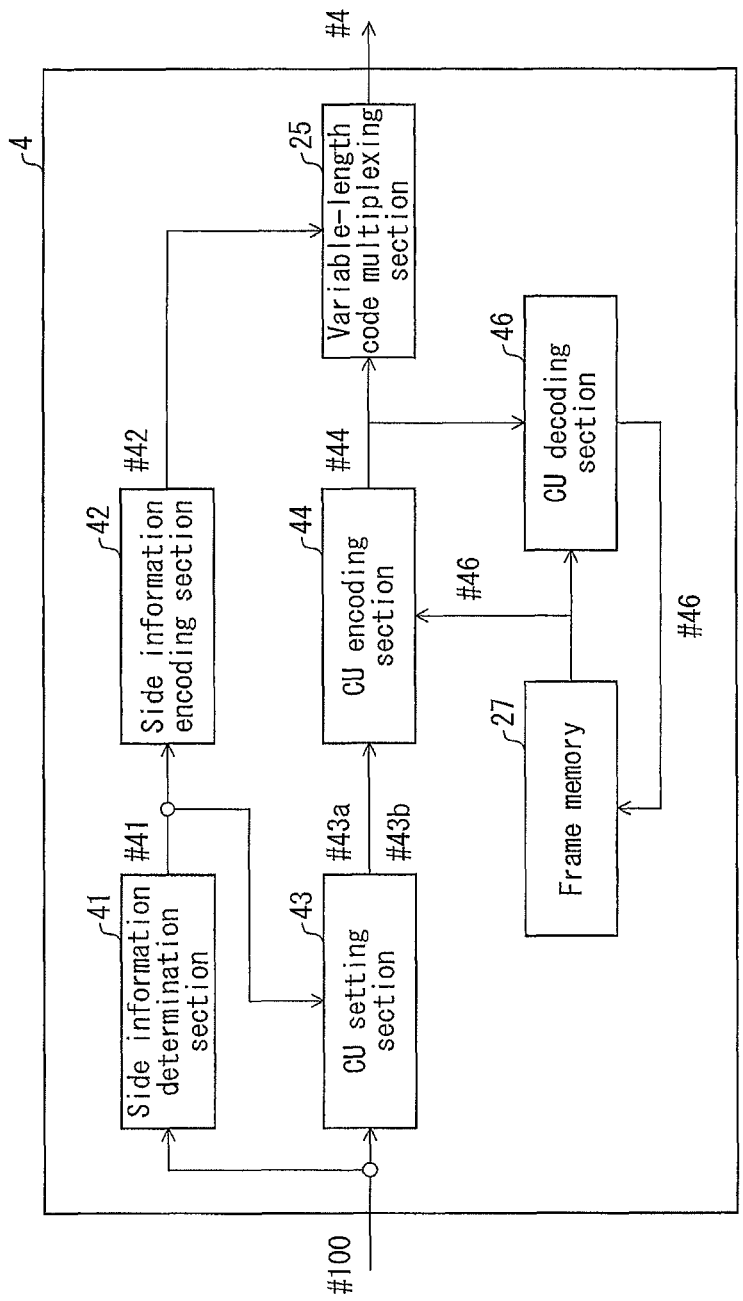

FIG. 15 is a block diagram showing a configuration of a video encoding device in accordance with another embodiment.

FIG. 16 is a view showing an example of a picture parameter set.

FIG. 17 is a view schematically showing positions of CUs whose QP difference values are encoded in QP encoding unit regions.

FIG. 18 is a view showing an example of coding_unit syntax. (a) of FIG. 18 shows a former part of syntax. (b) of FIG. 18 shows a latter part of the syntax.

FIG. 19 is a view showing another example of coding_unit syntax. (a) of FIG. 19 shows a former part of syntax. (b) of FIG. 19 shows a latter part of the syntax.

FIG. 20 is a view showing another example of coding_unit syntax. (a) of FIG. 20 shows a former part of syntax. (b) of FIG. 20 shows a latter part of the syntax.

FIG. 21 is a view showing an example of transform_tree syntax.

Figure 22:
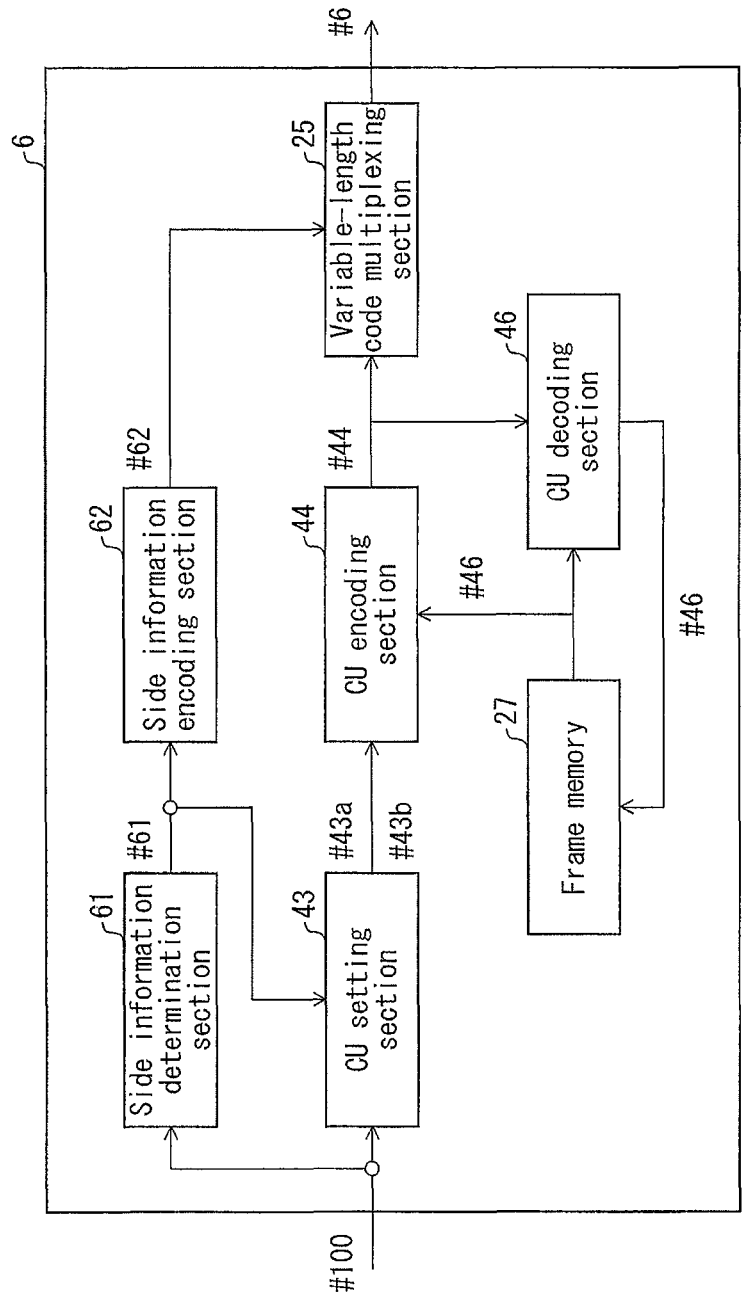

FIG. 22 is a block diagram showing a configuration of a video encoding device in accordance with another embodiment.

FIG. 23 is a view showing another example of transform_tree syntax.

FIG. 24 is a view showing another example of transform_tree syntax.

Figure 25:
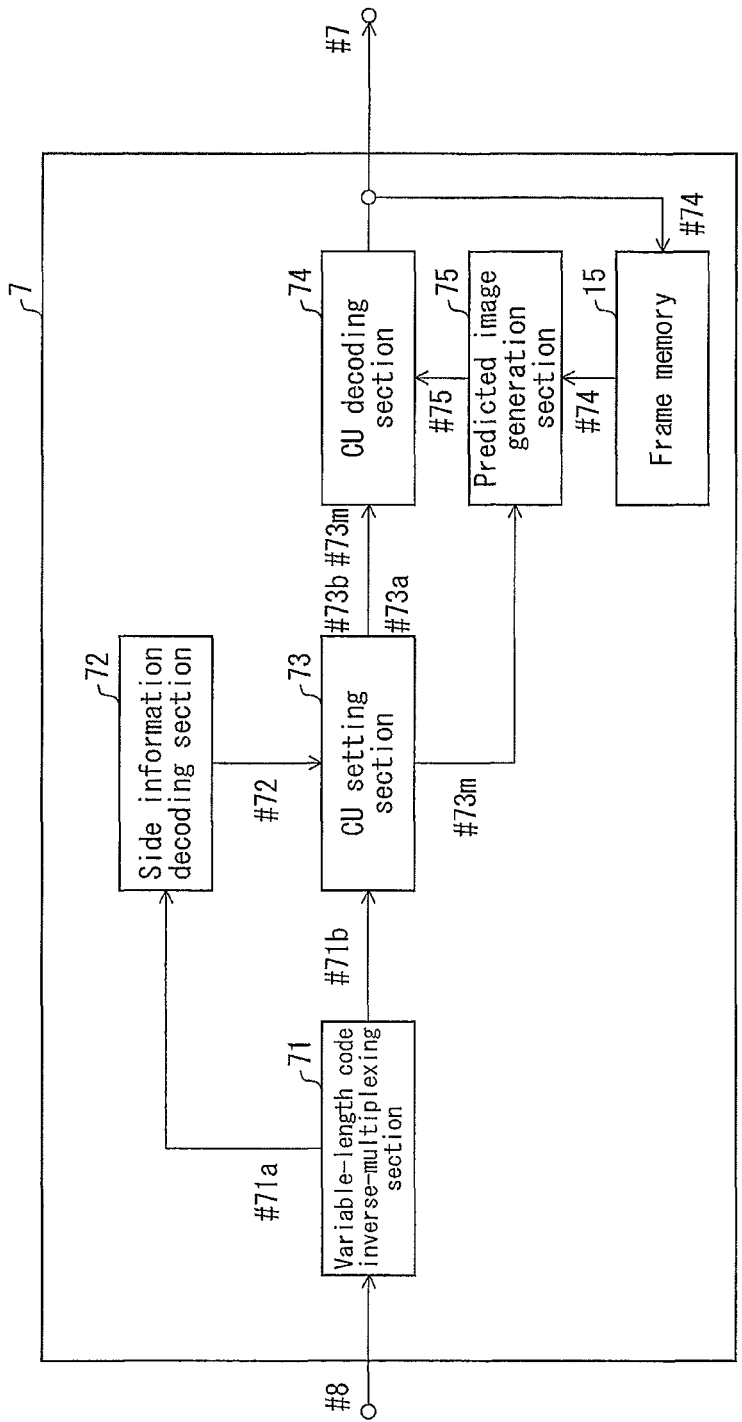

FIG. 25 is a block diagram showing a configuration of a video decoding device in accordance with another embodiment.

Figure 26:
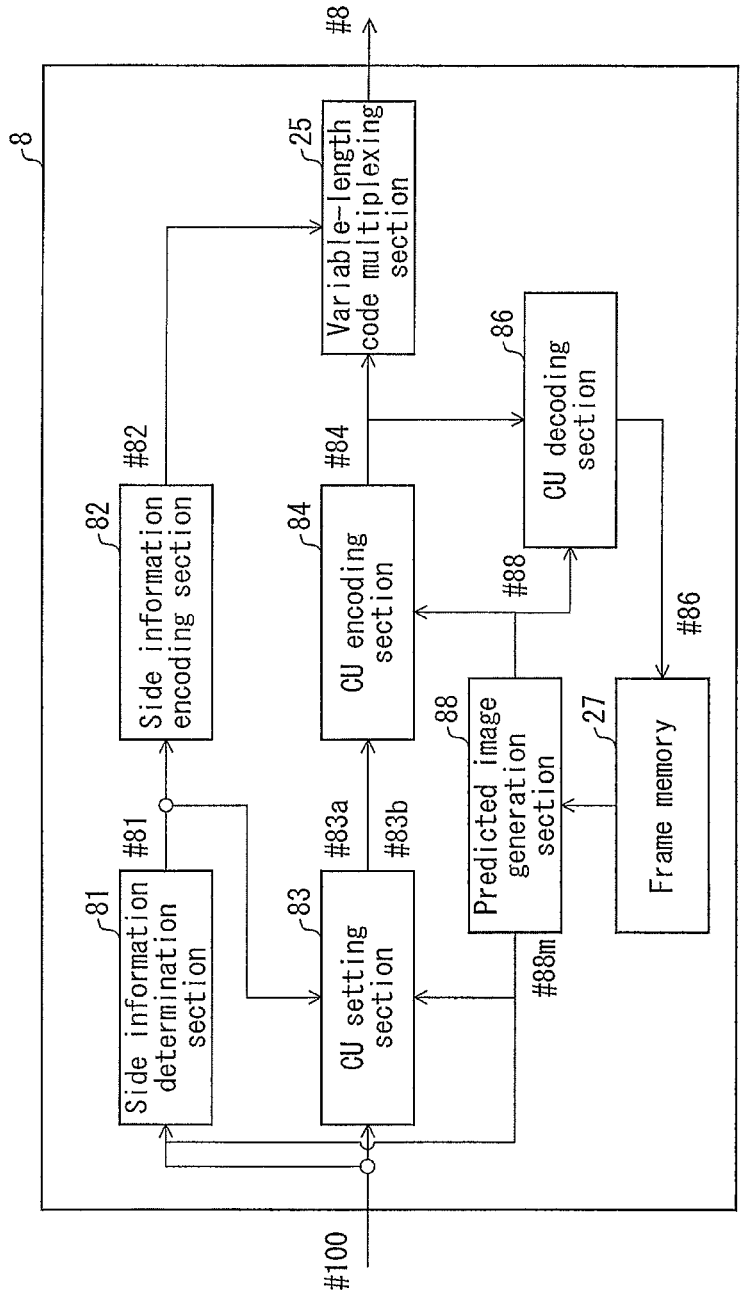

FIG. 26 is a block diagram showing a configuration of a video encoding device in accordance with another embodiment.

FIG. 27 is a view showing another example of coding_unit syntax. (a) of FIG. 27 shows a former part of syntax. (b) of FIG. 27 shows a latter part of the syntax.

FIG. 28 is a view showing another example of coding_unit syntax. (a) of FIG. 28 shows a former part of syntax. (b) of FIG. 28 shows a latter part of the syntax.

Figure 29:
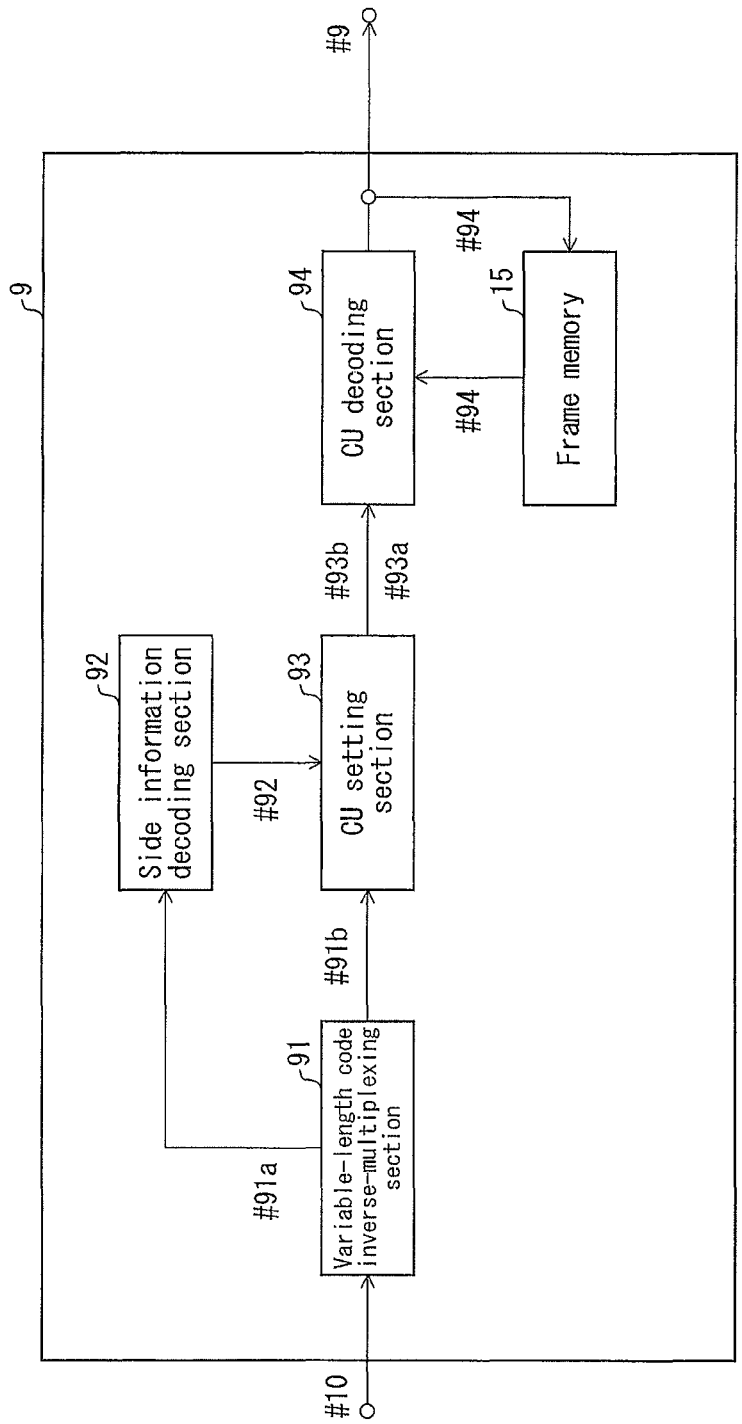

FIG. 29 is a block diagram showing a configuration of a video decoding device in accordance with another embodiment.

Figure 30:
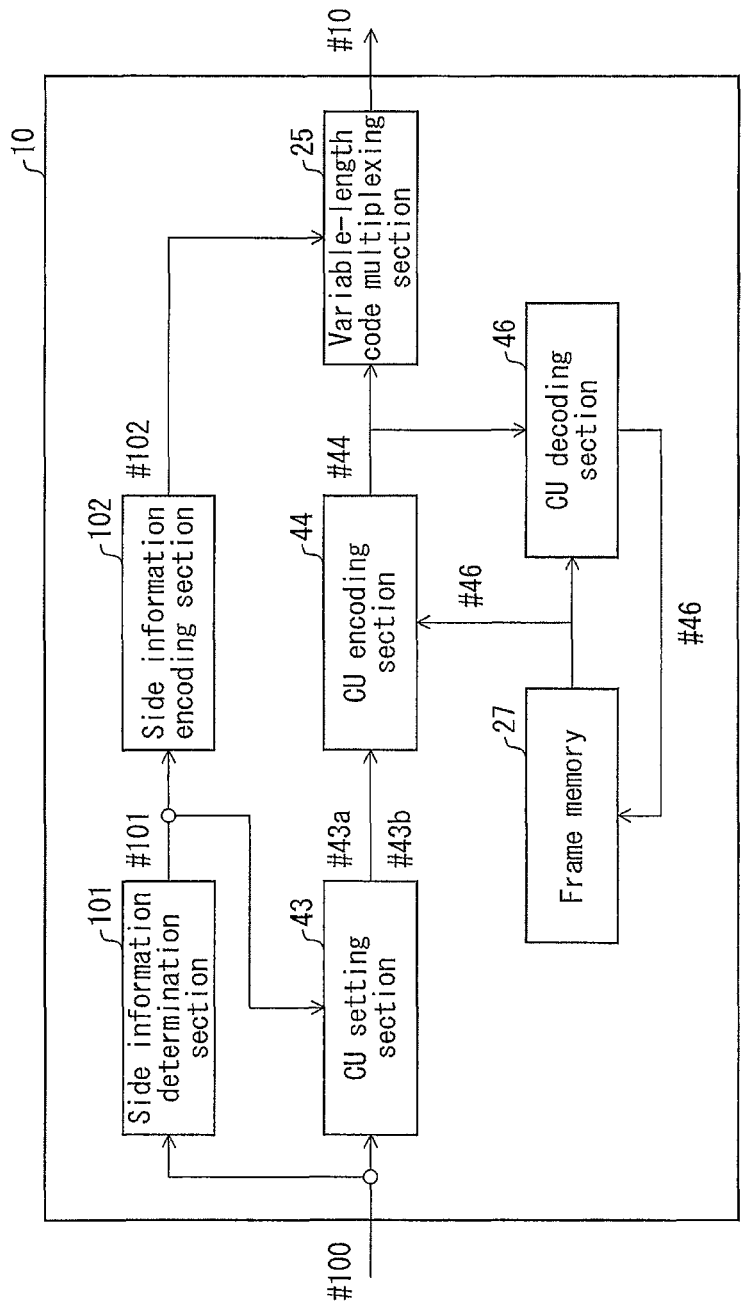

FIG. 30 is a block diagram showing a configuration of a video encoding device in accordance with another embodiment.

FIG. 31 is a view showing another example of coding_unit syntax. (a) of FIG. 31 shows a former part of syntax. (b) of FIG. 31 shows a latter part of the syntax.

Figure 32:
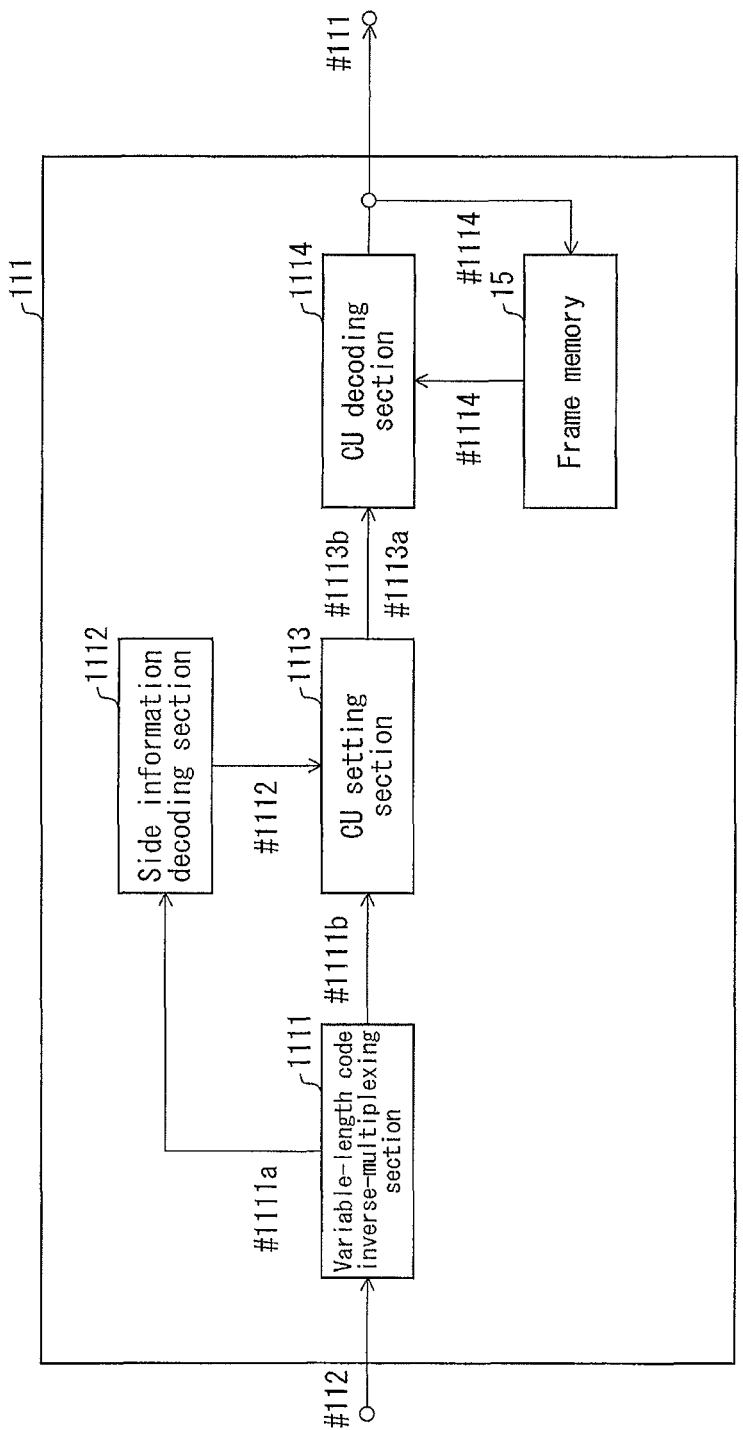

FIG. 32 is a block diagram showing a configuration of a video decoding device in accordance with another embodiment.

Figure 33:
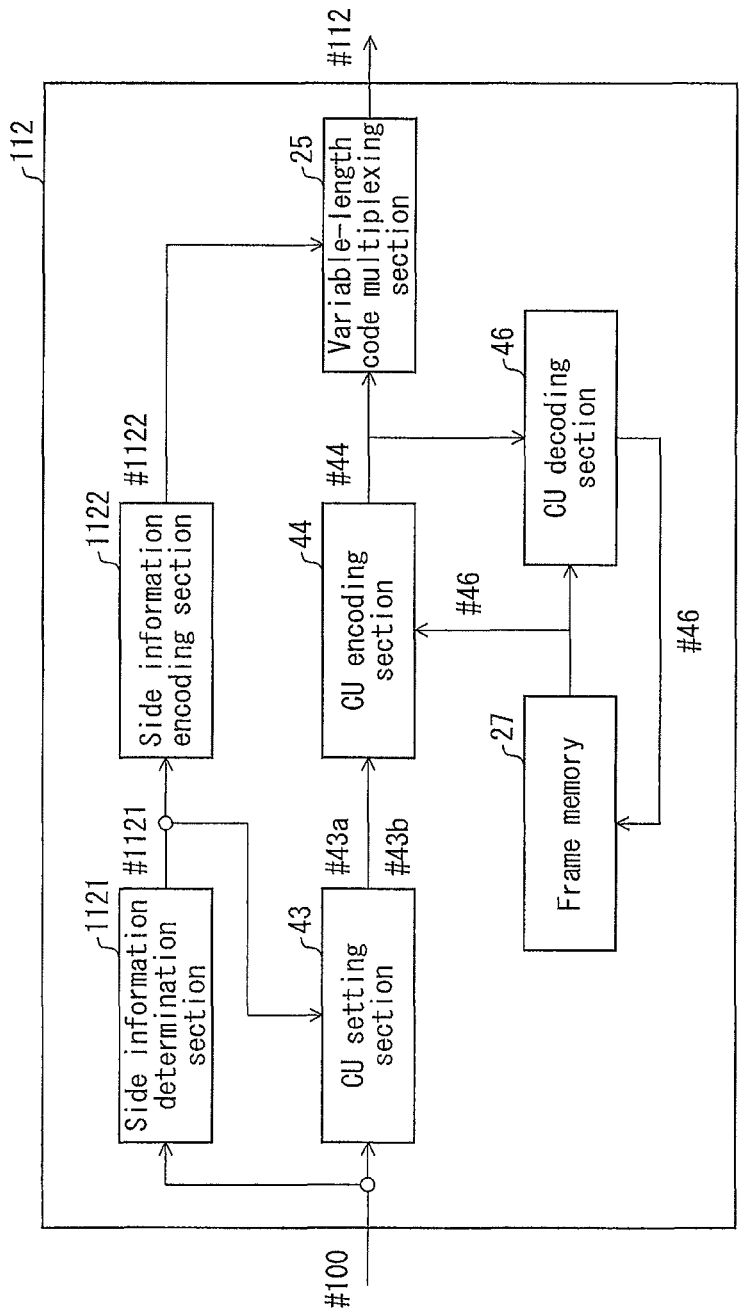

FIG. 33 is a block diagram showing a configuration of a video encoding device in accordance with another embodiment.

FIG. 34 is a view showing another example of coding_unit syntax. (a) of FIG. 34 shows a former part of syntax. (b) of FIG. 34 shows a latter part of the syntax.

Figure 35:
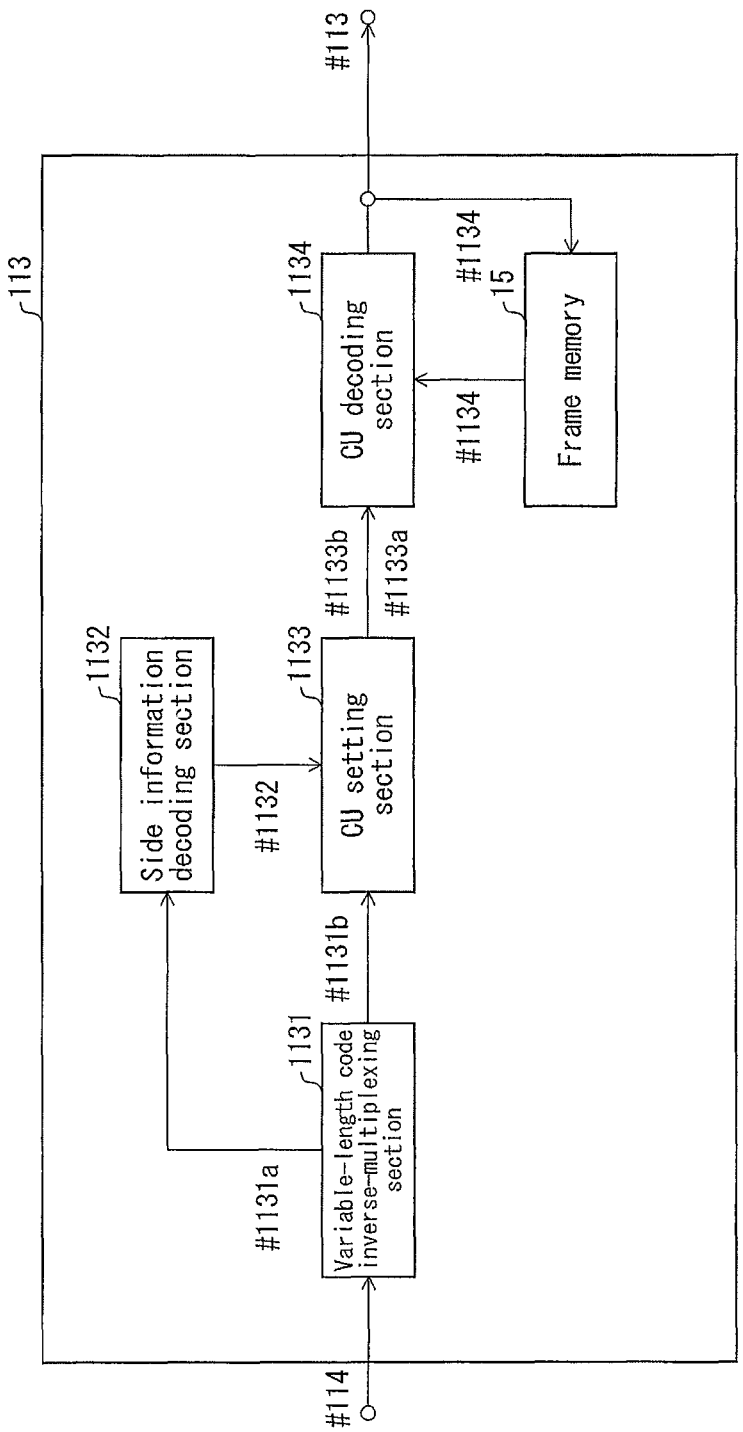

FIG. 35 is a block diagram showing a configuration of a video decoding device in accordance with another embodiment.

Figure 36:
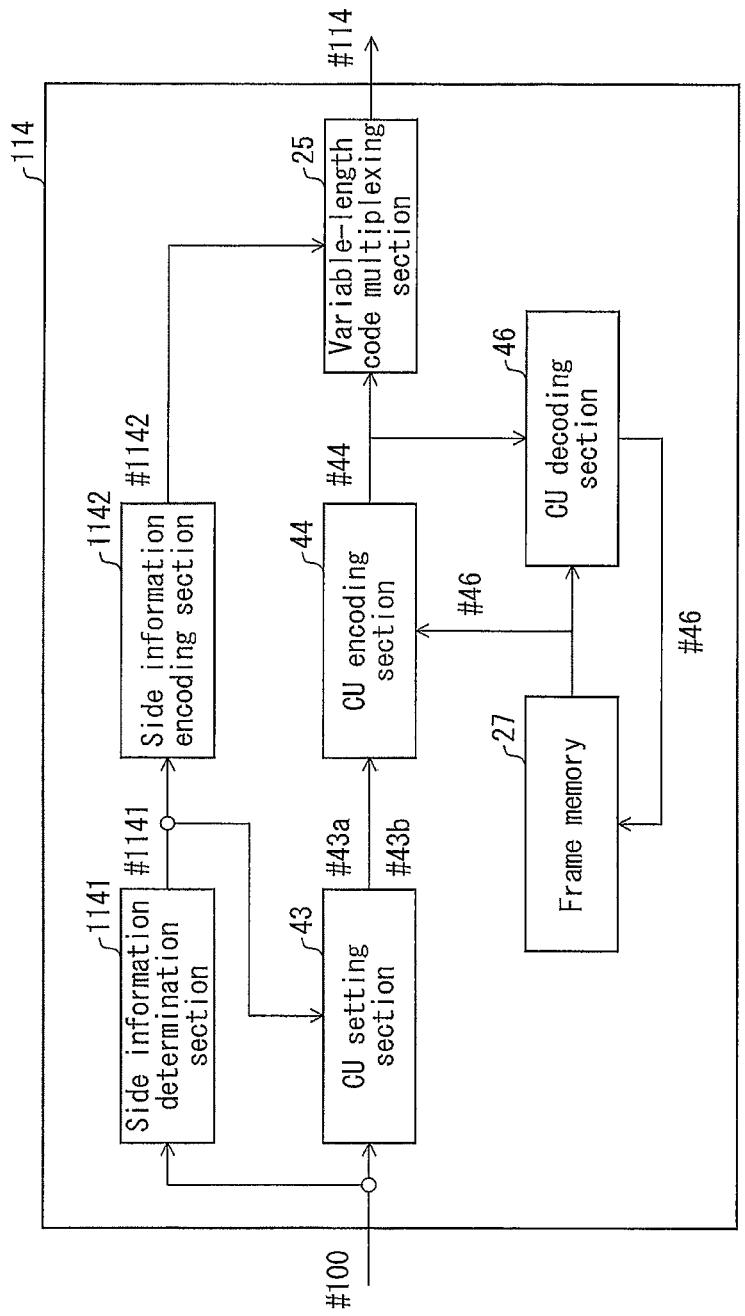

FIG. 36 is a block diagram showing a configuration of a video encoding device in accordance with another embodiment.

DESCRIPTION OF EMBODIMENTS

First Embodiment (Video Encoding Device)

Figure 1:
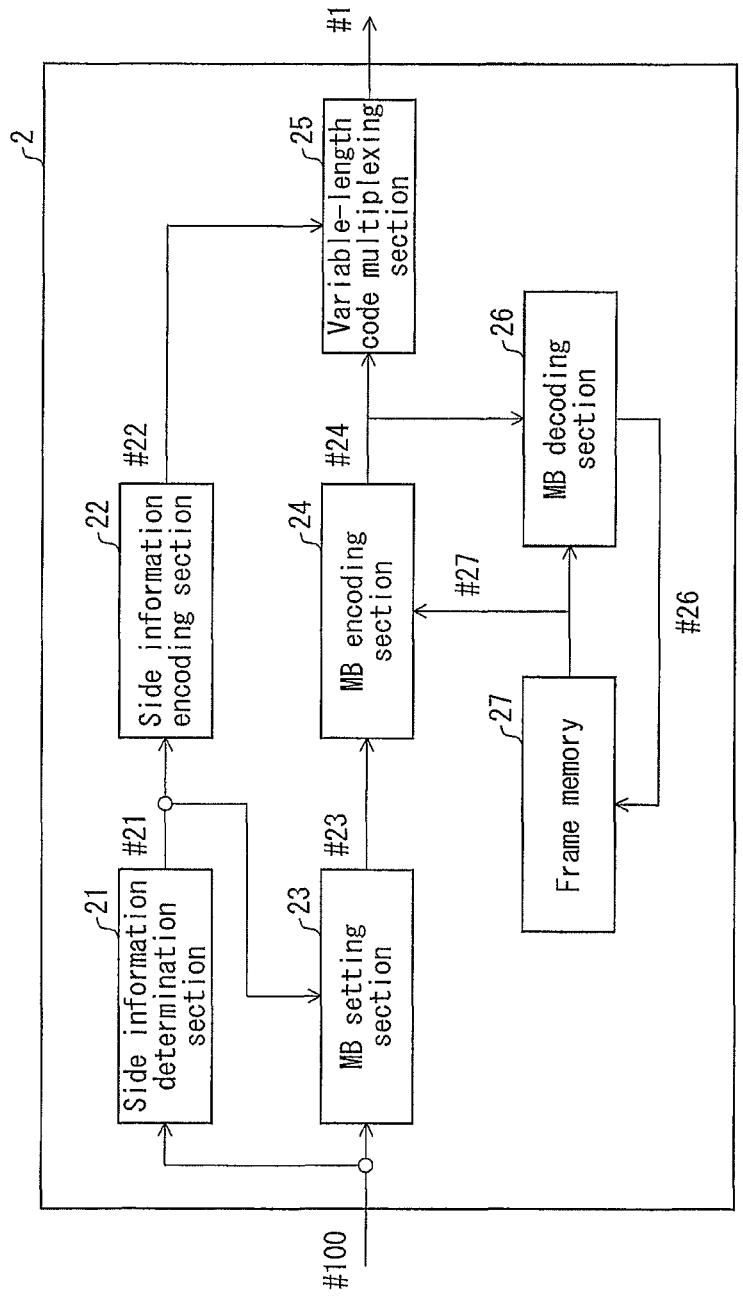
FIG. 1 is a block diagram showing a configuration of a video encoding device in accordance with an embodiment.

The following explains a video encoding device (encoding device) 2 in accordance with the present embodiment with reference to FIGS. 1-3, 6-10, and 12. FIG. 1 is a block diagram showing a configuration of the video encoding device 2. As shown in FIG. 1, the video encoding device 2 includes a side information determination section 21, a side information encoding section 22, an MB setting section 23, an MB encoding section 24, a variable-length code multiplexing section 25, an MB decoding section 26, and a frame memory 27.

Schematically, the video encoding device 2 encodes an input image #100 to generate encoded data #1 and outputs the encoded data #1. The video encoding device 2 is a video encoding device partially using the technique employed in H264/AVC standard.

A process of encoding the input image #100 includes DCT, quantization etc. The video encoding device 2 carries out a quantization process by changing a quantization level with respect to each macroblock (quantization unit region).

The side information determination section 21 determines side information based on the input image #100, and outputs the determined side information as side information #21. The side information #21 is supplied to the side information encoding section 22 as well as inputted to the MB setting section 23. The side information #21 includes a picture parameter set which is a set of parameters regarding the input image #100, a slice header which is header information with respect to each slice included in the input image #100, a macroblock layer which is a set of parameters with respect to each block included in a slice, and the like. Each of the picture parameter set and the slice header includes a picture default QP value and a difference value between a slice default QP value and the picture default QP value.

Furthermore, the side information determination section determines, with respect to each slice, a set of QP difference values for limiting QP values assignable to macroblocks included in the slice. That is, QP values assignable to the macroblock MBi included in the slice are limited so that QP difference values between the QP values assignable to the macroblock MBi and the QP value assigned to the macroblock MBi−1 included in the same slice are included in the set of the QP difference values.

Furthermore, the side information determination section 21 generates, with respect to each slice (table generation unit region), a QP difference value table regarding the slice, and incorporates the generated QP difference value table into a corresponding slice header. The QP difference value table regarding the slice is a table generated by relating indices indicative of individual QP difference values included in the set of the QP difference values (the indices are different integers for individual QP difference values) to those individual QP difference values. Alternatively, the QP difference value table may be one for encoding rules for generating a QP difference value table, as described later in the section (Additional matter 3). Alternatively, the present invention may be arranged such that a video encoding device and a video decoding device each include a plurality of predetermined QP difference value tables, and indices for switching the QP difference value tables are encoded. The side information determination section 21 incorporates, into a macroblock layer, an index indicative of a QP difference value between a QP value assigned to a macroblock MBi and a QP value assigned to a macroblock MBi−1. How the side information determination section 21 determines the set of the QP difference values and how the side information determination section 21 generates the QP difference value table are described later.

The side information encoding section 22 encodes the side information #21, and outputs encoded side information #22. The encoded side information #22 is supplied to the variable-length code multiplexing section 25.

The MB setting section 23 divides the input image #100 into a plurality of slices based on the side information #21, and divides each slice into a plurality of macroblocks, and outputs macroblock images #23 regarding individual macroblocks. The MB setting section 23 calculates values of quantization parameters (QP values) regarding the individual macroblock images #23 based on the side information #21 (this calculation will be detailed later). Then, the individual macroblock images #23 are sequentially supplied together with the calculated QP values to the MB encoding section 24.

The MB encoding section 24 generates MB encoded data #24 with respect to each of the sequentially inputted macroblock images #23, and supplies the MB encoded data #24 to the variable-length code multiplexing section 25. The MB encoding section 24 generates the MB encoded data #24 specifically as follows.

That is, the MB encoding section 24 subjects individual blocks constituting the macroblock image #23 to DCT, and quantizes DCT coefficients of individual blocks at quantization levels based on the QP values supplied together with the macroblock image #23. Then, the MB encoding section 24 subjects the data obtained by quantization to a variable-length encoding process so as to generate the MB encoded data #24.

The variable-length code multiplexing section 25 multiplexes the encoded side information #22 with the MB encoded data #24 to generate encoded data #1 and outputs the generated encoded data #1.

The MB decoding section 26 sequentially decodes the MB encoded data #24 corresponding to the inputted individual macroblocks so as to generate decoded images #26 corresponding to the individual macroblocks, and outputs the generated decoded images #26. The decoded images #26 are supplied to the frame memory 27.

The inputted decoded images #26 are stored in the frame memory 27. At the time of encoding a certain macroblock, decoded images corresponding to all macroblocks prior in raster scan order to the certain macroblock are stored in the frame memory 27.

(How to Determine Set of QP Difference Values and how to Generate QP Difference Value Table)

The method by which the side information determination section 21 determines the set of QP difference values for limiting QP values assignable to macroblocks may be any method. Specific examples thereof are as follows.

Example 1) Determine the set of QP difference values in which each QP difference value is $factor*(-1)^{j+1}*Ceil(j/2)$ ($j=1, 2, \ldots$).

Example 2) Determine the set of QP difference values in which each QP difference value is 0 or $(-1)^{j+1}*factor^{\{ceil(j/2)-1\}}$ ($j=1, 2, \ldots$).

Example 3) Determine the set of QP difference values in which each QP difference value is 0, 1, −1, or $factor*(-1)^{j+1}*Ceil(j/2)+3$ ($j=3, 4, \ldots$).

In any of the Examples 1 to 3 above, a slice type is judged with respect to each slice, and when the slice type is I slice, the set of QP difference values is determined so that the factor (predetermined value)=3, when the slice type is P slice, the set of QP difference values is determined so that the factor=2, and when the slice type is B slice, the set of QP difference values is determined so that the factor (predetermined value)=1. Hereinafter, the respective methods in Examples 1 to 3 are identified by method=0, 1, 2.

The following explains a specific example of how to generate a QP difference value table when the set of QP difference values is determined according to the Examples 1 to 3.

In a case where the set of QP difference values is determined according to the Example 1, a QP difference value table to be included in a slice header of a P slice is one shown in (b) of FIG. 8 for example.

That is, the QP difference value table which the side information determination section 21 incorporates into the slice header is a table in which indices $mb\_qp\_delta\_index[j]=(-1)^{j+1}*Ceil(j/2)$ are related to individual QP difference values $mb\_qp\_delta[j]=2*(-1)^{j+1}*Ceil(j/2)$ ($j=0$-8). In the case of the Example 1, the relation between the QP difference value and the index is QP difference value=factor*index.

In the case where the set of QP difference values is determined according to the Example 2, the QP difference value table to be incorporated into the slice header of the P slice is one shown in (c) of FIG. 8 for example.

That is, the QP difference value table which the side information determination section 21 incorporates into the slice header is a table in which an index 0 is related to a QP difference value 0 and indices $mb\_qp\_delta\_index[j]=(-1)^{j+1}*Ceil(j/2)$ are related to individual QP difference values $mb\_qp\_delta[j]=(-1)^{j+1}*2^{\{Ceil(j/2)-1\}}$ ($j=1$-8).

In the case where the set of QP difference values is determined according to the Example 3, the QP difference value table which the side information determination section incorporates into the slice header is a table in which indices 0, 1, and −1 are related to QP difference values 0, 1, and −1, and indices $mb\_qp\_delta\_index[j]=(-1)^{j+1}*Ceil(j/2)+3$ ($j=3, \ldots$) are related to individual QP difference values $mb\_qp\_delta[j]=(-1)^{j+1}*factor^{\{Ceil(j/2)-1\}}$ ($j=3, \ldots$).

As described above, it is desirable that the side information determination section 21 generates a QP difference value table in which individual QP difference values are related to indices whose absolute values are smaller than absolute values of the QP difference values (table shown in (a) to (c) of FIG. 8). The QP difference value table generated by the side information determination section 21 should have at least the characteristics below.

That is, the QP difference value table may be any table as long as the amount of codes of all quantization data outputted when individual indices are transformed into code numbers and subjected to a quantization process based on unary binarization is smaller than the amount of codes of all quantization data outputted when individual QP difference values are transformed into code numbers and are subjected to a quantization process based on unary binarization. For example, the QP difference value table may be a table in which QP difference values and indices are related to each other one by one, and the total of absolute values of individual indices is smaller than the total of absolute values of individual QP difference values.

(Operations of Side Information Determination Section 21 and Side Information Encoding Section 22)

Figure 2:
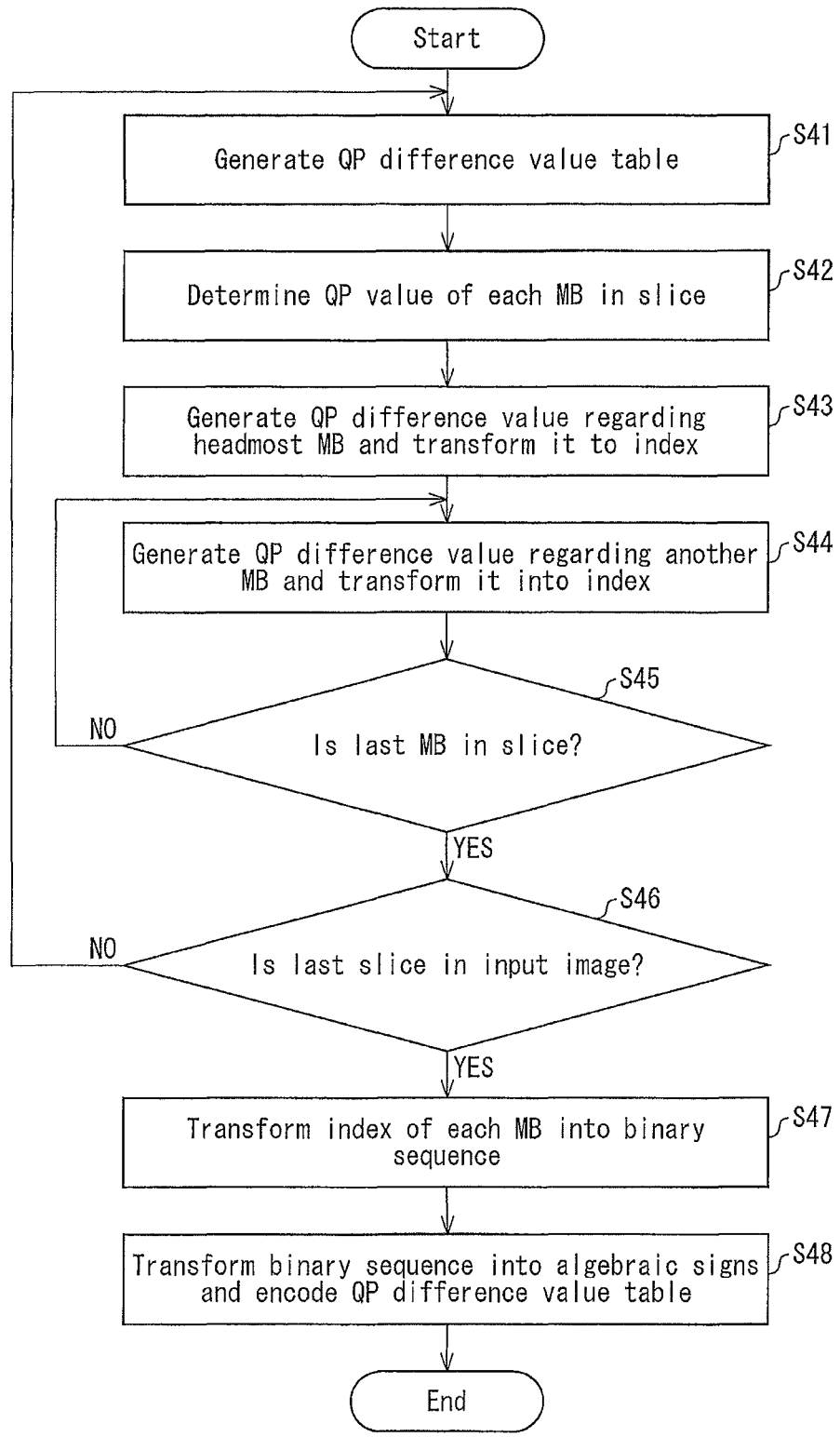
FIG. 2 is a flowchart showing operations of a side information generation section and a side information encoding section that are included in the video encoding device in accordance with the embodiment.

Next, an explanation is made as to operations of side information determination section 21 and side information encoding section 22 with reference to FIG. 2. That is, an explanation is made as to operations of individual sections from the time when the video encoding device 2 generates a QP difference value table with respect to each slice (as shown in (a) of FIG. 7) included in the input image #100 to the time when the video encoding device 2 encodes indices stored in a macroblock layer of each macroblock MBi in the slice.

FIG. 2 is a flow chart showing the flow of the above operations.

As shown in FIG. 2, the side information determination section 21 generates a QP difference value table corresponding to the slice type of a slice included in the input image #100, and incorporates the QP difference value table into a corresponding slice header in the side information #21 (step S41).

Next, the side information determination section 21 determines the QP value of the macroblock MBi ($i=1, 2, \ldots$) in the slice (step S42).

Specifically, the side information determination section 21 temporarily sets the QP value of the macroblock MBi to be within the range defined by the H264/AVC standard. Then, the side information determination section 21 judges whether the value (temporal QP difference value) obtained by subtracting the already determined QP value of the macroblock MBi−1 from the temporarily set QP value of the macroblock MBi is included as a QP difference value in the QP difference value table.

In a case where the side information determination section 21 judges that the temporal QP difference value is included in the QP difference table, the side information determination section 21 determines the temporarily set QP value as the QP value of the macroblock MBi. On the other hand, in a case where the side information determination section 21 judges that the temporal QP difference value is not included in the QP difference table, the side information determination section 21 determines, as the QP value of the macroblock MBi, a value obtained by adding one of a plurality of QP difference values included in the QP difference value table which one is closest to the temporal QP difference value to the QP value of the macroblock MBi−1 (when i=1, slice default QP value).

As described above, after determining the QP values of individual macroblocks, the side information determination section 21 subtracts the slice default QP value from the QP value of the headmost macroblock MB1 to obtain the QP difference value for the headmost macroblock MB1. Then, the side information determination section 21 refers to the QP difference value table generated in the immediately preceding step S41 and transforms the QP difference value to an index (step S43). The side information determination section 21 incorporates the obtained index into a corresponding macroblock layer in the side information #21.

Here, the QP difference value is transformed into the index by using the QP difference value table. In a case where a relation between the QP difference value and the index is defined by calculations such as four operations, transform is possible without using the QP difference value table. Hereinafter, a rule for setting transform of a QP difference value to an index by calculation or transform of an index to a QP difference value by calculation is referred to as a transform rule. For example, in the case of the Example 1, the transform rule is QP difference value=index×factor, and accordingly transform of a QP difference value into an index is possible by calculation without using the QP difference value table.

Furthermore, with respect to another macroblock MBi (i>1) for which QP difference value is not yet calculated, the side information determination section 21 calculates the QP difference value for the macroblock MBi by subtracting the QP value of the macroblock MBi−1 from the QP value of the macroblock MBi. Then, the side information determination section 21 transforms the QP difference value into an index by referring to the QP difference value table generated in the immediately preceding step S41 (step S44). The side information determination section 21 incorporates the obtained index into a corresponding macroblock layer in the side information #21.

After the step S44, the side information determination section 21 determines whether the macroblock treated in the step S44 is the last macroblock MBn in the slice (step S45). When the side information determination section 21 determines that the macroblock treated in the step S44 is not the last macroblock MBn in the slice, the process goes back to the step S44. On the other hand, when the side information determination section 21 determines that the macroblock treated in the step S44 is the last macroblock MBn in the slice, the process goes to the step S46.

The side information determination section 21 judges whether a slice which has not been subjected to treatments in the steps S41 to S44 exists in the input image #100 or not (step S46). When the side information determination section 21 judges that such a slice exists, the side information determination section 21 subjects the slice which has not been subjected to the treatments in the steps S41 to S44 to the treatments in the steps S41 to S44. On the other hand, when the side information determination section 21 judges that such a slice does not exist, the side information determination section 21 supplies, to the side information encoding section 22 and the MB setting section 23, the side information #21 whose macroblock layer includes indices and whose slice header includes a QP difference value table. Then, the process goes to the step S47.

With respect to the indices in individual macroblock layers in the side information #21, the side information encoding section 22 to which the side information #21 has been inputted transforms the indices into code numbers and carries out a binarization process on the input code numbers based on unary binarization. That is, an index whose absolute value is n is transformed into a binary sequence with a length of 2n or 2n+1 (i.e. binary sequence with a length corresponding to the size of the absolute value of the index) based on the table shown in (a) of FIG. 9 (step S47).

Furthermore, the side information encoding section 22 transforms binary sequences having been stored in individual macroblock layers in the process of the step S47 into algebraic signs, and encodes the QP difference value tables included in individual slice headers in the side information #21 (step S48). The side information encoding section 22 carries out an encoding process on the whole of the side information #21 (including the process of S48) and then supplies the encoded side information #22 to the variable-length code multiplexing section 25.

An explanation was made above as to the operations of the side information determination section 21 and the side information encoding section 22. Here, an explanation is made as to the operation of the MB setting section 23 to which the side information #21 is inputted.

As described above, the MB setting section 23 divides the input image #100 into a plurality of slices, and divides each slice into a plurality of macroblocks. Then, the MB setting section 23 sequentially supplies the macroblock images #23 regarding individual macroblocks together with QP values regarding the macroblock images #23 to the MB encoding section 24.

The MB setting section 23 calculates, based on the input side information #21, the QP value to be supplied to the MB encoding section 24 as follows.

That is, the MB setting section 23 refers to: an index included in a macroblock layer corresponding to the macroblock image #23; and a QP difference value table included in a slice header corresponding to a slice partially constituted by the macroblock image #23.

Then, the MB setting section 23 refers to a QP difference value related to the referred index in the QP difference value table. Furthermore, the MB setting section 23 regards, as a QP value to be supplied to the MB encoding section 24, a value obtained by adding the QP difference value to the QP value for the macroblock image #23 which value was supplied to the MB encoding section 24 immediately before.

The MB encoding section 24 for quantizing and encoding the macroblock image #23 based on an input QP value and members ranging from the variable-length code multiplexing section 25 to the frame memory 27 operate in accordance with the H264/AVC standard, and accordingly details thereof are omitted here.

(Encoding of QP Difference Value Table)

The following specifically explains encoding of a QP difference value by the side information encoding section 22.

The side information encoding section 22 encodes the size of the QP difference value table (i.e. the number of indices (QP difference values) in the table) and individual QP difference values.

For example, in a case where the side information determination section 21 generates the QP difference value table as shown in (b) of FIG. 8, the side information encoding section 22 encodes the size 9 of the QP difference value table and individual QP difference values (−8, −6, . . . , 0, . . . , 6, 8). Alternatively, instead of encoding individual QP difference values, the side information encoding section 22 may encode a QP difference value corresponding to the index 0 as it is and as for other index, encode a difference obtained by subtracting, from said other index, a QP difference value of index smaller by 1 than said other index.

QP difference values or differences of the QP difference values may be encoded by unary binarization.

With reference to (a) and (b) of FIG. 10, an amount of codes when the QP difference value table shown in (b) of FIG. 8 is encoded based on unary binarization is described below for two cases: a case where individual QP difference values are encoded as they are, and a case where a QP difference value corresponding to the index 0 is encoded as it is and as for other index, a difference of a QP difference value corresponding to other index is encoded. mb_qp_delta [i] in (a) and (b) of FIG. 10 indicates a QP difference value of an index i. In (b) of FIG. 10, dd[i,i−1]=mb_qp_delta[i]−mb_qp_delta[i−1].

In the case where individual QP difference values are encoded as they are, a QP difference value mb_qp_delta[−4] (=−8) is transformed into a code number 16, so that the amount of codes of the QP difference value is 17 (see (a) of FIG. 10). Encoding of other QP difference values is made in the same manner, so that the total of the amount of codes of individual QP difference values is 85 bits.

In the case where a QP difference value corresponding to the index 0 is encoded as it is and as for other index, a difference of a QP difference value corresponding to other index is encoded, the QP difference value (mb_qp_delta[0]=0) is transformed into a code number 0 so that the amount of codes is 1. Furthermore, as for other index i, the difference dd[i, i−1]=2 of a QP difference value is transformed into a code number 3, so that the amount of codes is 4. Therefore, the total amount of codes is 29 bits.

Modification Example

Figure 3:
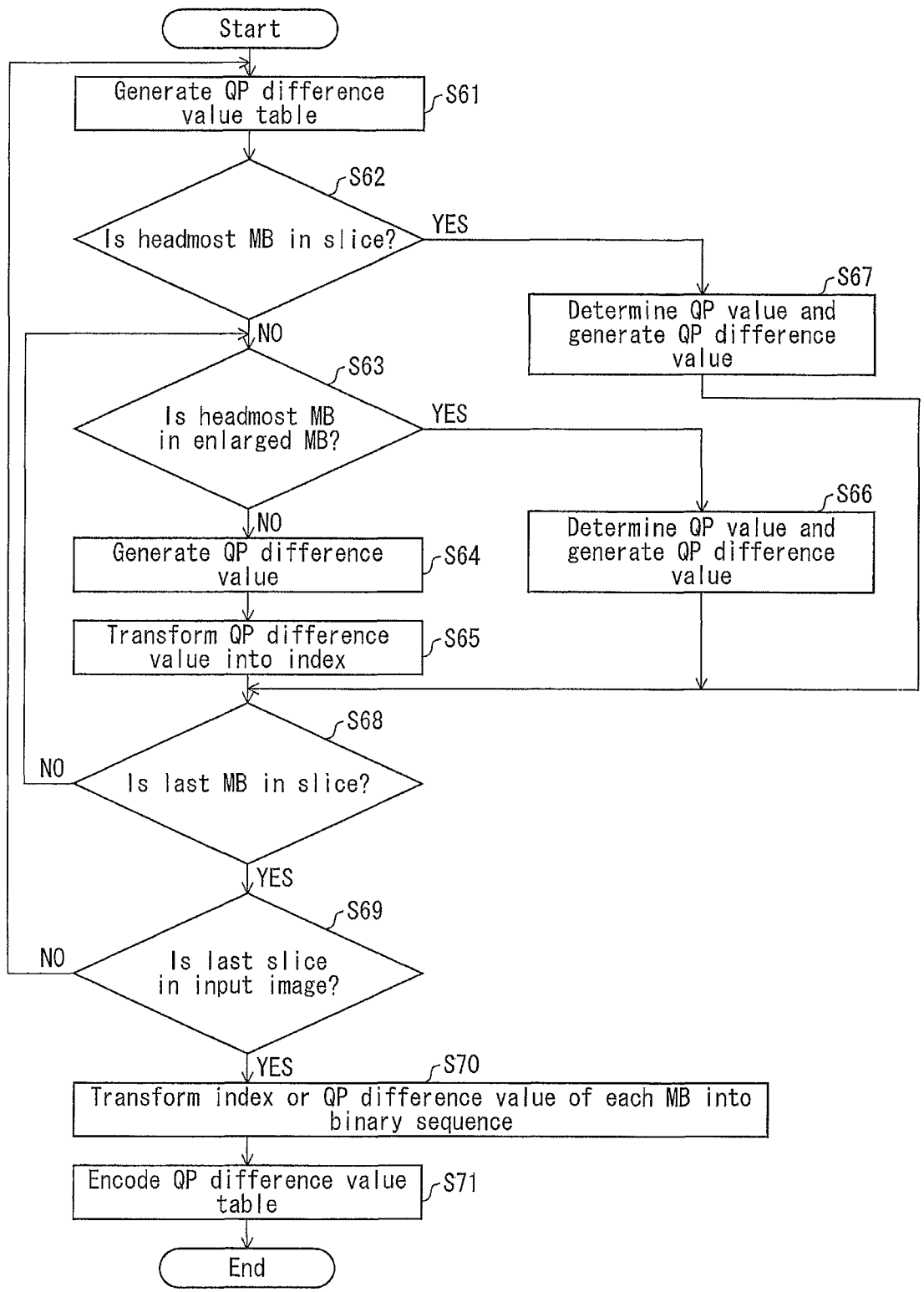
FIG. 3 is a flowchart showing another operations of the side information generation section and the side information encoding section that are included in the video encoding device in accordance with the embodiment.

The following explains a modification example of the operations of the side information determination section 21 and the side information encoding section 22 with reference to FIG. 3 and (b) of FIG. 7. FIG. 3 is a flow chart showing the operations of the side information determination section 21 and the side information encoding section 22 of the present Modification Example. (b) of FIG. 7 is a view showing a slice constituted by a plurality of enlarged macroblocks (second unit region) each constituted by a plurality of macroblocks. Here, each enlarged macroblock is configured such that all macroblocks therein have similar pixel characteristics.

In the present Modification Example, the video encoding device 2 determines the QP difference value with respect to each of a plurality of macroblocks included in an enlarged macroblock. A macroblock for which the QP difference value is determined is selected in raster scan order in each enlarged macroblock. For example, QP difference values for four macroblocks in an enlarged macroblock LMB1 are determined in the order of MB1, MB2, MB3, and MB4.

The video encoding device 2 carries out the above process with respect to each of the plurality of enlarged macroblocks in the slice. The enlarged macroblock to be subjected to the above process is selected in raster scan order in the slice. For example, a plurality of enlarged macroblocks in a slice in (b) of FIG. 7 are subjected to the above process in the order of enlarged macroblocks LMB1, LMB2, LMB3, . . . . As is seen from (b) of FIG. 7 and the above explanation, the number i in the sign MBi (i=1, 2, . . . ) assigned to the macroblock in the drawing indicates the order by which the macroblock is selected in the slice.

In the present Modification Example, the video encoding device 2 assigns a QP value to a headmost macroblock (specific unit region) in an enlarged macroblock by a method based on the H264/AVC standard (hereinafter, the QP value of the headmost macroblock is also referred to as $QP_{head}$). The video encoding device 2 transforms the QP difference value directly into a code number without transforming the QP value into an index, and transforms the code number into a binary sequence by unary binarization.

On the other hand, with respect to macroblocks other than the headmost macroblock in one enlarged macroblock, the video encoding device 2 transforms the QP difference value for the QP value assigned to the headmost macroblock in that enlarged macroblock into an index based on the QP difference value table shown in (e) of FIG. 8. Then, the video encoding device 2 transforms the index into a code number and transforms the code number into a binary sequence by unary binarization.

As is seen from (e) of FIG. 8, in the present Modification Example, the number of QP values assignable to macroblocks other than the headmost macroblock (three QP values of $QP_{head}-2$, $QP_{head}$, $QP_{head}+2$) is smaller than the number of QP values assignable to individual macroblocks in the above Embodiment (thirteen in the case of using the table shown in (a) of FIG. 8 and nine in the case of using the tables shown in (b) to (d) of FIG. 8. Furthermore, in the present Modification Example, the maximum value of the absolute value of the QP difference value that can be determined for a macroblock other than the headmost macroblock is 2 which is a predetermined number close to 0.

It is deemed that since individual macroblocks in the enlarged macroblock have similar image characteristics, assigning substantially a constant QP value to individual macroblocks as above hardly causes deterioration in quality of macroblock images, increase in the amount of unnecessary codes etc. due to assignment of improper QP values. Furthermore, downsizing of the QP difference value table results in a merit that the amount of codes for encoding the QP difference value table can be reduced, too, and the absolute value of the index being 1 at most results in a merit that the amount of codes of a binary sequence into which the index has been transformed is 2 or less.

The following explains the operations of the side information determination section 21 and the side information encoding section 22 of the Modification Example with reference to FIG. 3.

As shown in FIG. 3, the side information determination section 21 generates a QP difference value table as shown in (e) of FIG. 8, and incorporates the QP difference value table into a corresponding slice header in the side information #21 (step S61).

Individual macroblocks selected in raster scan order from a plurality of macroblocks constituting the whole of a target enlarged macroblock (e.g. LMB1) are subjected to the processes of S62 to S68 below in the order of selection (e.g. the order of MB1, MB2, MB3, and MB4). Furthermore, the target macroblocks are selected in raster scan order (the order of LMB1, LMB2 . . . ) from a plurality of enlarged macroblocks constituting the whole of a slice.

In the step S62, the side information determination section 21 judges whether the selected macroblock MBi is a headmost macroblock MB1 in a slice.

When the side information determination section 21 judges that the selected macroblock MBi is the headmost macroblock MB1 (YES in step S62), the side information determination section 21 determines the QP value of the macroblock MB1 by a method based on the H264/AVC standard. Then, the side information determination section 21 causes the QP difference value obtained by subtracting a slice default QP value from the determined QP value to be stored in a corresponding macroblock layer (step S67), and the process goes to the step S68.

On the other hand, when the side information determination section 21 judges that the selected macroblock MBi is not the headmost macroblock MB1 (NO in step S62), the side information determination section 21 judges whether the selected macroblock MBi is a headmost macroblock in one of other enlarged macroblocks (MB5, MB9 etc.) (step S63).

When the side information determination section 21 judges that the selected macroblock MBi is a headmost macroblock in an enlarged macroblock (YES in step S63), the side information determination section 21 determines the QP value of the macroblock MBi by a method based on the H264/AVC standard. Then, the side information determination section 21 causes the QP difference value obtained by subtracting the QP value determined for the macroblock MBi−1 from the determined QP value for the macroblock MBi to be stored in a corresponding macroblock layer (step S66), and the process goes to the step S68.

On the other hand, when the side information determination section 21 judges that the selected macroblock MBi is not a headmost macroblock in an enlarged macroblock (NO in step S63), the side information determination section 21 determines the QP difference value of the macroblock (step S64).

Specifically, the side information determination section 21 temporarily sets the QP value of the macroblock based on the H264/AVC standard. Then, the side information determination section 21 subtracts, from the temporarily set QP value, a QP value of a headmost macroblock included in the same enlarged macroblock as the macroblock is included in to obtain a temporal QP difference value, and judges whether the temporal QP difference value is included as a QP difference value in the QP difference value table.

When the side information determination section 21 determines that the temporal QP difference value is included as a QP difference value in the QP difference value table, the side information determination section 21 determines the temporarily set QP value as the QP value of the macroblock MBi. On the other hand, when the side information determination section 21 determines that the temporal QP difference value is not included as a QP difference value in the QP difference value table, the side information determination section 21 determines, as the QP difference value of the macroblock MBi, a QP difference value closest to the temporal QP difference value out of the plurality of QP difference values included in the QP difference value table. That is, the number of candidates of QP difference values to be determined for macroblocks other than the headmost macroblock in the enlarged macroblock in the step S64 is smaller than the number of candidates of QP difference values to be determined for the headmost macroblock in the enlarged macroblock. A value obtained by adding the determined QP difference value to the QP value of the macroblock MBi−1 is determined as the QP value of the macroblock MBi.

The side information determination section 21 refers to the QP difference value table generated in the immediately preceding step S61, and transforms the QP difference value determined in the step S64 into an index. The side information determination section 21 incorporates the obtained index into a corresponding macroblock layer in the side information #21 (step S65), and the process goes to the step S68.

In the step S68, the side information determination section 21 judges whether the macroblock having been processed is the last macroblock in the slice. When the side information determination section 21 determines that the macroblock having been processed is not the last macroblock (NO in the step S68), the process goes to the step S62. On the other hand, when the side information determination section 21 determines that the macroblock having been processed is the last macroblock (YES in the step S68), the process goes to the step S69.

The side information determination section 21 judges whether a slice having not been subjected to the processes in the steps S61 to S68 exists in the input image #100 or not (step S69). When judging that such a slice exists, the side information determination section 21 subjects the slice to the process in the steps S61 to S68. On the other hand, when judging that such a slice does not exist, the side information determination section 21 supplies the side information #21 to the side information encoding section 22 and the MB setting section 23 and the process goes to the step S70.

The side information encoding section 22 receives the side information #21, and transforms indices or QP difference values included in individual macroblock layers in the side information #21 into code numbers, and subjects the code numbers to a binarization process based on unary binarization (step S70).

Furthermore, the side information encoding section 22 encodes QP difference value tables included in individual slice headers in the side information #21 (step S71). The side information encoding section 22 carries out an encoding process (including the process in S70) on the whole of the side information #21 and then supplies the encoded side information #22 to the variable-length code multiplexing section 25.

An explanation was made above as to the operations of the side information determination section 21 and the side information encoding section 22. Here, an explanation is made as to the operation of the MB setting section 23 to which the side information #21 is inputted.

On the basis of the input side information #21, the MB setting section 23 calculates a QP value to be supplied together with the macroblock image #23 to the MB encoding section 24.

That is, when the macroblock image #23 to be supplied is a macroblock other than a headmost macroblock in an enlarged macroblock, the MB setting section 23 refers to an index included in the macroblock layer corresponding to the macroblock image #23 and a QP difference value table included in a slice header corresponding to a slice partially constituted by the macroblock image #23. Then, the MB setting section 23 refers to the QP difference value related to the index which the MB setting section has referred to in the QP difference value table. Furthermore, the MB setting section 23 adds the QP difference value to the QP value regarding the macroblock image #23 supplied to the MB encoding section 24 just before, thereby obtaining a QP value to be supplied to the MB encoding section 24.

On the other hand, when the macroblock image #23 to be supplied is a headmost macroblock in an enlarged macroblock, the MB setting section 23 refers to a QP difference value included in a macroblock layer corresponding to the macroblock image #23. The MB setting section 23 adds the QP difference value to the QP value regarding the macroblock image #23 supplied to the MB encoding section 24 just before, thereby obtaining a QP value to be supplied to the MB encoding section 24.

<Additional Matters Regarding Video Encoding Device>

It was described above that it is desirable that the side information determination section 21 generates a QP difference value table in which individual QP difference values are related to indices whose absolute values are smaller than absolute values of the QP difference values as shown in (a) to (c) of FIG. 8. Alternatively, the side information determination section 21 may generate a table of (d) of FIG. 8 which is not designed as above. The table of (d) of FIG. 8 is generated as below.

That is, as described above, in the step S42, the side information determination section 21 determines, with respect to each of the macroblocks MB1 to MBn in the slice, the QP difference value for the macroblock out of the set of the QP difference values determined for the slice so as to determine the QP value of the macroblock.

The side information determination section 21 generates a table in which the most frequent value (0 in (d) of FIG. 8), the second frequent value (4 in (d) of FIG. 8), the third frequent value (−6 in (d) of FIG. 8) . . . which are set based on the n determined QP difference values are related to indices 0, 1, −1, . . . . That is, in the table, a more frequent QP difference value is related to an index with a smaller absolute value. Furthermore, individual frequencies, i.e. ratios of individual QP difference values included in a group consisting of n QP difference values are calculated by the side information determination section 21. In a case where QP difference value table is generated in such a manner that QP difference values with higher frequencies are given indices will smaller absolute values, the total sum of the absolute values of the QP difference values included in the QP difference value table may be equal to the total sum of the absolute values of the indices.

An explanation was made above as to the video encoding device 2 in accordance with the present Embodiment. However, the present invention is not limited to the above configuration.

(Additional Matter 1)

In the above Embodiment, the quantization unit region is a macroblock. However, the present invention is not limited to this. That is, although an explanation was made above as to a case where determination of a QP value, transform of a QP difference value into an index, binarization of an index, and quantization of an image by using the QP value are made with respect to each macroblock, such operations may be made not with respect to each macroblock but with respect to a unit larger than the macroblock or a unit smaller than the macroblock (i.e. with respect to each partition, each block of 8 pixels×8 lines, each block of 4 pixels×4 lines etc.).

In the above Embodiment, the table generation unit region is a slice. However, the present invention is not limited to this. That is, although an explanation was made as to a case where the QP difference value table is generated with respect to each slice, the QP difference value table may be generated with respect to a unit larger than the slice (with respect to each picture etc.) or a unit smaller than the slice (with respect to each macroblock etc.). In a case of generating the QP difference value table corresponding to the values of factor in each macroblock, for example, the macroblock type of a macroblock layer is referred to, and when the macroblock type is an intramacroblock, it may be determined that factor=3, and when the macroblock type is an intermacroblock, it may be determined that factor=2.

However, it should be noted that regardless of how the size of a table generation unit region and the size of a quantization unit region are determined, the table generation unit region must include a plurality of quantization unit regions.

Alternatively, the present invention may be arranged such that the QP difference value table is not generated with respect to each table generation unit region. That is, a predetermined QP difference value table is stored in a storage section (not shown), and the QP difference value table stored in the storage section is used instead of a QP difference value table generated with respect to each table generation unit region. In this case, it is unnecessary for the video encoding device 2 to encode the QP difference value table and output the encoded QP difference value table to the outside. This is because when the video decoding device 1 has the same QP difference value table, the video decoding device 1 can derive the QP difference value from the index after decoding side information encoded data #11a.

(Additional Matter 2)

In the above Embodiment, the slice type is determined with respect to each slice, the value of factor is determined according to the slice type, and the QP difference value table according to the value of factor is generated. Alternatively, the QP difference value table may be generated as follows.

That is, initially, the side information determination section 21 temporarily sets QP values of macroblocks MB1 to MBn included in a slice by a method based on the H264/AVC standard. Then, the side information determination section 21 calculates dispersion of the obtained n QP values, and determines the value of factor according to the size of dispersion. Specifically, for example, when dispersion is not less than $S_1$, it is determined that factor=3. When dispersion is not less than $S_2$ and less than $S_1$, it is determined that factor=2. When dispersion is less than $S_2$, it is determined that factor=1. Lastly, the side information determination section 21 generates a QP difference value table corresponding to the value of factor thus determined.

(Additional Matter 3)

In the above Embodiment, when the QP difference value table is encoded, individual QP difference values are encoded. Alternatively, the QP difference value table may be encoded as follows. That is, as shown by the QP difference value table of (b) of FIG. 8 and the QP difference value table of (c) of FIG. 8, when the QP difference value table determined by the value of factor and the size of the QP difference value table is encoded, the value of factor may be encoded instead of encoding individual QP difference values. In this case, the amount of codes of the QP difference value table is further reduced. As shown by the Examples 1 to 3, there are a plurality of methods for calculating the QP difference value table from the same factor. The present invention may be arranged to select and use one of the methods shown by the Examples 1 to 3. In this case, information necessary for determining the method for calculating the QP difference value table may be explicitly encoded. That is, both of method and factor may be encoded.

Information to be outputted as encoded data to the outside may be any information as long as the information relates individual QP difference values to indices one by one. The information may be encoded QP difference values or may be encoded values of factor. In a case where the range of an index registered in a QP difference value table is variable with respect to each slice, the information may include not only individual QP difference values or the values of factor but also the values of indices.

The video encoding device and the video decoding device may be arranged to each include a plurality of predetermined transform rules or a plurality of QP difference value tables and encodes a transform rule index (roughness-specifying flag) for switching the plurality of transform rules (or the plurality of QP difference value tables). In a case of encoding the transform rule index, there may be encoded a 0-2 transform rule index designed such that, for example, an index for identifying a transform rule mb_qp_delta=mb_qp_delta_index is 0, an index for identifying a transform rule indicated by the QP difference value table shown in (b) of FIG. 8 is 1, and an index for identifying a transform rule equivalent to a QP difference value table shown in (c) of FIG. 8.

The roughness-specifying flag for identifying the QP difference value table may be a binary flag. For example, a value of the roughness-specifying flag for identifying a QP difference value table equivalent to a transform rule mb_qp_delta=mb_qp_delta_index is set to 0, and a value of a roughness-specifying flag for identifying the QP difference value table shown in (a) of FIG. 8 is set to 1.

(Additional Matter 4)

In the above Embodiment, unary binarization is used in order to transform an index into a binary sequence. However, the present invention is not limited to this. Alternatively, in order to transform an index into a binary sequence, unary binarization or fixed-length binarization as shown in (b) of FIG. 9 may be used depending on the situation. Furthermore, a binary sequence obtained by these binarizations may be subjected to another encoding. For example, Context-based Adaptive Binary Arithmetic Coding (CABAC) defined in H. 264/AVC may be applied.

Specifically, the side information encoding section 22 may determine whether to use unary binarization or fixed-length binarization with respect to each slice. In this case, with respect to each macroblock in a slice, the side information encoding section 22 refers to an index stored in a corresponding macroblock layer. Then, the side information encoding section 22 may judge whether a ratio of a plurality of indices which the side information encoding section 22 has referred to including the value of an index i (i=0, 1, . . . ) is substantially constant (whether the difference between the maximum value and the minimum value of the ratio is not more than a predetermined threshold), and when the ratio is substantially constant, the side information encoding section 22 may use fixed-length binarization and when otherwise, the side information encoding section 22 may use unary binarization.

The length of a binary sequence obtained by fixed-length binarization depends on logarithm of the number of possible QP difference values with a radix of 2. For example, when the number of possible QP difference values is 7, the length of a binary sequence is 3. Therefore, in a case where the possible QP difference values are limited by using a QP difference value table, the length of the binary sequence is reduced compared with a case of not limiting QP difference values and so the amount of codes is reduced, too.

(Additional Matter 5)

In the present invention, a QP difference value of a quantization unit region of interest is obtained from a difference between a QP value of the quantization unit region of interest and a predetermined reference value. In the above Embodiment, the predetermined reference value is a QP value of a quantization unit region just before the quantization unit region of interest in the order of processing. However, the present invention is not limited to this. That is, the predetermined reference value may be a QP value of a quantization unit region adjacent to the quantization unit region the QP difference value of which is to be obtained (e.g. quantization unit region adjacent to the quantization unit region of interest to the left or to the above). Alternatively, the predetermined reference value may be a QP value of a quantization unit region close to the quantization unit region the QP difference value of which is to be obtained (i.e. quantization unit region positioned in a predetermined range from the quantization unit region of interest), or may be a value that changes with respect to each process unit larger than a quantization unit (e.g. slice default QP value). Alternatively, the predetermined reference value may be a specific constant (e.g. 0).

(Advantages of Video Encoding Device 2)

As described above, the video encoding device 2 sets the QP value of each macroblock in such a manner that the QP difference value of a pair of macroblocks with consecutive orders of encoding is one of n QP difference values. For example, the video encoding device 2 sets the QP value of the macroblock MB3 in such a manner that the QP difference value of the macroblock MB3 with respect to the macroblock MB2 is 1 which is one of nine QP difference values registered in the QP difference value table shown in (d) of FIG. 8: −9, −2, . . . , 3, and 8. Then, the video encoding device 2 transforms the QP difference value 1 of the macroblock MB3 with respect to the macroblock MB2 into an index 2 corresponding to the QP difference value 1 out of 9 indices.

Furthermore, the side information encoding section 22 generates a binary sequence having a length corresponding to the size of the absolute value of the index. For example, the side information encoding section 22 generates a binary sequence "1110" having a length of 4 from the index of 2, and generates a binary sequence "111110" having a length of 6 from the index 3.

The total of absolute values of n indices is smaller than the total of absolute values of n difference values. For example, in the QP difference value table shown in (d) of FIG. 8, the total of absolute values of 9 indices is 20, whereas the total of absolute values of 9 QP difference values is 34. Accordingly, transforming QP difference values of the macroblocks MB1 to MBn into corresponding indices and generating binary sequences having lengths corresponding to the sizes of absolute values of the indices provides, in general, a smaller total length of n binary sequences (i.e. smaller amount of codes) than conventionally generating, from QP difference values of the macroblocks MB1 to MBn, binary sequences having lengths corresponding to the sizes of absolute values of the QP difference values.

Consequently, the video encoding device 2 can reduce the amount of codes of quantization parameters compared with a conventional art.

(Video Decoding Device)

The following explains a configuration of the video decoding device (decoding device) 1 in accordance with the Embodiment with reference to FIGS. 4-10 and 12. The video decoding device 1 is a video decoding device a part of which uses the technique employed in the H264/AVC standard.

Schematically, the video decoding device 1 is a device which decodes encoded data #1 from the video encoding device 2 so as to generate and output a decoded image #2.

Figure 4:
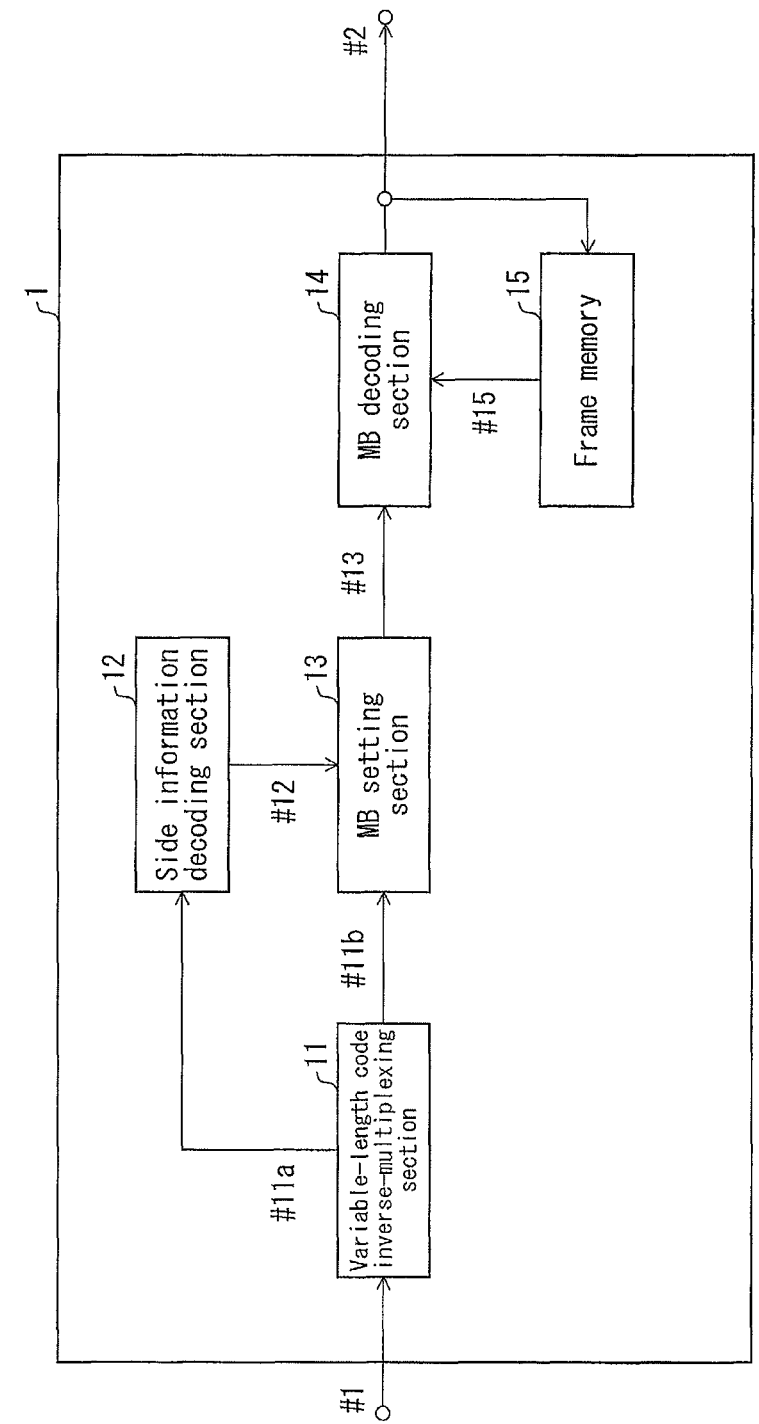
FIG. 4 is a block diagram showing a configuration of a video decoding device in accordance with the embodiment.

FIG. 4 is a block diagram showing a configuration of the video decoding device 1. As shown in FIG. 4, the video decoding device 1 includes a variable-length code inverse-multiplexing section 11, a side information decoding section 12, a MB setting section 13, a MB decoding section 14, and a frame memory 15.

The encoded data #1 inputted to the video decoding device 1 is inputted to the variable-length code inverse-multiplexing section 11. The variable-length code inverse-multiplexing section 11 reverse-multiplexes the input encoded data #1 so as to divide the encoded data #1 into side information encoded data #11a which is encoded data regarding side information and encoded data #11b which is encoded data regarding a picture, and outputs the side information encoded data #11a and the encoded data #11b to the side information decoding section 12 and the MB setting section 13, respectively.

The side information decoding section 12 decodes side information #12 from the side information encoded data #11a, and outputs the side information #12 to the MB setting section 13. The side information #12 includes a picture parameter set which is the set of parameters regarding the input image #100, a slice header which is header information with respect to each slice included in the input image #100, a macroblock layer which is the set of parameters with respect to each macroblock included in the slice, and the like.

The MB setting section 13 divides, based on the input side information #12, the encoded data #11b into a plurality of slices and divides each slice into individual encoded data #13 corresponding to individual macroblocks, and sequentially outputs the individual encoded data #13 to the MB decoding section 14. As mentioned later, the MB setting section 13 calculates, based on the side information #12, a QP value for reverse-quantizing the encoded data #13, and outputs the obtained QP value together with the encoded data #13 to the MB decoding section 14.

The MB decoding section 14 sequentially decodes and reverse-quantizes the encoded data #13 corresponding to individual inputted macroblocks (reverse-quantized unit region) so as to generate and output decoded images #2 corresponding to individual macroblocks. Furthermore, the decoded images #2 are outputted to the frame memory 15, too.

The decoded images #2 are stored in the frame memory 15. At the time of decoding a certain macroblock, in the frame memory 15, decoded images corresponding to all macroblocks preceding the certain macroblock in the order of processing.

At the time when all the macroblocks constituting the encoded data #11b have been subjected to a decoded image generation process by the MB decoding section 14 with respect to each macroblock, a process for generating the decoded images #2 corresponding to the encoded data inputted to the video decoding device 1 is completed.

(Regarding Operations of the Side Information Decoding Section 12 and the MB Setting Section 13)

Figure 5:
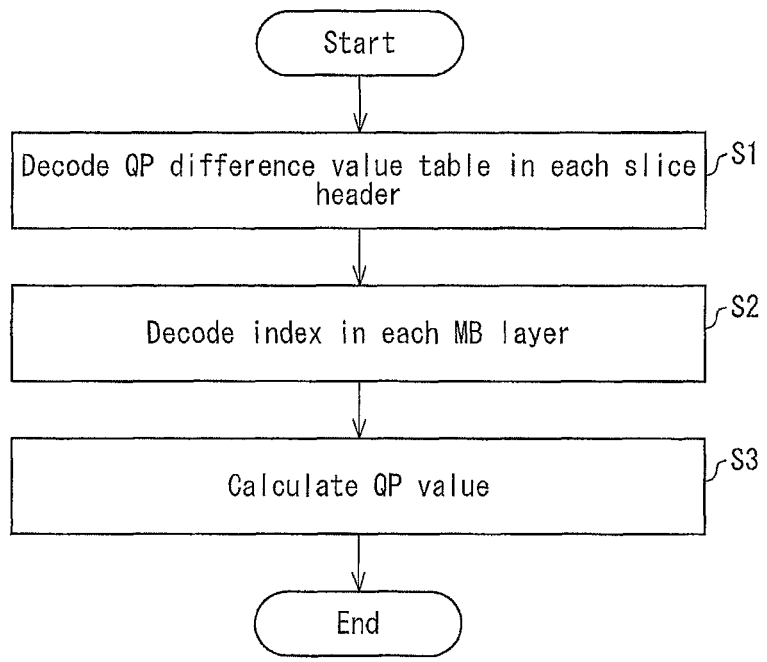
FIG. 5 is a block diagram showing operations of a side information decoding section and an MB setting section that are included in the video decoding device in accordance with the embodiment.

Next, an explanation is made as to the operations of the side information decoding section 12 and the MB setting section 13 with reference to FIG. 5. FIG. 5 is a flowchart showing the flow of the operations of the side information decoding section 12 and the MB setting section 13.

As shown in FIG. 5, the side information decoding section 12 decodes a QP difference value table included in each slice header from the side information encoded data #11a (step S1). Thereafter, the side information decoding section 12 takes out, from the side information encoded data #11a, an index included in each macroblock layer (step S2). Specifically, the side information decoding section 12 generates a binary sequence by arithmetic-decoding data having been arithmetic-encoded in the step S48 by the side information encoding section 22 of the video encoding device 2, and subjects the binary sequence to a reverse process of unary binarization (conversion of binary sequence into multivalued sequence) so as to take out an index. Then, the side information decoding section 12 supplies side information #12 including the QP difference value table and the index to the MB setting section 13.

Then, the MB setting section 13 calculates QP values to be sequentially outputted together with the encoded data #13 to the MB decoding section 14 (step S3).

Specifically, the MB setting section 13 refers to the QP difference value table included in a slice header of the side information #12 and to the index included in a macroblock layer (macroblock layer corresponding to macroblock indicated by the encoded data #13) of the side information #12. Here, the slice header of the side information #12 is a slice header corresponding to a slice partially constituted by a macroblock indicated by the encoded data #13. Then, the MB setting section 13 refers to a QP difference value related to the index in the QP difference value table, and calculates a QP value from the QP difference value.

The MB decoding section 14 for decoding the input encoded data #13 and reverse-quantizing the decoded data based on a QP value inputted together with the encoded data #13, and the frame memory 15 operate in accordance with the H264/AVC standard, and therefore details thereof are omitted here.

Modification Example

Figure 6:
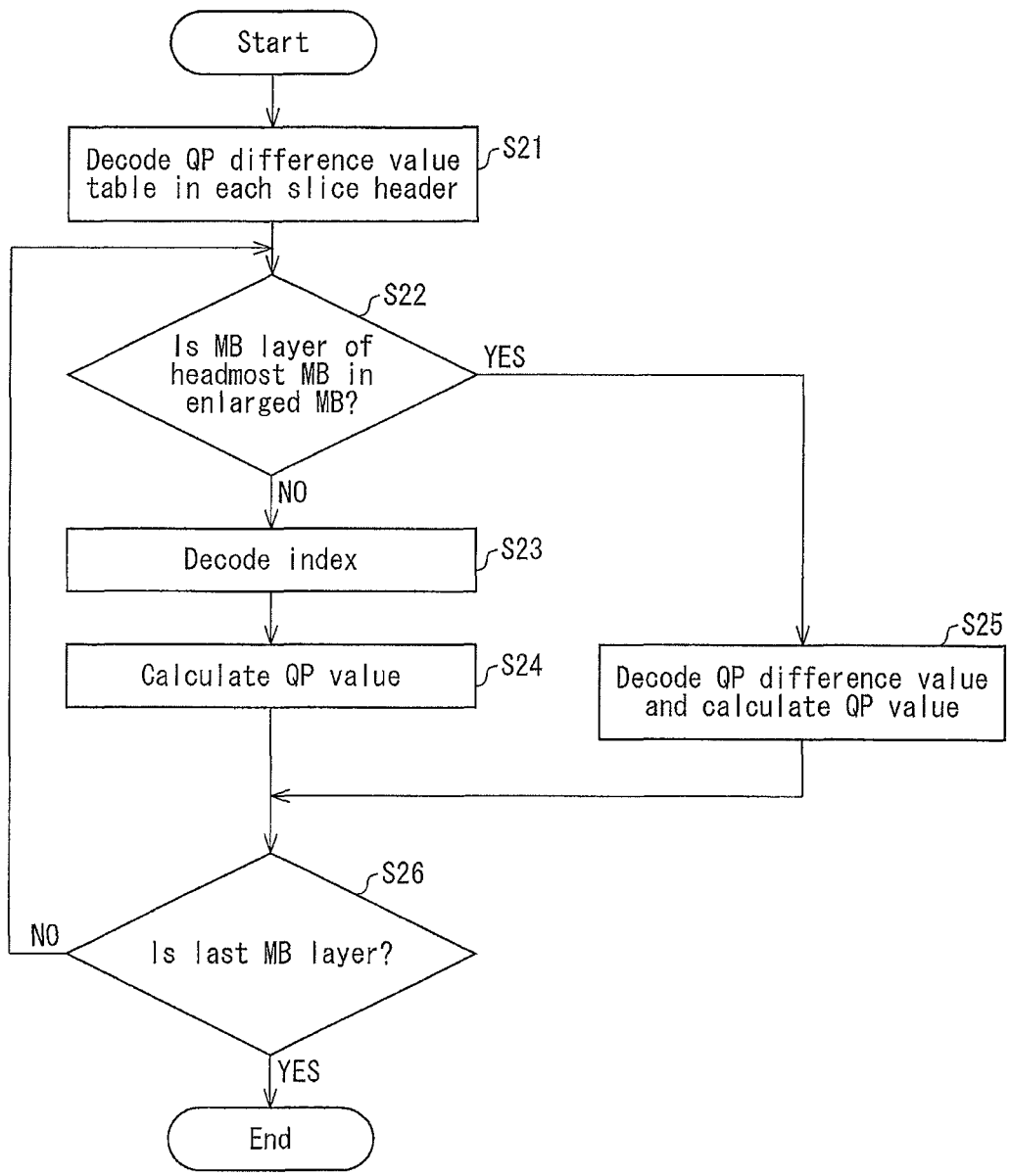
FIG. 6 is a block diagram showing another operations of the side information decoding section and the MB setting section that are included in the video decoding device in accordance with the embodiment.

The following explains a modification example of the operations of the side information decoding section 12 and the MB setting section 13 with reference to FIG. 6 and (b) of FIG. 7. FIG. 6 is a flowchart showing the operations of the side information decoding section 12 and the MB setting section 13.

The side decoding section 12 and the MB setting section operate in accordance with the present Modification Example when the side information determination section 21 and the side information encoding section 22 of the video encoding device 2 operate in accordance with the present Modification Example.

As shown in FIG. 6, the side information decoding section 12 decodes a QP difference value table included in each slice header from the side information encoded data #11a (step S21).

All macroblock layers included in the side information encoded data #11a are subjected to the processes of S22 and subsequent steps mentioned below. The macroblock layers subjected to the processes of S22 and subsequent steps are selected in the same order as the order for selecting macroblocks to be processed by the side information determination section 21 of the video encoding device 2. In a case of the slice shown in (b) of FIG. 7, the macroblock layer corresponding to the macroblock MBi is subjected to S22 and subsequent steps at the i-th order.

The side information decoding section 12 judges whether the selected macroblock layer is a macroblock layer of the headmost macroblock (specific unit region) in an enlarged macroblock (second unit region) (step S22).

When the side information decoding section 12 judges that the selected macroblock layer is not a macroblock layer of the headmost macroblock (NO in step S22), the side information decoding section 12 takes out an index included in the macroblock layer from the side information encoded data #11a (step S23). Specifically, the side information decoding section 12 subjects the binary sequence generated in the step S70 by the side information encoding section 22 of the video encoding device 2 to a reverse process of unary binarization (conversion of binary sequence into multivalued sequence) so as to take out an index. Then, the side information decoding section 12 supplies the side information #12 including the QP difference value table and the index to the MB setting section 13.

Furthermore, the MB setting section 13 calculates a QP value to be outputted together with the encoded data #13 to the MB decoding section 14 (step S24).

Specifically, the MB setting section 13 refers to the QP difference value table included in the slice header of the side information #12 and the index included in the macroblock layer. Then, the MB setting section 13 refers to a QP difference value related to the index in the QP difference value table, and calculates a QP value from the QP difference value by a method based on the H264/AVC standard.

On the other hand, when the side information decoding section 12 judges that the selected macroblock layer is a macroblock layer of the headmost macroblock (YES in step S22), the side information decoding section 12 takes out a QP difference value included in the macroblock layer from the side information encoded data #11a, and the MB setting section 13 calculates a QP value (step S25). Specifically, the side information decoding section 12 takes out a QP difference value corresponding to a multivalued integer obtained by subjecting the binary sequence generated in the step S70 by the side information encoding section 22 of the video encoding device 2 to a reverse process of unary binarization (conversion of binary sequence into multivalued sequence). Then, the side information decoding section 12 supplies the side information #12 including the QP difference value to the MB setting section 13, and the MB setting section 13 calculates a QP value from the QP difference value included in the side information #12 by a method based on the H264/AVC standard.

When all the macroblock layers have been subjected to the processes of the steps S23 and S24 (or the process of the step S25) (YES in step S26), the process is finished. When there is a macroblock layer having not been subjected to the process (NO in step S26), the process goes to the step S22.

<Additional Matters Regarding Video Decoding Device>

An explanation was made above as to the video decoding device 1 in accordance with the present Embodiment. However, the present invention is not limited to the above.

(Additional Matter 1)

In the above Embodiment, the inverse-quantization unit region is a macroblock. However, the present invention is not limited to this. The reverse phase quantization unit region may be a unit region larger than a macroblock or smaller than a macroblock as long as the size of an inverse-quantization unit region is the same as the size of a quantization unit region in the video encoding device 2.

In the above Embodiment, the QP value for inverse-quantization of an image of each inverse-quantization unit region is calculated from the QP difference value. In this case, the QP difference value table in the slice header is referred to in order to obtain the QP difference value from the index. That is, the QP difference value tables to be referred to in order to obtain the QP difference value from the index are switched with respect to each slice. However, the decoding device of the present invention is not limited to this. The QP difference value tables to be referred to may be switched with respect to each unit region of the same size as the table generation unit region of the video encoding device 2.

(Additional Matter 2)

A specific process for decoding the QP difference value table may be as follows.

In a case where encoded data of the QP difference value table includes encoded data of individual QP difference values included in the QP difference value table, each QP difference value may be decoded by a reverse process of unary binarization.

Furthermore, in a case where the encoded data of the QP difference value table includes the value of factor and the size of the QP difference value table, these are decoded. In this case, the QP difference value table may be generated based on the decoded value of factor and the decoded size of the QP difference value table. That is, in a case where the size of the QP difference value table is 2n+1 and the value of factor is f, there may be generated a QP difference value table in which indices are set to be $-n, -n+1, \ldots, 0, \ldots, n-1$, and $n$, and the QP difference values corresponding to the indices, respectively, are set to $-1*f*n, -1*f*(n-1), \ldots, 0, f*(n-1)$, and $f*n$.

(Advantage of Video Decoding Device 1)

As described above, the video decoding device 1 carries out a process for setting quantization parameters regarding individual macroblocks constituting a decoded image. The side information decoding section 12 extracts binary sequence data regarding individual macroblocks from the encoded data #1. Then, the side information decoding section 12 generates indices corresponding to the length of binary sequences from the binary sequence data.

Then, the MB setting section 13 refers to the QP difference value table in which mutually different n indices are related to n QP difference values one by one, thereby specifying the QP difference values of individual macroblocks from the indices which the side information decoding section 12 has generated with respect to each of the macroblocks. Thereafter, the MB setting section 13 calculates QP values of individual macroblocks from the QP difference values by a method based on the H264/AVC standard.

Therefore, the video decoding device 1 subjects individual macroblocks to the inverse-quantization process using the calculated QP values, thereby generating a decoded image constituted by the macroblocks.

Second Embodiment (Encoded Data)

Initially, with reference to FIG. 13, an explanation is made as to encoded data which is generated by a video encoding device in accordance with each of Second Embodiment and subsequent embodiments and which is referred to by a video decoding device in accordance with each of Second Embodiment and subsequent embodiments. In the explanation below, a sign "4" of a video encoding device, a sign "3" of a video decoding device, and a sign "#4" of encoded data indicate the video encoding device in accordance with Second Embodiment, the video decoding device in accordance with Second Embodiment, and encoded data referred to in Second Embodiment, respectively. Encoded data referred to by video encoding devices and video decoding devices in accordance with Third Embodiment and subsequent embodiments can be understood by replacing the signs used in the following explanation with signs used in those embodiments.

(Configuration of Encoded Data)

With reference to FIG. 13, an explanation is made below as to a configuration example of encoded data #4 which is generated by the video encoding device 4 and which is decoded by the video decoding device 3. The encoded data #4 includes, for example, a sequence and a plurality of pictures constituting the sequence.

FIG. 13 shows structures of a picture layer and subsequent layers in the encoded data #4. (a) to (d) of FIG. 13 show a picture layer defining a picture PICT, a slice layer defining a slice S, a tree block layer defining a tree block TBLK, and a CU layer defining a coding unit (CU) included in the tree block TBLK.

(Picture Layer)

In the picture layer, a set of data to be referred to by the video decoding device 3 in order to decode a picture PICT which is to be processed (which may be hereinafter referred to as target picture) is defined. As shown in (a) of FIG. 13, the picture PICT includes a picture header PH and slices $S^1$ to $S_{NS}$ (NS indicates the total number of slices included in the picture PICT).

In the explanation below, when it is unnecessary to distinguish the slices $S_1$ to $S_{NS}$ from each other, the individual codes may be described while omitting subscripts of the codes. The same is applied to other data which is included in the encoded data #4 explained below and to which a subscript is added.

The picture header PH includes encoding parameters to be referred to by the video decoding device 3 in order to determine a method for decoding a target picture. For example, encoding mode information (entropy_coding_mode_flag) indicative of the mode of variable-length encoding which is used when the video encoding device 4 encodes is an example of an encoding parameter included in the picture header PH.

In a case where entropy_coding_mode_flag is 0, the picture PICT is encoded by CAVLC (Context-based Adaptive Variable Length Coding). In a case where entropy_coding_mode_flag is 1, the picture PICT is encoded by CABAC (Context-based Adaptive Binary Arithmetic Coding).

The picture header PH is also referred to as a picture parameter set (PPS).

FIG. 16 is a view showing syntax included in the picture parameter set. As shown in FIG. 16, the picture parameter set includes syntax log 2_min_delta_qualt_coding_unit_size_minus4. The video decoding device in accordance with the present embodiment generates MinDeltaQuantCodingUnitSize as size information by referring to the syntax.

A Descriptor u(1) shown in FIG. 16 indicates that syntax related to these descriptors is subjected to fixed codeword length coding by 1 bit, u(2) indicates that syntax related to this descriptor is subjected to fixed codeword length coding by 2 bit, and ue(v) indicates that syntax related to this descriptor is subjected to variable codeword length coding (the same is applicable to a syntax table below).

(Slice Layer)

In the slice layer, a set of data to be referred to by the video decoding device 3 in order to decode a slice S to be processed (which may be also referred to as target slice) is defined. As shown in (b) of FIG. 13, the slice S includes a slice header SH and tree blocks $TBLK_1$ to $TBLK_{NC}$ (NC indicates the total number of tree blocks included in the slice S).

The slice header SH includes encoding parameters to be referred to by the video decoding device 1 in order to determine a method for decoding a target slice. Slice type designating information (slice_type) for designating a slice type is an example of an encoding parameter included in the slice header SH.

Examples of the slice type that can be designated by the slice type designating information include (1) I slice which uses only intra-prediction in encoding, (2) P slice which uses single-direction prediction or intra-prediction in encoding, and (3) B slice which uses single-direction prediction, two-direction prediction, or intra-prediction.

Further, the slice header SH may include a filter parameter to be referred to by a loop filter (not shown) included in the video decoding device 1.

(Tree Block Layer)

In the tree block layer, a set of data to be referred to by the video decoding device 3 in order to decode a tree block TBLK to be processed (which may be also referred to as a target tree block) is defined.

The tree block TBLK includes a tree block header TBLKH and coding unit information $CU_1$ to $CU_{NL}$ (NL indicates the total number of coding unit information included in the tree block TBLK). Initially, an explanation is made below as to a relation between the tree block TBLK and the coding unit information CU.

The tree block TBLK is divided into partitions for specifying the size of a block for intra-prediction or inter-prediction and transform processes.

The partitions of the tree block TBLK are obtained by recursive quadtree division. A tree structure obtained by this recursive quadtree division is hereinafter referred to as a coding tree.

Hereinafter, a partition corresponding to a leaf which is a node at an end of the coding tree is referred to as a coding node. Since the coding node is a basic unit in a coding process, the coding node is hereinafter also referred to as a coding unit (CU).

That is, coding unit information (hereinafter referred to as CU information) $CU_1$ to $CU_{NL}$ is information corresponding to coding nodes (coding units) obtained by subjecting the tree block TBLK to recursive quadtree division.

Furthermore, a root of the coding tree is made to correspond to the tree block TBLK. In other words, the tree block TBLK is made to correspond to a top node of a quadtree structure recursively including a plurality of coding nodes.

The size of each encoding node is a half both in vertical and horizontal directions of the size of an encoding node to which that coding node directly belong (i.e. partition of a node which is superior by one layer to that encoding node).

The possible size of individual coding nodes depends on size designating information for a coding node and maximum hierarchical depth which are included in a sequence parameter set SPS of the encoded data #4. For example, in a case where the size of the tree block TBLK is 64×64 pixels and the maximum hierarchical depth is 3, the size of a coding node at a layer of the tree block TBLK or below that layer can be one of three kinds of sizes: 64×64 pixels, 32×32 pixels, and 16×16 pixels.

(Tree Block Header)

A tree block header TBLKH includes a coding parameter to be referred to by the video decoding device 3 in order to determine a method for decoding a target tree block. Specifically, as shown in (c) of FIG. 13, the tree block header TBLKH includes tree block dividing information SP_TBLK for designating a division pattern for individual CUs of the target tree block and a quantization parameter difference Aqp (qp_delta) for designating the size of a quantization step.

The tree block dividing information SP_TBLK is information indicative of a coding tree for dividing tree blocks. Specifically, the tree block dividing information SP_TBLK is information for designating the shape and the size of individual CUs included in the target tree block and the position of individual CUs in the target tree block.

The tree block dividing information SP_TBLK is not required to explicitly include the shape and the size of a CU.

For example, the tree block dividing information SP_TBLK may be a set of flags indicative of whether a target tree block as a whole or a partial region of the tree block is to be subjected to quadtree division or not (split_coding_unit_flag). In this case, the shape and the size of each CU can be specified by using the shape and the size of the tree block.

Furthermore, the quantization parameter difference Δqp is a difference qp–qp' between a quantization parameter qp in the target tree block and a quantization parameter qp' in a tree block which has been encoded just before the target tree block.

(Cu Layer)

In the CU layer, a set of data to be referred to by the video decoding device 3 in order to decode a CU to be processed (which is hereinafter also referred to as a target CU) is defined.

Here, prior to specifically explaining data included in the CU information CU, an explanation is made as to a tree structure of data included in CU. The coding node serves as a root node of a prediction tree (PT) and a transform tree (TT). The following explains the prediction tree and the transform tree.

In the prediction tree, a coding node is divided into one or a plurality of prediction blocks, and the positions and the sizes of individual prediction blocks are defined. In other words, the prediction block is one or a plurality of non-overlapping regions constituting the coding node. Furthermore, the prediction tree includes one or a plurality of prediction blocks obtained by the above division.

A prediction process is carried out with respect to each prediction block. Hereinafter, the prediction block serving as a unit of prediction is also referred to as a prediction unit (PU).

In general, there are two kinds for division in the prediction tree. One is intra-prediction and the other is inter-prediction.

In the case of intra-prediction, the division may be made based on 2N×2N (the same size as that of the coding node) or N×N.

In the case of inter-prediction, the division may be made based on 2N×2N (the same size as that of the coding node), 2N×N, N×2N, N×N or etc.

Furthermore, in the transform tree, a coding node is divided into one or a plurality of transform blocks, and the positions and the sizes of individual transform blocks are defined. In other words, the transform block is one or a plurality of non-overlapping regions constituting the coding node. Furthermore, the transform tree includes one or a plurality of transform blocks obtained by the above division.

Division in the transform tree includes assigning a region with a size equal to that of the coding node as a transform block, and recursive quadtree division like the division in the tree block.

A transform process is carried out with respect to the transform block. Hereinafter, the transform block serving as a unit of transform is also referred to as a transform unit (TU).

(Data Structure of CU Information)

Subsequently, an explanation is made as to specific contents of data included in CU information with reference to (d) of FIG. 13. As shown in (d) of FIG. 13, the CU information includes a skip flag SKIP, PT information PTI, and TT information TTI.

The skip flag SKIP is a flag for showing whether a skip mode is applied to a target PU or not. In a case where the skip flag SKIP is 1, i.e. the skip mode is applied to a target CU, the PT information PTI and the TT information TTI in the CU information are omitted. The skip flag SKIP is omitted in the I slice.

The PT information PTI is information regarding PT in CU. In other words, the PT information PTI is a set of information regarding one or a plurality of PUs included in PT and is referred to by the video decoding device 3 when generating a prediction image. As shown in (d) of FIG. 13, the PT information PTI includes prediction type information PType and prediction information PInfo.

The prediction type information PType is information for designating use of intra-prediction or use of inter-prediction as a method for generating a prediction image for a target PU.

The prediction information PInfo is constituted by intra-prediction information or inter-prediction information according to which prediction method the prediction type information PType designates. Hereinafter, PU to which intra-prediction is applied is also referred to as intra PU, and PU to which inter-prediction is applied is also referred to as inter PU.

Furthermore, the prediction information PInfo includes information for designating the shape, the size, and the position of a target PU. As described above, the prediction image is generated with respect to each PU as a unit. The prediction information PInfo is detailed later.

The TT information TTI is information regarding TT included in CU. In other words, the TT information TTI is a set of information regarding one or a plurality of TUs included in TT, and is referred to by the video decoding device 1 when decoding residual error data. Hereinafter, TU is also referred to as a block.

As shown in (d) of FIG. 13, the TT information TTI includes TT division information SP_TT for designating a division pattern for individual transform blocks in a target CU, and quantization prediction residual errors $QD_1$ to $QD_{NT}$ (NT indicates the total number of blocks included in the target CU).

Specifically, the TT division information SP_TT is information for determining the shape and the size of individual TUs included in the target CU and the position of individual TUs in the target CU. For example, the TT division information SP_TT can be realized by including information indicative of whether to divide a target node or not (split_transform_unit_flag) and information indicative of the depth of the division (trafoDepth).

Furthermore, in a case where the size of CU is 64×64, the size of individual TUs obtained by division can range from 32×32 pixels to 2×2 pixels.

The quantization prediction residual error QD is coding data generated by the video encoding device 4 carrying out processes 1 to 3 below on a target block to be processed.

Process 1: prediction residual error obtained by subtracting a prediction image from an encoding target image is subjected to DCT (Discrete Cosine Transform);

Process 2: transform coefficient obtained in the process 1 is quantized;

Process 3: transform coefficient quantized in the process 2 is subjected to variable codeword length coding.

The aforementioned quantization parameter qp indicates the size of a quantization step QP used by the video encoding device 2 when quantizing a transform coefficient (QP=$2^{qp/6}$).

(Prediction Information PInfo)

As described above, there are two kinds of the prediction information PInfo: the inter-prediction information and the intra-prediction information.

The inter-prediction information includes a coding parameter to be referred to by the video decoding device 3 when generating an inter-prediction image by inter-prediction. To be specific, the inter-prediction information includes inter PU division information for designating a division pattern for individual inter PUs of a target CU and inter-prediction parameters for individual inter PUs.

The inter-prediction parameter includes a reference image index, an estimated motion vector index, and motion vector residual error.

On the other hand, the intra-prediction information includes a coding parameter to be referred to by the video decoding device 3 when generating an intra-prediction image by intra-prediction. To be more specific, the intra-prediction information includes intra-PU division information for designating a division pattern for individual intra-PUs of a target CU and intra-prediction parameters for individual intra-PUs. The intra-prediction parameter is a parameter for designating an intra-prediction method (prediction mode) for individual intra-PUs.

Hereinafter, in Second Embodiment and subsequent embodiments, "TU" indicates a transform block at the bottom node of a transform tree. Furthermore, "LCU" indicates a CU at the top node of a coding tree.

(Video Decoding Device)

The video decoding device in accordance with the present embodiment is a device for decoding the encoded data #4 from the video encoding device 4 (which will be explained below) to generate the decoded image #3.

The following details the video decoding device in accordance with the present embodiment with reference to drawings.

Initially, an explanation is made as to a configuration of the video decoding device in accordance with the present embodiment with reference to FIG. 14. FIG. 14 is a block diagram showing the configuration of the video decoding device 3. As shown in FIG. 14, the video decoding device 3 includes a variable-length code inverse-multiplexing section 31, a side information decoding section 32, a CU setting section 33, a CU decoding section 34, and a frame memory 15.

The encoded data #4 inputted to the video decoding device 3 is inputted to the variable-length code inverse-multiplexing section 31. The variable-length code inverse-multiplexing section 31 reverse-multiplexes the input encoded data #4 so as to divide the encoded data #4 into side information encoded data #31a which is encoded data regarding side information and encoded data #31b which is encoded data regarding a picture, and outputs the side information encoded data #31a and the encoded data #31b to the side information decoding section 32 and the CU setting section 33, respectively.

The side information decoding section 32 decodes the side information encoded data #31a to generate side information #32, and outputs the side information #32 to the CU setting section 33.

When decoding the side information encoded data #31a, the side information decoding section 32 decodes encoded data of size information indicative of the size of a QP encoded unit region, thereby generating the size information as a part of the side information #32. Specifically, the side information decoding section 32 subjects log 2_min_delta_qualt_coding_unit_size_minus4 included in the side information encoded data #31a to calculation by equation 1 below, thereby generating MinDeltaQuantCodingUnitSize as the size information. In the equation 1, "<<" indicates left bit shift calculation.

[Mathematical Formula 1]

$$\text{MinDeltaQuautCodingUnitSize} = 1 << (\log 2\_min\_delta\_qualt\_coding\_unit\_size\_minus4+4) \quad \text{Formula 1}$$

Furthermore, when decoding the side information encoded data #31a, the side information decoding section 32 decodes encoded data of a QP difference value of each QP encoding unit region, thereby generating the QP difference value as a part of the side information #32.

More specifically, the side information decoding section 32 sequentially carries out a process below on individual CUs by referring to a coding_unit syntax (see FIG. 18) included in the encoded data #4. That is, when x-component and y-component of the upper left coordinates of a CU for which a skip flag (skip_flag) is to be referred to are equal to integer multiples of the size of a QP encoding unit region (MinDeltaQuantCodingUnitSize), the side information decoding section 32 sets a value of a flag indicative of whether decodable or not (deltaQuantAvail) to "true" indicative of a decodable state. Then, the side information decoding section 32 decodes the QP difference value at a time of decoding a CU other than the skip block while deltaQuant Avail indicates a decodable state. That is, when referring to a skip flag "0" while deltaQuantAvail is "true", the side information decoding section 32 decodes cu_qp_delta included in the coding_unit syntax, and sets the QP difference value of a CU for which the skip flag has been referred to to the value of decoded cu_qp_delta. Subsequently, the side information decoding section 32 sets the value of deltaQuantAvail to "false".

In a case where the value of deltaQuantAvail is "false", the side information decoding section 32 refers to a skip flag whose value is "0", and sets 0 to the QP difference value. The value of qp at CU decoded immediately before the CU for which the skip flag was referred to is used as qp for the CU for which the skip flag was referred to.

Alternatively, in consideration of a merge block which is a CU for which the same prediction parameter as that for an adjacent block, cu_qp_delta may be decoded as follows. With respect to each of one or more CUs constituting the whole of each QP encoding unit region, the side information decoding section 32 may refer to a skip flag of the CU and a merge flag of the CU in raster scan order. In this case, with respect to each QP encoding unit region, the side information decoding section 32 decodes, from cu_qp_delta, a QP difference value of a CU for which skip flag "0" and merge flag "0" are referred to firstly in the QP encoding unit region.

Specifically, the side information decoding section 32 may sequentially carry out a process below on individual CUs by referring to a coding_unit syntax (see FIG. 19) included in the encoded data #4. That is, when x-component and y-component of the upper left coordinates of a CU for which a skip flag (skip_flag) is to be referred to are equal to integer multiples of the size of a QP encoding unit region (MinDeltaQuantCodingUnitSize), the side information decoding section 32 sets a value of a flag indicative of whether decodable or not (deltaQuantAvail) to "true" indicative of a decodable state. Then, the side information decoding section 32 decodes cu_qp_delta at a time of decoding a CU which is neither a skip block nor a merge block. That is, when referring to both a skip flag "0" and a merge flag "0" while deltaQuantAvail is "true", the side information decoding section 32 decodes cu_qp_delta included in the coding_unit syntax, and sets the QP difference value of a CU for which the skip flag has been referred to to the value of decoded cu_qp_delta. Subsequently, the side information decoding section 32 sets the value of deltaQuantAvail to "false".

The side information decoding section 32 does not encode a QP difference value at the time of decoding a CU of a skip block or a merge block while deltaQuantAvail indicates "false". That is, when referring to a skip flag "1" while deltaQuantAvail indicates "false", or when referring to both a skip flag "0" and a merge flag "1" while deltaQuantAvail indicates "false", the side information decoding section 32 sets the QP difference value to 0. In this case, the value qp of a CU decoded immediately before the CU for which the skip flag is referred to is used as qp for the CU for which the skip flag is referred to.

As described above, as a result of the process by the side information decoding section 32, qp is set uniquely for each QP encoding unit region. qp set uniquely for each QP encoding unit region is used in common among CUs included in the QP encoding unit region.

In accordance with the input side information #32, the CU setting section 33 divides the encoded data #31b into a plurality of slices, divides each slice into a plurality of QP encoding unit regions, separates each QP encoding unit region into encoded data #33b corresponding to individual CUs, and outputs the encoded data #33b sequentially to the CU decoding section 34. Furthermore, the CU setting section 33 outputs, to the CU decoding section 34, a QP difference value #33a of each QP encoding unit region included in the side information #32 as well as the encoded data #33b corresponding to individual CUs in the QP encoding unit region.

The CU decoding section 34 sequentially decodes and reverse-quantizes the encoded data #33b corresponding to inputted individual CUs (reverse-quantized unit region) to generate decoded images #34 corresponding to individual CUs and outputs the decoded images #34. The decoded images #34 are outputted to the frame memory 15, too.

Specifically, when decoding and reverse-quantizing the encoded data #33b corresponding to a CU, the CU decoding section 34 obtains a QP value from the QP difference value #33a of the QP encoding unit region to which the CU belongs, and carries out an inverse-quantization process.

At a time when the decoded image generation process by the CU decoding section 34 with respect to each CU is completed for all CUs constituting the encoded data #31b, a process of generating the decoded image #3 corresponding to encoded data inputted to the video decoding device 3 is completed.

As described above, the video decoding device decodes encoded data of a QP difference value not with respect to each CU but with respect to each QP encoding unit region consisting of one or more CUs, and accordingly can generate a decoded image from encoded data with the smaller amount of codes than a conventional art.

Furthermore, a skip block which is a CU without residual error data does not require qp. In consideration of this, when the skip flag is "1", the QP difference value is not decoded, and only when the skip flag is "0", the QP difference value is decoded. This allows reducing the amount of codes of the QP difference value in encoded data.

Similarly with a skip block, also in a marge block in which a part of encoded data is omitted in order to reduce the amount of codes of the encoded data, a QP difference value is not decoded, thereby allowing reduction of the amount of codes of the QP difference value in the encoded data.

(Video Coding Device)

A video encoding device in accordance with the present embodiment carries out a process of dividing each LCU constituting the input image into a plurality of CUs (Coding Unit: quantization unit region) by using a coding_tree syntax described in JCTVT-403. As is seen from the coding_tree syntax, the dividing process is specifically a recursive process of dividing a CU at an i-th node into four CUs at an i+1 th node with a one-fourth size when split_coding_unit_flag of a CU at the i-th node is true. Therefore, the sizes of the plurality of CUs are not identical with each other in general.

Furthermore, the video encoding device is designed to encode, with respect to each QP encoding unit region (unit region) consisting of one or more CUs, a QP difference value regarding one CU at most belonging to the QP encoding unit region. Furthermore, the video encoding device is designed to encode size information indicative of the size of the QP encoding unit region.

That is, the video encoding device in accordance with the present embodiment does not encode a QP difference value with respect to each quantization unit region like the video encoding device in accordance with First Embodiment, but encodes a QP difference value with respect to each QP encoding unit region consisting of one or more quantization unit regions, thereby reducing the amount of codes of the QP difference value.

The thus encoded QP difference value of each QP encoding unit region and the thus encoded size information of each QP encoding unit region are transmitted to a later-mentioned video decoding device. Then, the video decoding device carries out inverse-quantization using a QP difference value common among quantization unit regions constituting one QP encoding unit region.

A region (third unit region) constituting the QP encoding unit region may be TU instead of CU.

The following details the video encoding device in accordance with the present embodiment with reference to drawings.

Initially, an explanation is made as to a configuration of a video encoding device 4 in accordance with the present embodiment with reference to FIG. 15. FIG. 15 is a block diagram showing a configuration of the video encoding device 4. As shown in FIG. 15, the video encoding device 4 includes a side information determination section 41, a side information encoding section 42, a CU setting section 43, a CU encoding section 44, a variable-length code multiplexing section 25, a CU decoding section 46, and a frame memory 27.

The side information determination section 41 determines side information in accordance with an input image #100, and outputs the determined side information as side information #41. The side information #41 (and later-mentioned side information #61, #81 etc. as well) includes a picture parameter set #7 which is a set of parameters regarding the input image #100, a slice header which is header information with respect to each slice included in the input image #100, CU information which is a set of parameters with respect to each CU included in a slice, TU information which is a set of parameters with respect to each TU included in a CU etc.

Specifically, the side information determination section determines the (longitudinal and lateral) size of a QP encoding unit region in accordance with a predetermined algorithm with respect to each slice (or each picture), and causes size information indicative of the size of the QP encoding unit region to be stored in a slice header (picture parameter set) of the side information #41.

Furthermore, the side information determination section 41 defines a QP encoding unit region constituting the input image #100 (or each slice) in accordance with size information for the QP encoding unit region in the picture parameter set (or slice header), and causes a QP difference value regarding one CU at most per each QP encoding unit region (hereinafter also referred to merely as "QP difference value of a QP encoding unit region") to be stored as a part of CU information of the CU in the side information #41.

The side information encoding section 42 encodes the side information #41 and outputs side information encoded data #42. The side information encoded data #42 is supplied to the variable-length code multiplexing section 25. When encoding the side information #41, the side information encoding section 42 encodes a QP difference value of each QP encoding unit region and the size information.

Specifically, the side information encoding section 42 applies logarithmic function having 2 as a base to the size of a QP encoding unit region to obtain a logarithmic function value and subtracts 4 from the logarithmic function value, thereby generating encoded data of size information. When a picture parameter set includes size information, encoded data of the picture parameter set is data shown in FIG. 16 for example (in FIG. 16, log 2_min_delta_qualt_coding_unit_size_minus4 indicates encoded data of size information).

The CU setting section 43 divides the input image #100 into a plurality of slices in accordance with the side information #41, and divides each slice into a plurality of CUs, and outputs CU images #43 regarding individual CUs. As mentioned above, individual CU images have different sizes in general.

Furthermore, the CU setting section 43 outputs CU images #43b regarding a plurality of CUs constituting one QP encoding unit region and a QP difference value #43a of the QP encoding unit region which is stored in the side information #41.

The CU encoding section 44 carries out DCT transformation of predictive residuals between sequentially input CU images #43b and a predicted image transmitted from a predicted image generation section (not shown) and quantizes DCT coefficients of the predictive residuals at quantization levels corresponding to QP values determined according to QP difference values #43a of QP encoding unit regions to which the CU images #43b belong. Then, the CU encoding section 44 subjects the data obtained by quantization to a variable-length encoding process to generate CU encoded data #44 and supplies the CU encoded data #44 to the variable-length code multiplexing section 25.

The CU decoding section 46 sequentially decodes the CU encoded data #44 corresponding to inputted CU images #43b, respectively, thereby generating and outputting decoded images #46 corresponding to CUs, respectively. The decoded images #46 are supplied to the frame memory 27.

The variable-length code multiplexing section 25 and the frame memory 27 have been already explained in First Embodiment and therefore explanations thereof are omitted here.

An explanation was made above as to the configuration of the video encoding device 4. An explanation is made below, with reference to FIG. 17, as to a specific process carried out by the side information determination section 41 and the side information encoding section 42 in order to encode one QP difference value at most with respect to each QP encoding unit region.

FIG. 17 is a view schematically showing a part of a QP encoding unit region (four QP encoding unit regions) defined by the side information determination section 41. Each of four square regions surrounded by a thick line in FIG. 17 is a QP encoding unit region, and twelve regions surrounded by a thin line is a CU. In FIG. 17, a CU with hatched lines is a CU whose QP difference value is to be encoded, and a CU with dots is a skip block.

The side information determination section 41 refers to, in a predetermined order (in the raster scan order in the present embodiment), a skip flag of each of at least one CU constituting the whole of each QP encoding unit region defined by the side information determination section 41. With respect to the QP encoding unit region, the side information determination section 41 calculates a QP value of a CU for which a skip flag "0" is referred to firstly in the QP encoding unit region, and outputs, as a part of the side information #41, a QP difference value between the QP value of that CU and a QP value referred to immediately before the QP value of that CU (or default QP value) to the side information encoding section 42.

For example, with respect to the encoding unit region at the upper right side of FIG. 17, since the CU positioned initially in the raster scan order is a skip block (CU whose skip flag value is "1"), the side information determination section 41 calculates the QP value of a CU with hatched lines positioned secondly in the raster scan order, and outputs a QP difference value between the QP value of that CU and a default QP value to the side information encoding section 42.

The side information encoding section 42 encodes, with respect to each QP encoding unit region, a QP difference value of one CU at most in the QP encoding unit region. The QP difference value is stored in the side information #41.

Specifically, the side information determination section 41 and the side information encoding section 42 sequentially subject individual CUs to a process below by using a coding unit syntax shown in FIG. 18. That is, when x-component and y-component of the upper left coordinates of a CU whose skip flag (skip_flag) is referred to are integer-multiples of the size of the QP encoding unit region (MinDeltaQuantCodingUnitSize), the side information determination section 41 sets the value of a flag indicative of whether encoding is possible or not (deltaQuantAvail) to "true". Then, when the side information determination section 41 refers to a skip flag "0" while the value of deltaQuantAvail is "true", the side information determination section 41 supplies, as a part of the side information #41, the QP difference value of the CU whose skip flag has been referred to, to the side information encoding section 42. The side information encoding section 42 subjects the QP difference value to an encoding process and sets the value of deltaQuantAvail to "false".

Alternatively, the side information determination section 41 may refer to a skip flag and a merge flag of each of at least one CU constituting the whole of each QP encoding unit region defined by the side information determination section 41. In this case, the side information determination section 41 calculates a QP value of a CU for which a skip flag "0" and a merge flag "0" are referred to firstly in the QP encoding unit region, and outputs, as a part of the side information #41, a QP difference value between the QP value of that CU and a QP value referred to immediately before the QP value of that CU (or default QP value) to the side information encoding section 42.

Specifically, the side information determination section and the side information encoding section 42 may sequentially subject individual CUs to a process below by using a coding unit syntax shown in FIG. 19. That is, when x-component and y-component of the upper left coordinates of a CU whose skip flag (skip_flag) is referred to are integer-multiples of the size of the QP encoding unit region (MinDeltaQuantCodingUnitSize), the side information determination section 41 sets the value of a flag indicative of whether encoding is possible or not (deltaQuantAvail) to "true". Then, when the side information determination section 41 refers to a skip flag "0" and a merge flag "0" at the same time while the value of deltaQuantAvail is "true", the side information determination section 41 supplies, as a part of the side information #41, the QP difference value of the CU whose skip flag has been referred to, to the side information encoding section 42. The side information encoding section 42 subjects the QP difference value to an encoding process and sets the value of deltaQuantAvail to "false".

As a result of the processes carried out by the side information determination section 41 and the side information encoding section 42, the variable-length code multiplexing section 25 receives, from the side information encoding section 42, side information encoded data #42 including encoded data of QP difference values of individual QP encoding unit regions and size information of the QP encoding unit regions determined with respect to each picture parameter set (each slice). Furthermore, the variable-length code multiplexing section 25 multiplexes CU encoded data #44 received from the CU encoding section 44 and the side information encoded data #42 to generate and output encoded data #4.

The side information determination section 41 may cause size information of the QP encoding unit region to be stored in a sequence parameter set instead of a slice header and a picture parameter set.

(Additional Matter)

The side information encoding section 42 of the video encoding device 4 applies logarithmic function having 2 as a base to the size of a QP encoding unit region to obtain a logarithmic function value and subtracts 4 from the logarithmic function value. However, the present invention is not limited to this.

That is, the side information encoding section 42 may encode the size of a QP encoding unit region relative to the size of an LCU. For example, in a case where the size of a QP encoding unit region is one-$2^n$ of the size of an LCU (max_coding_unit_width), the side information encoding section 42 may generate n as encoded data for size information.

In this case, the side information decoding section 32 of the video decoding device 3 subjects log 2_min_delta_qualt_coding_unit_size_to_lcu included in the side information encoded data #31a to an operation based on formula 2 below, and generates MinDeltaQuantCodingUnitSize as the size information. In the formula 2, ">>" indicates right bit shift operation.

[Mathematical Formula 2]

MinDeltaQuantcodingUnitSize=max_coding_unit_width>>log 2_min_delta_quant_unit_size_to_lcu    Formula 2

The method for encoding the size of a QP encoding unit region as a size relative to the size of an LCU is applicable to embodiments below.

Third Embodiment (Encoded Data)

A configuration of encoded data #6 in accordance with the present embodiment is substantially the same as the configuration of the encoded data #4 explained in Second Embodiment except that the encoded data #6 in accordance with the present embodiment includes a coding_unit syntax shown in FIG. 20 and a transform_tree syntax shown in FIG. 21. The coding_unit syntax shown in FIG. 20 and the transform_tree syntax shown in FIG. 21 will be explained together with a video decoding device and a video encoding device below.

(Video Decoding Device)

The video decoding device in accordance with the present embodiment has substantially the same configuration as that of the video decoding device 3 explained in Second Embodiment. The video decoding device in accordance with the present embodiment operates in basically substantially the same manner as the video decoding device 3 explained in Second Embodiment, thereby decoding the encoded data #6 to generate a decoded image #3. However, a QP difference value of each QP encoding unit region is not a part of QP information of the side information #32, but a part of TU information of the side information #32. Accordingly, a CU setting section 33 of the video decoding device 3 refers to TU information of each selection target TU which is included in the side information #32, thereby reading out a QP difference value of each QP encoding unit region.

The following explains this point more specifically.

A side information decoding section 32 included in the video decoding device in accordance with the present embodiment refers to, in the raster scan order, a skip flag and a residual data present flag (residualDataPresentFlag) of each of at least one CU constituting the whole of each QP encoding unit region. Here, the residual data present flag is a flag that becomes "true" when a CU includes at least one TU including at least one DCT coefficient which is not 0, and becomes "false" when otherwise.

By referring to a coding unit syntax shown in FIG. 20 and a transform_tree syntax shown in FIG. 21, the side information decoding section 32 sequentially subjects individual CUs to a process below. That is, as is seen from FIG. 20, when x-component and y-component of the upper left coordinates of a CU whose skip flag (skip_flag) is referred to are integer-multiples of the longitudinal and lateral size of a QP encoding unit region (MinDeltaQuantCodingUnitSize), the side information decoding section 32 sets the value of a flag indicative of whether decoding is possible or not (deltaQuantAvail) to "true". Then, when the side information decoding section 32 refers to a skip flag "0" while the value of deltaQuantAvail is "true", the side information decoding section 32 refers to the value of residualDataPresentFlag in the transform_tree syntax shown in FIG. 21. When the value of residualDataPresentFlag is "0", that is, when the TU does not include residual data, the side information decoding section 32 refers to the coding unit syntax with respect to next CU. When entropy_coding_mode_flag is 0, residualDataPresentFlag is determined depending on whether the value of cuv_yuv_root is or not. When cuv_yuv_root is other than 0, residualDataPresentFlag is "true", and when cuv_yuv_root is 0, residualDataPresentFlag is "false".

When entropy_coding_mode_flag is 0, residualDataPresentFlag is "true" if no_resisulal_data_flag is other than 0, and residualDataPresentFlag is "false" if no_resisulal_data_flag is 0.

On the other hand, when the value of residualDataPresentFlag is "1", that is, when the TU includes residual data, the side information decoding section 32 refers to the transform_tree syntax shown in FIG. 21 with respect to each TU constituting a CU of interest. Consequently, the side information decoding section 32 decodes cu_qp_delta of a TU (e.g. TU at the lower right end. Hereinafter also referred to as "selection target TU") which includes at least one DCT coefficient other than 0 and which is firstly decoded in a predetermined order (e.g. order opposite to raster scan order) out of TUs in the CU of interest, and sets the QP difference value of the firstly decoded TU to the value of the decoded cu_qp_delta. Thereafter, the side information decoding section sets the value of deltaQuantAvail to "false". The above process by the side information decoding section 32 uniquely determines qp with respect to each QP encoding unit region. qp uniquely determined with respect to each QP encoding unit region is used commonly for CUs included in the QP encoding unit region.

(Video Encoding Device)

The following details the video encoding device in accordance with the present embodiment with reference to drawings.

Like the video encoding device 4 in accordance with Second Embodiment, the video encoding device in accordance with the present embodiment divides each LCU constituting an input image into a plurality of CUs (Coding Unit: quantization unit region) by using a coding_tree syntax. Furthermore, unlike the video encoding device 4, the video encoding device in accordance with the present embodiment divides each CU into a plurality of transform units (TU) constituting a transform tree by using the coding_unit syntax shown in FIG. 20 and the transform_tree syntax shown in FIG. 21.

Furthermore, the video encoding device is designed to encode only at least a part of TUs constituting the whole of each QP encoding unit region determined according to a predetermined algorithm constituted by one or more TUs mentioned above. It should be noted that the video encoding device in accordance with the present embodiment encodes the QP difference value of the TU only when predictive residual of the TU is other than 0 (i.e. when a DCT coefficient other than 0 is present). Absence of the DCT coefficient other than 0 is equal to DCT coefficients of luminance components being 0 and DCT coefficients of color difference components of the TU being 0. Accordingly, unlike Second Embodiment, the video encoding device in accordance with the present embodiment can reduce a redundant process of encoding a QP difference value which is not necessary to encode.

The following explains the video encoding device 6 in accordance with the present embodiment with reference to FIG. 22. FIG. 22 is a block diagram showing a configuration of the video encoding device 6. As shown in FIG. 22, the video encoding device 6 includes a side information determination section 61, a side information encoding section 62, a CU setting section 43, a CU encoding section 44, a variable-length code multiplexing section 25, a CU decoding section 46, and a frame memory 27.

The CU setting section 43, the CU encoding section 44, the variable-length code multiplexing section 25, the CU decoding section 46, and the frame memory 27 have been already explained in First Embodiment or Second Embodiment. Accordingly, an explanation is made below as to the side information determination section 61 and the side information encoding section 62.

With respect to each of one or more CUs constituting the whole of each QP encoding unit region defined by the side information determination section 61, the side information determination section 61 refers to a skip flag of the CU and a residual data present flag (residualDataPresentFlag) of the CU in the raster scan order. Here, the residual data present flag is a flag which becomes "true" when a CU includes at least one TU including at least one DCT coefficient other than 0 and which becomes "false" when otherwise. With respect to each QP encoding region, the side information determination section 61 outputs, as a part of side information #61, a QP difference value #63a between a QP value of a CU whose skip flag "0" and residual data present flag "1" are referred to simultaneously for the first time in the QP encoding unit region and a default QP value, to the side information encoding section 62.

With respect to each QP encoding unit region, the side information encoding section 62 encodes the QP difference value received from the side information determination section 61 to generate encoded data #62.

Specifically, by using the coding unit syntax shown in FIG. 20 and the transform_tree syntax shown in FIG. 21, the side information determination section 61 and the side information encoding section 62 sequentially subject individual CUs to a process below. That is, as is seen from FIG. 20, when x-component and y-component of the upper left coordinates of a CU whose skip flag (skip_flag) is referred to are integer-multiples of the longitudinal and lateral size of a QP encoding unit region (MinDeltaQuantCodingUnitSize), the side information determination section 61 sets the value of a flag indicative of whether encoding is possible or not (deltaQuantAvail) to "true". Then, when the side information determination section 61 refers to a skip flag "0" while the value of deltaQuantAvail is "true", the side information determination section 61 brings up the transform_tree syntax shown in FIG. 21 and refers to the value of residualDataPresentFlag. When the value of residualDataPresentFlag is "0", the side information determination section 61 brings up the coding unit syntax with respect to the next CU.

On the other hand, when the value of residualDataPresentFlag is "1", the side information determination section 61 applies the transform_tree syntax shown in FIG. 21 to each TU constituting the CU of interest. Consequently, the side information determination section 61 calculates a QP difference value of a TU (e.g. TU at the lower right end. Hereinafter also referred to as "selection target TU") which includes at least one DCT coefficient other than 0 and which is firstly referred to in a predetermined order (e.g. order opposite to raster scan order) out of TUs in the CU of interest, and supplies the QP difference value of the selection target TU as a part of TU information to the side information encoding section 62. The side information encoding section 62 subjects the received QP difference value to an encoding process and sets the value of deltaQuantAvail to "false".

As a result of the processes carried out by the side information determination section 61 and the side information encoding section 62, the variable-length code multiplexing section 25 receives, from the side information encoding section 62, side information encoded data #62 including encoded data of QP difference values of individual QP encoding unit regions and size information of the QP encoding unit regions determined with respect to each picture (or each slice constituting the picture). Furthermore, the variable-length code multiplexing section 25 multiplexes CU encoded data #44 received from the CU encoding section 44 and the side information encoded data #62 to generate and output encoded data #6.

(Additional Matter)

The side information determination section 61 and the side information encoding section 62 may use a transform_tree syntax shown in FIG. 23 instead of the transform_tree syntax shown in FIG. 21.

That is, the side information determination section 61 supplies not only the QP difference value of the selection target TU but also the QP difference value of the TU which includes at least one DCT coefficient other than 0 and which is at the upper left end in the CU of interest as a part of TU information to the side information encoding section 62.

Furthermore, the side information determination section 61 and the side information encoding section 62 may use a transform_tree syntax shown in FIG. 24 instead of the transform_tree syntax shown in FIG. 21.

That is, when the value of residualDataPresentFlag of the CU of interest is "1", the side information determination section 61 may supply, as a part of CU information of the CU (i.e. TU at the uppermost node), the QP difference value of the CU to the side information encoding section 62.

Fourth Embodiment (Video Decoding Device)

A video decoding device in accordance with the present embodiment is a device for decoding encoded data #8 supplied from a video encoding device 8 to generate decoded images #7. An example of a coding unit syntax included in encoded data #7 is shown in FIG. 27.

The following details the video decoding device in accordance with the present embodiment with reference to drawings.

Initially, with reference to FIG. 25, an explanation is made as to a configuration of the video decoding device in accordance with the present embodiment. FIG. 27 is a block diagram showing the configuration of a video decoding device 7. As shown in FIG. 25, the video decoding device 7 includes a variable-length code inverse-multiplexing section 71, a side information decoding section 72, a CU setting section 73, a CU decoding section 74, a predicted image generation section 75, and a frame memory 15.

The encoded data #8 inputted to the video decoding device 7 is inputted to the variable-length code inverse-multiplexing section 71. The variable-length code inverse-multiplexing section 71 reverse-multiplexes the inputted encoded data #8 so as to divide the encoded data #7 into side information encoded data #71a which is encoded data regarding side information and encoded data #71b which is encoded data regarding a picture, and outputs the side information encoded data #71a and the encoded data #71b to the side information decoding section 72 and the CU setting section 73, respectively.

The side information decoding section 72 decodes the side information encoded data #71a to generate side information #72 and outputs the side information #72 to the CU setting section 73.

In the process for decoding the side information encoded data #71a, the side information decoding section 72 decodes encoded data of a prediction mode #88m of each CU, thereby generating the prediction mode #88m of each CU which serves as a part of side information #72.

In the process for decoding the side information encoded data #71a, the side information decoding section 72 decodes encoded data of size information of a first QP encoding unit region (unit region) and a second QP encoding unit region (fourth unit region) which data is included in the side information encoded data #71a, thereby generating the two pieces of size information as a part of the side information #72. Specifically, the side information decoding section 72 subjects log_2_min_delta_qualt_coding_unit_size_minus4 to an operation based on the formula 1 above, thereby generating MinDeltaQuantCodingUnitSize as size information of the first QP encoding unit region.

Furthermore, the side information decoding section 72 subjects log_2_min_intra_delta_qualt_coding_unit_size_minus4 included in the side information encoded data #71a to the MinIntraDeltaQuantCodingUnitSize as size information of the second QP encoding unit region.

The following specifically explains a process by the side information decoding section 72 for decoding a QP difference value 73a.

The side information decoding section 72 refers to the coding unit syntax shown in FIG. 27 and sequentially subjects individual CUs to a process below. That is, as is seen from FIG. 27, when x-component and y-component of the upper left coordinates of a CU whose skip flag (skip_flag) is referred to are equal to integer-multiples of the size of the first QP encoding unit region (MinDeltaQuantCodingUnitSize), the side information decoding section 72 sets the value of deltaQuantAail to "true".

The side information decoding section 72 refers to the values of individual skip flags, and when referring to a skip flag "0", the side information decoding section 72 sets a flag indicative of whether a QP difference value is decodable or not when a CU image is intra-coded (deltaQuantAvailIntra) to "true". Furthermore, when referring to the skip flag "0" of a CU while the value of deltaQuantAvail is "true", the side information decoding section 72 decodes cu_qp_delta included in the coding_unit syntax, and sets the value of decoded cu_qp_delta as the QP difference value of the CU whose skip flag has been referred to. Then, the side information decoding section 72 sets the values of deltaQuant Avail and deltaQuantAvailIntra to "false".

Furthermore, also when x-component and y-component of the upper left coordinates of a CU whose skip flag (skip_flag) is referred to are equal to integer-multiples of the size of the second QP encoding unit region (MinIntraDeltaQuantCodingUnitSize) and the value of deltaQuantAvailIntra is "true", the side information decoding section 72 decodes cu_qp_delta included in the coding_unit syntax, and sets the value of decoded cu_qp_delta as the QP difference value of the CU whose skip flag has been referred to.

In accordance with the input side information #72, the CU setting section 73 divides the encoded data #71b into a plurality of slices and divides each slice into encoded data #73b corresponding to individual CUs, and sequentially outputs the encoded data #73b to the CU decoding section 74. Furthermore, the CU setting section 73 outputs, in addition to the encoded data #73b, prediction modes #73m of individual CUs and QP difference values 73a of individual selection target CUs that are included in the side information #72 to the CU decoding section 74. Furthermore, the CU setting section 73 outputs the prediction modes #73m of individual CUs to the predicted image generation section 75.

The CU decoding section 74 sequentially decodes and reverse-quantizes the encoded data #73b corresponding to inputted CUs (inverse-quantization unit region), respectively, thereby generating and outputting decoded images #74 corresponding to the CUs, respectively. The decoded images #74 are also outputted to the frame memory 15.

Specifically, the CU decoding section 74 refers to the sizes of the first QP encoding unit region and the second QP encoding unit region that are stored in the inputted side information #72, and defines individual QP encoding unit regions constituting the whole region of a decoded image to be generated.

Then, the CU decoding section 74 determines QP difference values used in inverse-quantization of individual CUs as follows. That is, when a CU to be reverse-quantized is a selection target CU, the CU decoding section 74 obtains a QP value of the selection target CU from the QP difference value #73*b* of the selection target CU which is received from the CU setting section 73 and a QP value of a CU reversely quantized immediately before. Then, the CU decoding section 74 carries out inverse-quantization at a quantization level corresponding to the QP value of the selection target CU.

On the other hand, when the CU to be reverse-quantized is not a selection target CU, the CU decoding section 74 determines QP difference values used in inverse-quantization of the CU as follows. That is, when a prediction mode #73*m* of the CU which is received from the CU setting section 73 indicates an inter-prediction image, the CU decoding section 74 obtains a QP value of a CU to be reverse-quantized from a QP difference value #73*b* of a selection target CU in the first QP encoding unit region to which the CU belongs and a QP value of a CU reversely quantized immediately before. Then, the CU decoding section 74 carries out inverse-quantization at a quantization level corresponding to the QP value of the CU.

In contrast thereto, when a prediction mode #73*m* of the CU which is received from the CU setting section 73 indicates an intra-prediction image, the CU decoding section 74 obtains a QP value of a CU to be reverse-quantized from a QP difference value #73*b* of a selection target CU in the second QP encoding unit region to which the CU belongs and a QP value of a CU reversely quantized immediately before. Then, the CU decoding section 74 carries out inverse-quantization at a quantization level corresponding to the QP value of the CU.

The CU decoding section 74 carries out inverse-quantization as above and carries out DCT reverse-transform to generate predictive residual. Then, the CU decoding section 74 adds the predicted image #75 corresponding to the encoded data #73*b* which is received from the predicted image generation section 75 to the predictive residual to generate a decoded image #74.

In accordance with the prediction mode #73*m* transmitted from the CU setting section 73, the predicted image generation section 75 generates an intra-predicted image from the decoded image #74 stored in the frame memory 15 or calculates a motion vector using the reference image #74 stored in the frame memory 15 and carries out motion compensation based on the motion vector to generate an inter-predicted image. The predicted image generation section 75 outputs the generated predicted image #75 which is one of the intra-predicted image and the inter-predicted image.

At the time when the decoded image generation process per CU by the CU decoding section 74 has been made with respect to all CUs constituting the encoded data #71*b*, the process of generating the decoded image #7 corresponding to encoded data inputted to the video decoding device 7 is completed.

As described above, the video decoding device decodes encoded data of a QP difference value not with respect to each CU but with respect to only a selection target CU. Accordingly, it is possible to generate a decoded image from encoded data with a fewer amount of codes than a conventional video decoding device.

Furthermore, as described above, by introducing the deltaQuantAvailIntra flag, it is possible to prevent the side information determination section 81 from repeatedly supplying a QP difference value of the selection target CU to the side information encoding section 82.

(Video Encoding Device)

It is known that in a case where an input image includes a relatively large number of regions to be inter-encoded, even when quantization is made with higher accuracy of QP values due to increased number of QP difference values, a reduced amount of codes of prediction residual is smaller than an increased amount of codes of the QP difference values, resulting in decrease in encoding efficiency.

The moving image encoding device in accordance with the present embodiment is designed such that as an input image includes a relatively larger number of regions to be inter-encoded, the moving image encoding device encodes a relatively smaller number of QP difference values. That is, as an input image includes a relatively larger number of regions to be intra-encoded, the moving image encoding device encodes a relatively larger number of QP difference values.

With reference to drawings, the following details the moving image encoding device in accordance with the present embodiment.

Initially, an explanation is made as to a configuration of a video image encoding device 8 in accordance with the present embodiment with reference to FIG. 26. FIG. 26 is a block diagram showing the configuration of the video encoding device 8. As shown in FIG. 26, the video encoding device 8 includes a side information determination section 81, a side information encoding section 82, a CU setting section 83, a CU encoding section 84, a variable-length code multiplexing section 25, a CU decoding section 46, a frame memory 27, and a predicted image generating section 88. An explanation is made here as to the side information determination section 81, the side information encoding section 82, and the predicted image generating section 88.

Since the variable-length code multiplexing section 25, the CU decoding section 46, and the frame memory 27 have been already explained in First or Second Embodiment, the following explains other members.

The predicted image generating section 88 generates an intra-predicted image #88*a* from a decoded image #46 stored in the frame memory 27. Furthermore, the predicted image generating section 88 calculates motion vectors by using the reference image #46 and carries out motion compensation based on the motion vectors, thereby generating an inter-predicted image #88*b*.

Furthermore, the predicted image generating section 88 compares the intra-predicted image and the inter-predicted image with an input image #100, selects one of the intra-predicted image and the inter-predicted image, and outputs the selected image as a predicted image #88. Furthermore, the predicted image generating section 88 outputs a prediction mode #88*m* which is information indicating which of the intra-predicted image and the inter-predicted image is selected.

The side information determination section 81 determines side information based on the input image #100 and the prediction mode #88*m* regarding each CU, and outputs the determined side information as side information #81. Specifically, the side information determination section 81 determines, based on a predetermined algorithm with respect to each slice (or picture), the size of a first QP encoding unit region and the size of a second QP encoding unit region, and causes size information indicative of the sizes of the QP encoding unit regions to be stored in a slice header (picture parameter set) of the side information #81. Here, the side information determination section 81 determines the size of the first QP encoding unit region to be relatively larger than the size of the second QP encoding unit region. More specifically, the side information determination section 81 determines the sizes of the first QP encoding unit region and the second QP encoding unit region in such a manner that the first QP encoding unit region (unit region) consists of a plurality of the second QP encoding unit regions (fourth unit region).

Furthermore, the side information determination section 81 defines the first QP encoding unit region and the second QP encoding unit region constituting the input image #100 (or individual slices) based on the size information of the first QP encoding unit region and the size of the second QP encoding unit region in the picture parameter set (or slice header), and causes a QP difference value of each CU selected by a later-mentioned process based on the prediction mode #88m (the CU is hereinafter also referred to as "selection target CU") to be stored as a part of CU information of the CU in the side information #81. Furthermore, the side information determination section 81 causes the prediction mode #88m of the CUs to be stored in the side information #81.

The side information encoding section 82 encodes the side information #81 to output side information encoded data #82.

In the process of encoding the side information #81, the side information encoding section 82 encodes the QP difference values received from the side information determination section 81. The encoded QP difference values constitute a part of the side information encoded data #82.

Similarly, in the process of encoding the side information #81, the side information encoding section 82 encodes size information of the QP encoding unit regions. The encoded size information constitutes a part of the side information encoded data #82.

Specifically, with respect to each of the first QP encoding unit region and the second QP encoding unit region, the side information encoding section 82 applies a logarithmic function with base of 2 to the size of the QP encoding unit region and subtracts 4 from the resultant, thereby generating encoded data of the size information.

The CU setting section 83 divides the input image #100 into a plurality of slices, divides each slice into a plurality of CUs, and outputs CU images #83b regarding individual CUs.

Furthermore, when outputting the CU images #83b regarding individual CUs, the CU setting section 83 outputs, with respect to a part of the CUs, not only CU images #83b of the part but also QP difference values #83 of the part which are included in the side information #81.

The CU encoding section 84 carries out DCT with respect to a prediction residual between sequentially inputted CU images 83b and a predicted image transmitted from the predicted image generating section (not shown).

In a case where a predicted image transmitted from the predicted image generating section 88 with respect to the input CU image #83b is an inter-predicted image (i.e. a case where the prediction mode #88m transmitted from the predicted image generating section 88 indicates an inter-prediction mode), the CU encoding section 84 quantizes DCT coefficients of the prediction residual at a quantization level corresponding to a QP value determined by a QP difference value #83a of a selection target CU in the first QP encoding unit region to which the CU image #83b belongs.

On the other hand, in a case where a predicted image transmitted from the predicted image generating section 88 with respect to the input CU image #83b is an intra-predicted image (i.e. a case where the prediction mode #88m transmitted from the predicted image generating section 88 indicates an intra-prediction mode), the CU encoding section 84 quantizes DCT coefficients of the prediction residual at a quantization level corresponding to a QP value determined by a QP difference value #83a of a selection target CU in the second QP encoding unit region to which the CU image #83b belongs.

The CU encoding section 84 outputs, to the variable-length code multiplexing section 25, CU encoded data #84 obtained by the above DCT and the quantization process.

An explanation was made above as to the configuration of the video encoding device 8. An explanation will be made below as to a specific process carried out by the side information determination section 81 and the side information encoding section 82.

Based on the side information #81, the side information determination section 81 refers to, in raster scan order, a skip flag of one or more CUs constituting the whole of each first QP encoding unit region. With respect to each first QP encoding unit region, the CU setting section 83 calculates a QP difference value #83a which is a difference between a QP value of a CU whose skip flag of "0" is referred to for the first time in the first QP encoding unit region (selection target CU) and a default QP value.

Furthermore, accompanying the above process for referring to the skip flag of each CU, the side information determination section 81 is designed to judge whether the CU is positioned at the upper left end of the second QP encoding region and a prediction mode #88m for the CU that is transmitted from the predicted image generating section 88 is an intra-prediction mode (i.e. the result of the judgment process is true). When judging that the result of the judgment process with respect to the CU is true, the side information determination section 81 calculates the QP difference value #83a which is a difference between the QP value of the CU (selection target CU) and the QP default value.

Then, the side information determination section 81 supplies the QP difference value of each selection target CU to the CU setting section 83 and the side information encoding section 82.

The side information encoding section 82 encodes each QP difference value received from the side information determination section 81, and generates encoded data of each QP difference value as a part of the encoded data #82.

Specifically, the side information determination section 81 and the side information encoding section 82 sequentially carries out a process mentioned below with respect to each CU by using a coding unit syntax shown in FIG. 27. That is, as is seen from FIG. 27, when x-component and y-component of the upper left coordinates of a CU whose skip flag (skip_flag) is referred to are equal to integer-multiples of the size of the first QP encoding unit region (MinDeltaQuant-CodingUnitSize), the side information determination section 81 sets the value of deltaQuantAail to "true".

Then, the side information determination section 81 refers to the value of each skip flag, and when referring to a skip flag whose value is "0", the side information determination section 81 sets the flag indicative of whether a QP difference value is encodable or not in intra-encoding a CU image (deltaQuantAvailIntra) to "true". Furthermore, when referring to a skip flag whose value is "0" while the value of deltaQuantAvail is "true", the side information determination section 81 supplies, to the side information encoding section 82, the QP difference value of the CU whose skip flag has been referred to, as a part of the side information #81. The side information encoding section 82 carries out an encoding process with respect to the QP difference value, and sets the values of deltaQuantAvail and deltaQuantAvailIntra to "false".

Furthermore, also when x-component and y-component of the upper left coordinates of a CU whose skip flag (skip_flag) is referred to are equal to integer-multiples of the size of the second QP encoding unit region (MinDeltaQuantCodingUnitSize) and the value of deltaQuantAvailIntra is "true", the side information determination section 81 supplies, to the side information encoding section 82, the QP difference value of the CU whose skip flag has been referred to, as a part of the side information #81.

As a result of the above processes by the side information determination section 81 and the side information encoding section 82, the variable-length code multiplexing section 25 receives, from the side information encoding section 82, side information encoded data #82 including encoded data of i) the QP difference value of the selection target CU and ii) size information of the first QP encoding unit region and the second QP encoding unit region that is determined with respect to each picture (or each slice constituting a picture). Furthermore, the variable-length code multiplexing section 25 multiplexes CU encoded data #84 received from the CU encoding section 84 with the side information encoded data #82, thereby generating encoded data #8 and outputting it. When x-component and y-component of the upper left coordinates of a CU whose skip flag (skip_flag) is referred to are equal to integer-multiples of the size of the first QP encoding unit region (MinDeltaQuantCodingUnitSize), the value of deltaQuantAail is set to "true".

Then, when referring to a skip flag with the value of "0" while the value of deltaQuantAvail is "true", the side information determination section 81 calls up the transform_tree syntax shown in FIG. 21 and refers to the value of residualDataPresentFlag. When the value of residualDataPresentFlag is "0", the side information determination section 61 calls up a coding unit syntax with respect to the next CU.

In the above explanation, judgment is made when x-component and y-component of the upper left coordinates of a CU are equal to integer-multiples of the size of a QP encoding unit region (MinDeltaQuantCodingUnitSize). Alternatively, other method for judging a CU of the same position may be employed. For example, judgment may be made by using a CU coordinates index shown below. The CU coordinates index is an index which indicates the position of a CU obtained by dividing an LCU as small as possible and which increases as 0, 1, 2 in the order of raster scan decoding from the upper left of the LCU. Also when an LCU is not divided as small as possible, it is possible to assign a CU coordinates index to a corresponding position with respect to each CU. In a case where the minimum CU size is 4×4 blocks, judgment based on the CU coordinates index being 0, 4, 8, and 12 for example allows MinDeltaQuantCodingUnitSize to be 8, i.e. the QP encoding unit region to be 8×8.

In the above embodiment, an explanation was made as to a case where x-component and y-component of the upper left coordinates of a CU are equal to integer-multiples of the size of a QP encoding unit region (MinDeltaQuantCodingUnitSize). Alternatively, different sizes of a QP encoding unit region may be used for x-component and y-component. In this case, judgment is made based on, for example, x-component of the upper left coordinates of a CU being equal to an integer-multiple of the width of a QP encoding unit region (MinDeltaQuantCodingUnitWidth) and y-component of the upper left coordinates of the CU being equal to an integer-multiple of the height of the QP encoding unit region (MinDeltaQuantCodingUnitHeight).

(Additional Matter)

In the above embodiment, an explanation was made as to a case where the side information determination section 81 determines a selection target CU according to the coding unit syntax shown in FIG. 27, and the side information encoding section 82 encodes a QP difference value of the selection target CU according to the coding unit syntax shown in FIG. 27. The corresponding video image decoding device is designed such that the side information decoding section 72 decodes a QP difference value of the selection target CU according to the coding unit syntax shown in FIG. 27. However, the present invention is not limited to this. That is, the side information determination section 81 may determine the selection target CU according to the coding unit syntax shown in FIG. 28. The corresponding video image decoding device is designed such that the side information decoding section 72 decodes a QP difference value of the selection target CU according to the coding unit syntax shown in FIG. 28.

That is, instead of the coding unit shown in FIG. 27, there may be provided a syntax for carrying out a diverging process according to the prediction mode of a CU. Specifically, as in the case of coding unit syntax shown in FIG. 28, cu_qp_delta to be referred to when the side information encoding section 82 encodes or the side information decoding section 72 decodes may be described at different positions depending on whether the prediction mode of a CU is an intra-prediction mode, an inter-prediction mode, a merge mode, or a direct mode (in other words, the step of encoding cu_qp_delta by the side information encoding section 82 may be a step following encoding of the prediction mode of a CU and may vary in whether encoding of cu_qp_delta is made depending on the kind of the prediction mode. The step of decoding cu_qp_delta by the side information decoding section 72 is a step following decoding of the prediction mode of a CU and may vary with respect to each prediction mode).

As is seen from the coding unit syntax shown in FIG. 28, the present invention may be arranged such that in a case where the prediction mode is a skip mode, the QP difference value is not encoded, in a case where the prediction mode is an intra-prediction mode, the QP difference value is encoded only for a CU whose size is not less than MinIntraDeltaCodingUnitSize, and in a case where the prediction mode is neither the intra-prediction mode nor the skip mode, the QP difference value is encoded only for a CU whose size is not less than MinDeltaCodingUnitSize.

(Additional Matter)

In the above embodiment, a QP value (cu_qp) of a CU to be quantized is obtained by adding a QP value referred to immediately before (pred_qp) and a QP difference value of the CU to be quantized. Here, the QP value referred to immediately before (QP predicted value) may be a QP value of a CU at the left side of the CU to be quantized, or may be a QP value of a CU positioned immediately before the CU to be quantized in the raster scan order. Alternatively, the QP value referred to immediately before may be the average of a QP value of a CU at the left side of the CU to be quantized and a QP value of a CU at the upper side of the CU to be quantized.

Fifth Embodiment (Video Decoding Device)

A video decoding device in accordance with the present embodiment is a device for decoding encoded data #10 from a video encoding device 10 (which will be explained below) to generate a decoded image #9. FIG. 31 shows an example of coding_unit syntax included in the encoded data #10.

The following details the video decoding device in accordance with the present embodiment with reference to drawings.

Initially, an explanation is made as to a configuration of the video decoding device in accordance with the present embodiment with reference to FIG. 29. FIG. 29 is a block diagram showing the configuration of the video decoding device 9. As shown in FIG. 29, the video decoding device 9 includes a variable-length code inverse-multiplexing section 91, a side information decoding section 92, a CU setting section 93, a CU decoding section 94, and a frame memory 15.

The encoded data #10 inputted to the video decoding device 9 is inputted to the variable-length code inverse-multiplexing section 91. The variable-length code inverse-multiplexing section 91 reverse-multiplexes the input encoded data #9 so as to divide the encoded data #9 into side information encoded data #91a which is encoded data regarding side information and encoded data #91b which is encoded data regarding a picture, and outputs the side information encoded data #91a and the encoded data #91b to the side information decoding section 92 and the CU setting section 93, respectively.

The side information decoding section 92 decodes the side information encoded data #91a to generate side information #92, and outputs the side information #92 to the CU setting section 93.

When decoding the side information encoded data #91a, the side information decoding section 92 decodes encoded data of size information indicative of the size of a QP encoded unit region, thereby generating the size information as a part of the side information #92.

Furthermore, when decoding the side information encoded data #91a, the side information decoding section 92 decodes, for each LCU, encoded data of a QP difference value of each QP encoding unit region constituting the LCU or decodes encoded data of a QP difference value of the LCU, thereby generating the QP difference value as a part of the side information #92.

The following more specifically describes the QP difference value decoding process carried out by the side information decoding section 92.

The side information decoding section 92 decodes size information (MinDeltaQuantCodingUnitSize) included in a slice header (picture parameter set) of the encoded data #10 so as to determine a (longitudinal and lateral) size of a QP encoding unit region.

Further, the side information decoding section 92 decodes a deltaQuantAvailCU flag of each LCU.

In a case where a value of deltaQuantAvailCU of the LCU is "false", the side information decoding section 92 determines to decode, per LCU, a QP difference value used in quantization of the LCU (decode one QP difference value at most in the LCU). Then, the side information decoding section 92 utilizes the QP difference value to decode each CU included in the LCU.

On the other hand, in a case where the value of deltaQuantAvailCU of the LCU is "true", the side information decoding section 92 determines to decode, per CU, a QP difference value used in quantization of the LCU. Then, the side information decoding section 92 decodes a QP difference value of a selection target CU. Note that one selection target CU at most is selected for each QP encoding unit region.

With reference to the coding_unit syntax of FIG. 31, the following describes specific processes carried out by the side information decoding section 92 with respect to each LCU.

The side information decoding section 92 carries out the following processes with respect to a target CU of each of at least one CU constituting a LCU.

In a case where the target CU is a CU located on an upper left end of the LCU (i.e., in a case where x-component and y-component of an upper left coordinate of the target CU are integer-multiples of max_coding_unit_width and max_coding_unit_height, respectively), the side information decoding section 92 sets a deltaQuantAvailLCU flag to "true". In a case where the target CU is located on an upper left end of a QP encoding unit region to which the target CU belongs (i.e., x-component and y-component of an upper left coordinate of the target CU are integer-multiples of Min-DeltaQuantCodingUnitSize) and where the deltaQuantAvailCU flag is "true", the side information decoding section 92 sets a deltaQuantAvail flag to "true".

The deltaQuantAvailLCU flag, the deltaQuantAvailCU flag, and the deltaQuantAvail flag have the following meanings. The deltaQuantAvailLCU flag is a flag for controlling encoding/decoding of the deltaQuantAvailCU flag encoded per LCU, and indicates whether the deltaQuantAvailCU can be encoded or decoded. The deltaQuantAvailCU flag is a flag for selecting whether a QP difference value is encoded per LCU or encoded per CU. The deltaQuantAvailCU flag becomes "false" in a case where a QP difference value is encoded per LCU, and becomes "true" in a case where a QP difference value is encoded per CU. The deltaQuantAvail flag is a flag for controlling a QP encoding unit in a case where a QP difference value is encoded per CU, and indicates whether qp_delta can be encoded or decoded.

Furthermore, in a case where a value of a skip flag of the target CU is "0" and where the deltaQuantAvailLCU flag is "true", the side information decoding section 92 decodes qp_delta of the target CU (i.e., selection target CU), and sets decoded qp_delta as the QP difference value of the target CU. Moreover, the side information decoding section 92 decodes the deltaQuantAvailCU flag, and sets the deltaQuantAvailLCU flag to "false". According to the syntax of FIG. 31, the deltaQuantAvailCU flag follows qp_delta. Note, however, that it is also possible to employ a syntax in which the deltaQuantAvailCU flag is followed by qp_delta.

Also in a case where the value of the skip flag of the target CU is "0" and where the deltaQuantAvail flag is "true", the side information decoding section 92 decodes qp_delta of the target CU (i.e., selection target CU), and sets decoded qp_delta as the QP difference value of the target CU. Further, the side information decoding section 92 sets the deltaQuant Avail flag to "false".

As is clear from the above description and the coding_unit syntax of FIG. 31, the deltaQuantAvail flag cannot be "true" as long as the deltaQuantAvailCU flag of an LCU is "false". Accordingly, a QP difference value of a single CU in which a skip flag "0" is referred to first in raster scan order in an LCU is decoded. Consequently, in a case where the deltaQuantAvailCU flag is "false", a QP difference value is decoded per LCU.

On the other hand, in a case where the deltaQuantAvailCU flag of the LCU is "true", the deltaQuantAvail flag becomes "true" every time the coding_unit syntax of FIG. 31 is applied to the target CU located on the upper left end of the QP encoding unit region. Accordingly, a QP difference value of a selection target CU is decoded. Note that one selection target CU at most is selected for each QP encoding unit region.

Further, as is clear from the coding_unit syntax of FIG. 31, when decoding a QP difference value of a CU in an LCU in which CU a skip flag "0" is referred to first, it is determined whether or not a QP difference value of a CU that is referred to later in the LCU is decoded.

In accordance with the input side information #92, the CU setting section 93 divides the encoded data #91b into a plurality of slices, divides each slice into a plurality of QP encoding unit regions, separates each QP encoding unit region into encoded data #93b corresponding to individual CUs, and outputs the encoded data #93b sequentially to the CU decoding section 94.

Further, the CU setting section 93 refers to the deltaQuantAvailCU flag for each LCU. The deltaQuantAvailCU flag is a flag indicative of whether a QP difference value is encoded per LCU or an LCU is encoded per QP encoding region unit. In a case where the deltaQuantAvailCU flag of the LCU is "true", the CU setting section 93 refers to CU information of each CU belonging to the LCU and, as to CUs whose CU information contains a QP difference value, outputs the QP difference value to the CU decoding section 94.

On the other hand, in a case where the deltaQuantAvailCU flag of the LCU is "false", the CU setting section 93 outputs, to the CU decoding section 94, a QP difference value contained in CU information of the LCU.

Furthermore, the CU setting section 93 outputs, to the CU decoding section 94, the deltaQuantAvailCU flag of each LCU.

The CU decoding section 94 sequentially decodes and reverse-quantizes the encoded data #93b corresponding to inputted CUs (inverse-quantization unit region), respectively, thereby generating and outputting decoded images #94 corresponding to the CUs, respectively. The decoded images #94 are also outputted to the frame memory 15.

Specifically, when decoding and reverse-quantizing encoded data #93b corresponding to a CU, the CU decoding section 94 obtains, in accordance with a value of the deltaQuantAvailCU flag of an LCU to which the CU belongs, a QP value from a QP difference value #93a of a QP encoding unit region to which the CU belongs or from a QP difference value #93a of the LCU, and carries out the inverse-quantization in accordance with the QP value.

At the time when the decoded image generation process per CU by the CU decoding section 94 has been made with respect to all CUs constituting the encoded data #91b, the process of generating the decoded image #9 corresponding to encoded data inputted to the video decoding device 9 is completed.

As described above, the video decoding device decodes encoded data of a QP difference value not with respect to each CU but with respect to each LCU unit or each QP encoding unit region constituting an LCU, and accordingly can generate a decoded image from encoded data with the smaller amount of codes than a conventional art.

(Video Encoding Device)

A video encoding device in accordance with the present embodiment carries out a process of dividing each LCU constituting the input image into a plurality of CUs (Coding Unit: quantization unit region) by using a coding_tree syntax described in JCTVC-C403, as in the video encoding device in accordance with Second Embodiment. Note, however, that the syntax described in the present embodiment is one obtained by partly simplifying the syntax described in JCTVC-C403 (the same applies to the other embodiments using the coding_tree syntax).

However, differently from the video encoding device in accordance with Second Embodiment, the video encoding device in accordance with the present embodiment is arranged such that it is determined based on a deltaQuantAvailCU flag (described later) whether a QP difference value used in quantization of each LCU constituting an input image is encoded per LCU or per QP encoding region constituting the LCU.

The following details the video encoding device in accordance with the present embodiment with reference to drawings.

Initially, an explanation is made as to a configuration of a video encoding device 10 in accordance with the present embodiment with reference to FIG. 30. FIG. 30 is a block diagram showing a configuration of the video encoding device 10. As shown in FIG. 30, the video encoding device 10 includes a side information determination section 101, a side information encoding section 102, a CU setting section 43, a CU encoding section 44, a variable-length code multiplexing section 25, a CU decoding section 46, and a frame memory 27.

The side information determination section 101 determines side information in accordance with an input image #100, and outputs the determined side information as side information #101.

Specifically, the side information determination section 101 determines the (longitudinal and lateral) size of a QP encoding unit region, and causes size information (MinDeltaQuantCodingUnitSize) indicative of the size of the QP encoding unit region to be stored in a slice header (picture parameter set) of the side information #101.

Further, the side information determination section 101 decodes a deltaQuantAvailCU flag of each LCU constituting the input image #100 which flag is determined according to a predetermined algorithm.

In a case where a value of the deltaQuantAvailCU flag of the LCU is "false", the side information determination section 101 determines to encode, per LCU, a QP difference value used in quantization of the LCU (i.e., encodes one QP difference value at most in the LCU). Then, the side information determination section 101 causes the QP difference value to be stored in CU information of an LCU constituting the side information #101.

On the other hand, in a case where the value of the deltaQuantAvailCU flag of the LCU is "true", the side information determination section 101 determines to encode, per CU, a QP difference value used in quantization of the LCU. Then, the side information determination section 101 causes a QP difference value of a selection target CU to be stored in CU information of the selection target CU constituting the side information #101. Note that one selection target CU at most is selected for each QP encoding unit region.

The side information encoding section 102 encodes the side information #101 and outputs side information encoded data #102. The side information encoded data #102 is supplied to the variable-length code multiplexing section 25. When encoding the side information #101, the side information encoding section 102 encodes each QP difference value and the size information.

Note that the CU setting section 43, the CU encoding section 44, the CU decoding section 46, the variable-length code multiplexing section 25, and the frame memory 27 have been described in First or Second Embodiment, and therefore are not described here repeatedly.

An explanation was made above as to the configuration of the video encoding device 10. An explanation is made below, with reference to the coding_unit syntax of FIG. 31, as to a specific process carried out by the side information determination section 101 and the side information encoding section 102 with respect to each LCU constituting the input image #100.

The side information determination section 101 carries out the following processes with respect to a target CU of each of at least one CU constituting an LCU.

In a case where the target CU is a CU located on an upper left end of the LCU (i.e., in a case where x-component and y-component of an upper left coordinate of the target CU are integer-multiples of max_coding_unit_width and max_coding_unit_height, respectively), the side information determination section 101 sets a deltaQuantAvailLCU flag to "true". In a case where the target CU is located on an upper left end of a QP encoding unit region to which the target CU belongs (i.e., x-component and y-component of the upper left coordinate of the target CU are integer-multiples of MinDeltaQuantCodingUnitSize) and where a deltaQuantAvailCU flag is "true", the side information determination section 101 sets a deltaQuantAvail flag to "true".

Furthermore, in a case where a value of a skip flag of the target CU is "0" and where the deltaQuantAvailLCU flag is "true", the side information determination section 101 causes a QP difference value of the target CU (i.e., selection target CU) to be stored in CU information of the target CU, decodes the deltaQuantAvailCU flag, and sets the deltaQuantAvailLCU flag to "false".

Also in a case where the value of the skip flag of the target CU is "0" and where the deltaQuantAvail flag is "true", the side information determination section 101 causes a QP difference value of the target CU (i.e., selection target CU) to be stored in CU information of the target CU and sets the deltaQuantAvail flag to "false".

The QP difference value thus stored in the CU information is supplied, as part of the side information #101, to the side information encoding section 102 along with the deltaQuantAvail flag of the LCU.

The side information encoding section 102 encodes the side information #101 so as to generate side information encoded data #102, and supplies the side information encoded data #102 to the variable-length code multiplexing section 25.

As is clear from the above description and the coding_unit syntax of FIG. 31, the deltaQuantAvail flag cannot be "true" as long as the deltaQuantAvailCU flag of the LCU is "false". Accordingly, a QP difference value is stored in CU information of a single CU in which a skip flag "0" is referred to first in raster scan order in the LCU. Consequently, in a case where the deltaQuantAvailCU flag is "false", a QP difference value is encoded per LCU.

On the other hand, in a case where the deltaQuantAvailCU flag of the LCU is "true", the deltaQuantAvail flag becomes "true" every time the coding_unit syntax of FIG. 31 is applied to the target CU located on the upper left end of the QP encoding unit region. Accordingly, a QP difference value of a selection target CU is encoded. Note that one selection target CU at most is selected for each QP encoding unit region.

Further, as is clear from the coding_unit syntax of FIG. 31, when encoding a QP difference value of a CU in which a skip flag "0" is referred to first in an LCU, it is determined whether or not a QP difference value of a CU referred to later in the LCU is encoded.

As a result of the processes carried out by the side information determination section 101 and the side information encoding section 102, the variable-length code multiplexing section 25 receives, from the side information encoding section 102, side information encoded data #102 including encoded data of (i) a QP difference value determined per LCU or QP encoding unit region, (ii) size information of the QP encoding unit regions determined with respect to each picture parameter set (each slice), and (iii) a deltaQuantAvailCU flag. Furthermore, the variable-length code multiplexing section 25 multiplexes CU encoded data #44 received from the CU encoding section 44 and the side information encoded data #102 to generate and output encoded data #10.

Sixth Embodiment (Video Decoding Device)

The video decoding device in accordance with the present embodiment is a device for decoding encoded data #112 supplied from the video encoding device 112 (which will be explained below) to generate a decoded image #111. FIG. 34 illustrates an example of a coding_unit syntax contained in the encoded data #112.

The following details the video decoding device in accordance with the present embodiment, with reference to drawings.

First described is a configuration of the video decoding device in accordance with the present embodiment, with reference to FIG. 32. FIG. 32 is a block diagram showing the configuration of a video decoding device 111. As shown in FIG. 32, the video decoding device 111 includes a variable-length code inverse-multiplexing section 1111, a side information decoding section 1112, a CU setting section 1113, a CU decoding section 1114, and a frame memory 15.

The encoded data #112 inputted to the video decoding device 111 is received by the variable-length code inverse-multiplexing section 1111. The variable-length code inverse-multiplexing section 1111 reverse-multiplexes the inputted encoded data #112 so as to divide the encoded data #112 into (i) side information encoded data #1111a which is encoded data regarding side information and (ii) encoded data #1111b which is encoded data regarding a picture, and outputs the side information encoded data #1111a and the encoded data #1111b to the side information decoding section 1112 and the CU setting section 1113, respectively.

The side information decoding section 1112 decodes the side information encoded data #1111a to generate side information #1112, and outputs the side information #1112 to the CU setting section 1113.

In the process of decoding the side information encoded data #1111a, the side information decoding section 1112 decodes encoded data of size information indicative of sizes of QP encoding unit regions of a I slice QP encoding unit region, a Q slice encoding unit region, and a P slice encoding unit region. This generates the size information which serves as a part of the side information #1112.

Moreover, in the process of decoding the side information encoded data #1111a, the side information decoding section 1112 decodes, for each of the LCU, the encoded data of QP differential values of subject QP encoding unit regions that configure that LCU. This as a result generates a QP differential value which serves as a part of the side information #1112. In the embodiment, the side information decoding section 1112 recognizes, for every subject QP encoding unit region that configure the LCU, which of the three types of QP encoding unit regions the subject QP encoding unit region corresponds to, by referring to a slice type inside the slice header of a slice to which the LCU belongs.

The following details the decoding process of the QP difference value by the side information decoding section 1112.

The side information decoding section 1112 defines, for each of the LCUs that are subjected to the quantization process, a QP encoding unit region (also called "subject QP encoding unit region") of any one of the three QP encoding unit regions (I slice QP encoding unit region, Q slice QP encoding unit region, and B slice QP encoding unit region) that are of different sizes in accordance with the slice type of the slice to which that LCU belongs. For example, when the slice type of the slice to which the LCU belongs is I slice, the side information decoding section 1112 defines the I slice QP encoding unit region as the subject QP encoding unit region.

Thereafter, for each of the defined subject QP encoding unit regions, the side information decoding section 1112 refers to skip flags of one or more CU that configures the whole subject QP encoding unit region, in raster scanning order. For each of the subject QP encoding unit regions, the side information decoding section 1112 decodes cu_qp_delta (see FIG. 34) of a CU whose skip flag having a value of "0" is referred to in that QP encoding unit region for the first time, and sets this decoded cu_qp_delta as the QP difference value for that CU.

Specifically, the side information decoding section 1112 sequentially subjects every CU to a process below by use of a coding unit syntax (see FIG. 34). That is, when x-component and y-component of upper left coordinates of a CU whose skip flag (skip_flag) is referred to are integer-multiples of the size of the subject QP encoding unit region (MinIDeltaQuantCodingUnitSize when the slice type of the slice to which the LCU belongs is I slice; MinBDeltaQuantCodingUnitSize and MinPDeltaQuantCodingUnitSize when the slice types are B slice and P slice, respectively), the side information decoding section 1112 sets the value of a flag indicative of whether decoding is possible or not (deltaQuantAvail) to "true". Then, when the side information decoding section 1112 refers to a skip flag "0" while the value of deltaQuantAvail is "true", the side information decoding section 1112 decodes the cu_qp_delta of the CU to which the skip flag was referred, and sets the decoded cu_qp_delta as the QP difference value for that CU. Thereafter, the side information detecting section 1112 sets the value of deltaQuantAvail to "false".

In accordance with the input side information #1112, the CU setting section 1113 divides the encoded data #1111b into a plurality of slices, divides each slice into a plurality of subject QP encoding unit regions, separates each subject QP encoding unit region into encoded data #1113b corresponding to individual CUs, and outputs the encoded data #1113b sequentially to the CU decoding section 1114.

The CU decoding section 1114 sequentially decodes and reverse-quantizes the encoded data #1113b corresponding to inputted individual CUs (reverse-quantized unit region) to generate decoded images #1114 corresponding to individual CUs and outputs the decoded images #1114. The decoded images #1114 are outputted to the frame memory 15, too.

Specifically, when decoding and reverse-quantizing the encoded data #1113b corresponding to a CU, the CU decoding section 1114 obtains a QP value from the QP difference value #1113a of the subject QP encoding unit region to which the CU belongs, to carry out the inverse-quantization process.

Once the decoded image generation process by the CU decoding section 1114 with respect to each CU is completed for all CUs configuring the encoded data #1111b, the process of generating the decoded image #111 corresponding to encoded data inputted to the video decoding device 111 is completed.

As described above, the video decoding device decodes encoded data of a QP difference value not with respect to each CU but with respect to each subject QP encoding unit region determined in accordance with the slice type of the slice to which the CU belongs. Accordingly, the video decoding device can generate a decoded image from encoded data having a smaller amount of codes than conventional art.

(Video Encoding Device)

A video encoding device 112 in accordance with the present embodiment is configured so that the video encoding device 112 encodes a QP difference value of different granularities (numbers) between cases in which the slice configuring the input image includes (i) a large number of I slices, (ii) a large number of P slices, or (iii) a large number of B slices.

The following describes the video encoding device 112 in accordance with the present embodiment, with reference to FIG. 33. FIG. 33 is a block diagram showing a configuration of the video encoding device 112. As shown in FIG. 33, the video encoding device 112 includes a side information determination section 1121, a side information encoding section 1122, a CU setting section 43, a CU encoding section 44, a variable-length code multiplexing section 25, a CU decoding section 46, and a frame memory 27.

The CU setting section 43, the CU encoding section 44, the variable-length code multiplexing section 25, the CU decoding section 46, and the frame memory 27 have already been explained in First or Second Embodiment, and therefore the following description deals with the side information determination section 1121 and the side information encoding section 1122.

The side information determination section 1121 defines any one of a QP encoding unit region (also called "subject QP coding unit region") of three QP encoding unit regions (I slice QP encoding unit region, Q slice QP encoding unit region, and B slice QP encoding unit region), which are of different size in accordance with the slice type of the slice to which a respective LCU belongs, for each of LCU that is subject to a quantization process. For example, in a case in which the slice type of the slice to which the LCE belongs is an I slice, the side information determination section 1121 defines, as the subject QP encoding unit region, the I slice QP encoding unit region.

Thereafter, the side information determination section 1121 refers to skip flags of each of at least one CU that configures the whole of each of the subject QP encoding unit regions defined by the side information determination section 1121, in raster scanning order. For each of the subject QP encoding unit regions, the side information determination section 1121 calculates a QP value of a CU whose skip flag having a value of "0" is referred to in the QP encoding unit region for the first time, and outputs, to the side information encoding section 1122, as a part of the side information, a QP difference value between this calculated QP value and a QP value referred to immediately before (or default QP value).

Specifically, the side information decoding section 1121 and the side information encoding section 1122 sequentially subject the CUs to a process described below by use of a coding unit syntax shown in FIG. 34. That is, when x-component and y-component of the upper left coordinates of a CU whose skip flag (skip_flag) is referred to are integer-multiples of the size of the subject QP encoding unit region (MinlDeltaQuantCodingUnitSize when the slice type of the slice to which the LCU belongs is I slice; MinBDeltaQuant-CodingUnitSize and MinPDeltaQuantCodingUnitSize when the slice types are B slice and P slice, respectively), the side information decoding section 1121 sets the value of a flag indicative of whether encoding is possible or not (deltaQuantAvail) to "true". Then, when the side information decoding section 1121 refers to a skip flag "0" while the value of deltaQuantAvail is "true", the side information decoding section 1121 supplies the QP difference value of the CU to which the skip flag was referred, to the side information encoding section 1122 as a part of the side information #41. The side information encoding section 1122 executes the encoding process to the QP difference value, and sets the value of deltaQuantAvail to "false".

As a result of the processes carried out by the side information determination section 1121 and the side information encoding section 1122, the variable-length code multiplexing section 25 receives, from the side information encoding section 1122, side information encoded data #1122 including encoded data of (i) size information of the three types of QP encoding unit regions and (ii) QP difference values of each of the subject QP encoding unit regions. Furthermore, the variable-length code multiplexing section 25 multiplexes CU encoded data #44 received from the CU encoding section 44 and the side information encoded data #1122, to generate and output encoded data #112.

(Additional Matter)

Although the video encoding device 112 is configured so as to encode a QP difference value of different granularities (numbers) between cases in which the slice configuring the input image includes (i) a large number of I slices, (ii) a large number of P slices, or (iii) a large number of B slices, the present invention is not limited to this. Namely, the video encoding device may be configured in such a manner that the granularity (number) of the QP difference values to be encoded may be about the same between the case in which the slice includes a large number of P slices and the case in which the slice includes a large number of B slices. That is to say, each of the values of MinlDeltaQuantCodingUnitSize, MinBDeltaQuantCodingUnitSize, and MinPDeltaQuantCodingUnitSize may be set to satisfy the following formula:

[Mathematical Formula 3]

MinDeltaQuantCodingUnitSize=max_coding_unit_width>>log 2_min_delta_quant_unit_size_lcu    Formula 2

Moreover, the MinlDeltaQuantCodingUnitSize, MinBDeltaQuantCodingUnitSize, and MinPDeltaQuantCoding UnitSize may be configured as a picture parameter set, a sequence parameter set, or a configuration in which the value is encoded inside the encoded data by a slice header or the like.

Seventh Embodiment (Video Decoding Device)

A video decoding device in accordance with the present embodiment is a device for decoding encoded data #114 supplied from a video encoding device 114 (later described) to generate decoded images #113.

The following details the video decoding device in accordance with the present embodiment with reference to drawings.

Initially, with reference to FIG. 35, an explanation is made as to a configuration of the video decoding device in accordance with the present embodiment. FIG. 35 is a block diagram showing the configuration of a video decoding device 113. As shown in FIG. 35, the video decoding device 113 includes a variable-length code inverse-multiplexing section 1131, a side information decoding section 1132, a CU setting section 1133, a CU decoding section 1134, and a frame memory 15.

The encoded data #114 inputted to the video decoding device 113 is inputted to the variable-length code inverse-multiplexing section 1131. The variable-length code inverse-multiplexing section 1131 reverse-multiplexes the inputted encoded data #114 so as to divide the encoded data #114 into (i) side information encoded data #1131a which is encoded data regarding side information and (ii) encoded data #1131b which is encoded data regarding a picture, and outputs the side information encoded data #1131a and the encoded data #1131b to the side information decoding section 1132 and the CU setting section 1133, respectively.

The side information decoding section 1132 decodes the side information encoded data #1131a to generate side information #1132 and outputs the side information #1132 to the CU setting section 1133.

In the process for decoding the side information encoded data #1131a, the side information decoding section 1132 decodes encoded data of size information indicative of the size of a QP encoding unit region, thereby generating the size information which serves as a part of side information #1132.

In the process for decoding the side information encoded data #1131a, the side information decoding section 1132 decodes encoded data of a transform rule index of each slice header, thereby generating the transform rule index as a part of the side information #1132. Note that the transform rule index is an index for identifying each transform rule explained in First Embodiment.

Further, in the process for decoding the side information encoded data #1131a, the side information decoding section 1132 decodes encoded data of an index (qp_delta_index) of each QP encoding unit region, thereby generating the index as a part of the side information #1132.

In accordance with the input side information #1132, the CU setting section 1133 (i) divides the encoded data #1131b into a plurality of slices, (ii) divides each slice into a plurality of QP encoding unit regions, (iii) divides each QP encoding unit region into a plural pieces of encoded data #1133b corresponding to respective CUs, and (iv) sequentially outputs the plural pieces of encoded data #1133b to the CU decoding section 34. With respect to each QP encoding unit region, the CU setting section 1133 calculates a QP difference value, which is to be outputted to the CU decoding section 1134, from an index of the QP encoding unit region contained in the side information #1132 with the use of a transform rule specified by a transform rule index that is also contained in the side information #1132. In addition to the plural pieces of encoded data #1133b corresponding to respective CUs in the QP encoding unit region, the CU setting section 1133 outputs, to the CU decoding section 1134, a QP difference value #1133a calculated with the use of the transform rule.

The CU decoding section 1134 sequentially decodes and reverse-quantizes the inputted plural pieces of encoded data #1133b corresponding to the respective CUs (reverse-quantization unit region), thereby generating and outputting decoded images #1134 corresponding to the respective CUs. The decoded images #1134 are also outputted to the frame memory 15.

Specifically, when decoding and reverse-quantizing encoded data #1133b corresponding to a CU, the CU decoding section 1134 obtains a QP value from the QP difference value #1133a of the QP encoding unit region to which the CU belongs, and carries out an inverse-quantization process.

At a time when the decoded image generation processes, which are carried out by the CU decoding section 1134 with respect to all the respective CUs constituting the encoded data #1131b, are completed, a process of generating the decoded image #113 corresponding to encoded data inputted to the video decoding device 113 is completed.

As described above, the video decoding device decodes encoded data of an index which is smaller in value than a QP difference value (or is mostly smaller than the QP difference value as shown in (d) of FIG. 8), instead of decoding encoded data of a QP difference value for each QP encoding unit region. This allows a reduction in amount of codes of encoded data, as a whole, which is received for generating a QP difference value, even if the amount of codes is increased due to encoding of a transform rule index. Accordingly, the video decoding device can generate a QP difference value from encoded data having the smaller data amount.

(Video Encoding Device)

A video encoding device in accordance with the present embodiment carries out a process of dividing each of LCUs constituting an input image into a plurality of CUs (Coding Unit: quantization unit region) by using coding_tree syntax described in JCTVC-C403, as with the video encoding device in accordance with Second Embodiment.

Furthermore, the video encoding device in accordance with the present embodiment is designed to encode size information indicative of the size of a QP encoding unit region.

On the other hand, unlike the video encoding device in accordance with Second Embodiment, the video encoding device in accordance with the present embodiment is configured to encode, for each QP encoding unit region, an index indicating a QP difference value as explained in First Embodiment, instead of encoding the QP difference value regarding only one CU belonging to the QP encoding unit region. Moreover, as with First Embodiment, the video encoding device in accordance with the present embodiment is configured to encode a transform rule index of a transform rule that indicates a relation between a QP difference value and an index, as explained in First Embodiment.

The following details the video encoding device in accordance with the present embodiment with reference to drawings.

Initially, an explanation is made as to a configuration of a video encoding device 114 in accordance with the present embodiment, with reference to FIG. 36. FIG. 36 is a block diagram showing a configuration of the video encoding device 114. As shown in FIG. 36, the video encoding device 114 includes a side information determination section 1141, a side information encoding section 1142, a CU setting section 43, a CU encoding section 44, a variable-length code multiplexing section 25, a CU decoding section 46, and a frame memory 27.

The side information determination section 1141 determines side information in accordance with an input image #100, and outputs the determined side information as side information #1141. The side information #1141 includes pieces of information such as (i) a picture parameter set which is a set of parameters regarding the input image #100, (ii) a slice header which is header information with respect to each of slices included in the input image #100, (iii) CU information which is a set of parameters with respect to each of CUs included in a slice, and (iv) TU information which is a set of parameters with respect to each of TUs included in a CU.

Specifically, the side information determination section 1141 determines the (longitudinal and lateral) size of a QP encoding unit region in accordance with a predetermined algorithm with respect to each slice (or each picture), and causes size information indicative of the size of the QP encoding unit region to be stored in a slice header (picture parameter set) of the side information #1141.

Furthermore, the side information determination section 1141 determines, with respect to each slice, a set of QP difference values for limiting QP values assignable to CUs included in the slice. That is, QP values assignable to CUs included in the slice are limited so that a QP difference value between each of the QP values and a QP value assigned to an immediately preceding CU included in the same slice is included in the set of the QP difference values.

Furthermore, the side information determination section 1141 determines, with respect to each slice, a transform rule regarding the slice, and incorporates a transform rule index for identifying the transform rule into a corresponding slice header.

Furthermore, the side information determination section 1141 defines a QP encoding unit region constituting the input image #100 (or each slice) in accordance with size information for the QP encoding unit region in the picture parameter set (or slice header). Further, with respect to only one CU (selection target CU) selected for each QP encoding unit region, the side information determination section 1141 transforms a QP difference value (qp_delta) into an index (qp_delta_index) with reference to a QP difference value table. Then, the side information determination section 1141 (i) outputs, to the side information encoding section 1142, the side information #1141 that is CU information of the selection target CU which information contains the index and (ii) outputs the QP difference value to the CU setting section 43.

The side information encoding section 1142 encodes the side information #1141 and outputs side information encoded data #1142. The side information encoded data #1142 is supplied to the variable-length code multiplexing section 25. When encoding the side information #1141, the side information encoding section 1142 encodes an index of each QP encoding unit region, the size information, and a transform rule index. To be specific, the side information encoding section 1142 encodes the index of each QP encoding unit region into a binary sequence having a length corresponding to the sizes of an absolute value of the index.

The CU setting section 43, the CU encoding section 44, the CU decoding section 46, the variable-length code multiplexing section 25, and the frame memory 27 have been already explained in First or Second Embodiment and therefore explanations thereof are omitted here.

Modification Example 1 of Video Decoding Device 113 and Video Encoding Device 114

The above described side information determination section 1141 of the video encoding device 114 determines a transform rule for each slice. Alternatively, however, the side information determination section 1141 may select, with respect to each slice, one transform rule from predetermined plural kinds of transform rules.

For example, the side information determination section 1141 may (i) select any one of a transform rule represented by qp_delta=qp_delta_index, a transform rule represented by qp_delta=qp_delta_index*2 (i.e., a transform rule in which an equivalent QP difference value table is as shown in (b) of FIG. 8), and a transform rule in which an equivalent QP difference value table is as shown in (c) of FIG. 8 and (ii) cause a transform rule index indicative of the transform rule to be stored in a slice header of the side information #1141 with reference to a transform rule table. Here, the transform rule table is a table in which transform rules and transform rule indices are associated with each other. The video encoding device 114 and the video decoding device 113 have respective storage sections (not shown) in which a common transform rule table is stored. Examples of the transform rule table encompass a table in which (i) a transform rule index for identifying the transform rule represented by qp_delta=qp_delta_index is 0, (ii) a transform rule index for identifying the transform rule represented by qp_delta=qp_delta_index*2 is 1, and (iii) a transform rule index for identifying the transform rule in which an equivalent QP difference value table is as shown in (c) of FIG. 8 is 2.

Alternatively, the side information determination section 1141 may select, with respect to each slice, one QP difference value table from predetermined plural kinds of QP difference value tables.

For example, the side information determination section 1141 may (i) select a QP difference value table in which qp_delta and qp_delta_index becomes identical values or a QP difference value table as shown in (a) of FIG. 8 and (ii) cause a roughness-specifying flag indicative of the QP difference value table to be stored in a slice header of the side information #1141 with reference to information for selecting a table. Here, the information for selecting a table is a table in which QP difference value tables and roughness-specifying flags are associated with each other. The video encoding device 114 and the video decoding device 113 have respective storage sections (not shown) in which common information for selecting a table is stored.

The video encoding device 114 and the video decoding device 113 may define a roughness-specifying flag, which is a binary flag indicative of the former QP difference value table, as "0" and define a roughness-specifying flag indicative of the latter QP difference value table as "1".

In the above two examples, when decoding the side information encoded data #1131a, the side information decoding section 1132 of the video decoding device 113 decodes encoded data of a transform rule index (roughness-specifying flag) of each slice header, thereby generating the transform rule index (roughness-specifying flag) as a part of the side information #1132.

With reference to a transform rule table stored in a storage section (not shown), the CU setting section 1133 specifies, from a transform rule index (roughness-specifying flag) included in a slice header of the side information #1132, arithmetic algorithm information (QP difference value table) indicative of a transform rule, which arithmetic algorithm information is also stored in the storage section. Then, with respect to each QP encoding unit region, the CU setting section 1133 transforms, based on the specified arithmetic information (QP difference value table), an index of a selection target CU in the QP encoding unit region included in the side information #1132 into a QP difference value to be outputted to the CU decoding section 1134.

Note that the plural kinds of QP difference value tables may be QP difference value tables each of which is set in accordance with a prediction mode. For example, the plural kinds of QP difference value tables may be two kinds of QP difference value tables, that is, a QP difference value table for intra-prediction mode and a QP difference value table for other prediction mode. Moreover, the QP difference value table for intra-prediction mode may be a QP difference value table in which qp_delta and qp_delta_index have identical values, and the QP difference value table for other prediction mode may be a QP difference value table as shown in (b) of FIG. 8.

According to the configuration, in a case where a prediction mode of the selection target CU received from a predicted image generation section (not shown) is intra-prediction mode, the side information determination section 1141 transforms a QP difference value of the selection target CU into an index with reference to the former QP difference value table. On the other hand, in a case where a prediction mode of the selection target CU received from the predicted image generation section (not shown) is other prediction mode such as an inter-prediction mode, the side information determination section 1141 transforms the QP difference value of the selection target CU into an index with reference to the latter QP difference value table.

The plural kinds of QP difference value tables may be QP difference value tables each of which is set in accordance with a slice type. For example, the plural kinds of QP difference value tables may be two kinds of QP difference value tables, that is, (i) a QP difference value table for I slice and B slice and (ii) a QP difference value table for P slice.

For example, the side information determination section 1141 may (i) determine a set of QP difference values with the use of the method as described in First Embodiment such that a factor for the I slice and the B slice becomes 1 and (ii) generate the QP difference value table for I slice and B slice from the set of QP difference values. Similarly, the side information determination section 1141 may (i) determine a set of QP difference values with the use of the method as described in First Embodiment such that a factor for the P slice becomes 2 and (ii) generate the QP difference value table for P slice from the set of QP difference values.

According to the configuration, in a case where the type of a slice to which the selection target CU belongs is the I slice or the B slice, the side information determination section 1141 transforms a QP difference value of the selection target CU into an index with reference to the former QP difference value table. On the other hand, in a case where the type of a slice to which the selection target CU belongs is the P slice, the side information determination section 1141 transforms a QP difference value of the selection target CU into an index with reference to the latter QP difference value table.

Note that the plural kinds of arithmetic rules can be set in a manner similar to that of the plural kinds of QP difference value tables.

Modification Example 2 of Video Decoding Device 113 and Video Encoding Device 114

In Fifth Embodiment, the video encoding device is explained which determines whether to encode, with respect to each of LCUs constituting an input image #100, a QP difference value per LCU or per QP encoding region constituting an LCU, depending on whether or not a deltaQuant AvailCU flag is true.

The video encoding device 114 may determine whether to encode an index (qp_delta_index) with respect to each LCU or with respect to each QP encoding unit region constituting an LCU depending on whether or not the deltaQuantAvailCU flag is true, as with the video encoding device in accordance with Sixth Embodiment.

Further, the side information determination section 1141 of the video encoding device 114 may (i) select, with respect to each selection target CU, any one of plural kinds of transform rules set for respective slices (or LCUs or CUs) and (ii) transform a QP difference value into an index with the use of the selected transform rule. In this case, the side information determination section 1141 causes a transform rule index of the selected transform rule to be stored in CU information of the selection target CU together with an index of the selection target CU.

Note that, in a case where each of the plural kinds of transform rules is set for each slice or for each LCU, the side information determination section 1141 may (i) select one transform rule with respect to each LCU and (ii) cause a transform rule index indicative of the selected transform rule to be included in CU information of the LCU. Similarly, in a case where each of the plural kinds of transform rules is set for each slice, the side information determination section 1141 may (i) select one transform rule with respect to each slice and (ii) cause a transform rule index indicative of the selected transform rule to be included in the slice header.

For example, the side information determination section 1141 may be configured to select, for each slice, (i) a transform rule in which qp_delta and qp_delta_index are identical values or (ii) a transform rule in which an equivalent QP difference value table is as shown in (b) of FIG. 8.

According to the configuration, (i) in a case where the side information determination section 1141 determines an index (qp_delta_index) for each LCU, the side information determination section 1141 may calculate an index to be stored in the side information #1141 from a QP difference value of a selection target CU with the use of the former transform rule, and (ii) in a case where the side information determination section 1141 determines an index (qp_delta_index) for each QP encoding unit region, the side information determination section 1141 may calculate an index to be stored in the side information #1141 from a QP difference value of the selection target CU with the use of the latter transform rule.

The video encoding device 114 may determine, with respect to each slice constituting the input image #100, whether to encode an index for the slice or for each LCU constituting the slice (or for each QP encoding unit region).

According to the configuration, in a case where the side information determination section 1141 determines an index for each slice, the side information determination section 1141 may calculate an index to be stored in the side information #1141 from a QP difference value of a selection target CU with the use of the former transform rule, and (ii) in a case where the side information determination section 1141 determines an index for each LCU (or for each QP encoding unit region), the side information determination section 1141 may calculate an index to be stored in the side information #1141 from a QP difference value of the selection target CU with the use of the latter transform rule.

In this case, the CU setting section 1133 of the video decoding device 113 refers to, with respect to each LCU, deltaQuantAvailCU included in CU information of the LCU in the side information #1132. In a case where a deltaQuantAvailCU flag of the LCU is "true", the CU setting section 1133 refers to CU information of each CU belonging to the LCU and calculates a QP difference value 1133a, from an index, with respect to a CU whose CU information includes the index with the use of a transform rule indicated by a transform rule index included in the slice header. On the other hand, in a case where the deltaQuantAvailCU flag of the LCU is "false", the CU setting section 1133 refers to CU information of the LCU and transforms an index included in the CU information into a QP difference value 1133a with the use of a transform rule indicated by a transform rule index included in the slice header.

Then, the CU setting section 1133 outputs the QP difference value 1133a to the CU decoding section 1134. The other operations are similar to those of the video decoding device 113 in accordance with Modification Example 1.

Note that the macroblock of First Embodiment corresponds to an LCU (Largest Coding Unit, also called root of Coding Tree) of HEVC (High Efficiency Video Coding) that is proposed as a standard succeeding to H.264/MPEG-4 AVC. Each of the sub macroblock and the block corresponds to CU (Coding Unit, also called leaf of Coding Tree), a PU (Prediction Unit), or a TU (Transformation Unit) of HEVC.

Lastly, the following table explains variables used in the drawings showing the syntax.

TABLE 1

| | |
|---|---|
| trafoDepth | Variable indicative of divided node of TU If trafoDepth = 0, TU is identical with CU If trafoDepth = 1, TU is one of four nodes obtained by dividing CU |
| cbp_yuv_root | Flag indicative of whether or not DCT coefficient other than 0 is included in subordinate TU node. Encoded by trafoDepth = 0 and CAVLC. |
| no_resiual_data_flag | Flag indicative of whether or not DCT coefficient other than 0 is included in subordinate TU node. Encoded by trafoDepth = 0 and CABAC. |
| split_transform_flag | TU division flag |
| cbp_luma[trafoDpth + 1] | Flag indicative of whether or not DCT transform coefficient whose luminance component is not 0 is included in next node (TU node of trafoDepth + 1). Encoded by CAVLC. |
| cbp_cb[trafoDpth + 1] | Flag indicative of whether or not DCT transform coefficient whose color difference Cb component is not 0 is included in next node (TU node of trafoDepth + 1). Encoded by CAVLC. |
| cbp_cr[trafoDpth + 1] | Flag indicative of whether or not DCT transform coefficient whose color difference Cr component is not 0 is included in next node (TU node of trafoDepth + 1). Encoded by CAVLC. |
| code_block_flag_luma [x0][y0][trafoDepth] | Flag indicative of whether or not DCT transform coefficient whose luminance component is not 0 is included in current TU node (TU node of trafoDepth). Encoded by CABAC. |
| code_block_flag_cb [x0][y0][trafoDepth] | Flag indicative of whether or not DCT transform coefficient whose color difference Cb component is not 0 is included in current TU node (TU node of trafoDepth). Encoded by CABAC. |
| code_block_flag_cr [x0][y0][trafoDepth] | Flag indicative of whether or not DCT transform coefficient whose color difference Cr component is not 0 is included in current TU node (TU node of trafoDepth). Encoded by CABAC. |

The present invention is not limited to the description of the embodiments above, but may be altered by a skilled person within the scope of the claims. An embodiment based on a proper combination of technical means disclosed in different embodiments is encompassed in the technical scope of the present invention.

As above described, the encoding device of the present invention preferably further includes information generation means for generating information indicative of correspondences between the n difference values and the n integers, respectively, the information generated by the information generation means being outputted to outside as encoded data together with the binary sequence.

According to the configuration, the encoding device can cause a decoding device, which is capable of decoding the difference values, to decode the difference values in a case where the binary sequence and information indicative of the correspondences are inputted. Moreover, the configuration of the present invention brings about a further effect of appropriately changing the correspondences between the n difference values and the respective n integers in accordance with an input image to be encoded.

According to the encoding device of the present invention, it is preferable that the n difference values are obtained by multiplying the n integers with a predetermined value, and the information is the predetermined value.

According to the configuration, the information indicative of the correspondences between the n difference values and the respective n integers is expressed in a single predetermined value. Therefore, it is possible to reduce the amount of codes of the information outputted to outside as encoded data.

According to the encoding device of the present invention, it is preferable that the transform means transforms one of the n difference values which one has i-th smallest absolute value into one of the n integers which one has i-th smallest absolute value, and the absolute value of the integer is smaller than the absolute value of the difference value.

According to the configuration, the encoding device of the present invention transforms a difference value regarding a unit region into an integer having an absolute value smaller than that of the difference value, regardless of how the difference value is determined out of the n difference values.

Therefore, the encoding device of the present invention brings about a further effect of surely reducing the amount of codes of a quantization parameter to be supplied to the decoding device.

It is preferable that the encoding device of the present invention further includes calculation means for calculating a ratio of said each of the n difference values to a group consisting of the difference between the quantization parameter and the predetermined reference value in each unit region, the transform means transforming the difference value into the integer in such a manner that as the difference value has the larger ratio calculated by the calculation means, the integer has a smaller absolute value.

According to the configuration, in the encoding device of the present invention, the transform means transforms the difference value into the integer in such a manner that as the difference value has the larger ratio in the group consisting of the difference of each unit region, the integer has a smaller absolute value (that is, a binary sequence generated from the integer becomes shorter).

Therefore, the encoding device of the present invention brings about a further effect of more efficiently reducing the amount of codes of a quantization parameter to be supplied to the decoding device.

According to the encoding device of the present invention, it is preferable that the input image consists of a plurality of second unit regions, and each of the plurality of second unit regions consists of the plurality of unit regions, the setting means sets a quantization parameter of a specific unit region predetermined for each of the plurality of second unit regions in such a manner that a difference in quantization parameter between a pair of the specific unit region and a unit region earlier in an order of encoding is capable of being a value other than the n difference values, and the binary sequence generation means generates a binary sequence having a length corresponding to an absolute value of the difference in quantization parameter between the pair.

In general, when a region constituted by unit regions having similar image characteristics (i.e. it is appropriate to have similar quantization parameters) is set as a second unit region (e.g. enlarged macroblock), by setting a quantization parameter for each of unit regions in the second unit region other than a specific region (e.g. macroblock at the upper left corner of the enlarged macroblock) in such a manner that a pair of the unit region and a unit region with an earlier encoding order than that unit region has a sufficiently small difference in quantization parameter, it is possible to carry out appropriate quantization.

Therefore, the encoding device of the present invention can carry out appropriate quantization even when sufficiently reducing the number n of candidates for a difference between quantization parameters for a pair of each of the unit regions other than specific regions and a unit region with an earlier encoding order than that unit region in setting quantization parameters for the unit regions other than specific regions. Consequently, the encoding device of the present invention can save a storage region for storing information in which n integers and n difference values regarding quantization parameters are related to each other one by one.

According to the encoding device of the present invention, it is preferable that the encoded data includes the information in which n integers are related to n difference values regarding quantization parameters, respectively, and the extraction means extracts the information from the encoded data.

With the arrangement, the decoding device of the present invention can extract the information from the encoded data. Accordingly, the decoding device of the present invention is not required to store in advance the information in order to carry out inverse-quantization based on a quantization parameter supplied from the encoding device of the present invention.

According to the encoding device of the present invention, it is preferable that the information extracted by the extraction means from the encoded data is a predetermined value, and the specifying means specifies the difference values by multiplying the integers generated by the integer generation means with the predetermined value extracted by the extraction means.

With the arrangement, the information included in the encoded data is a predetermined value. Accordingly, the decoding device of the present invention can save a storage region in which the information is stored in order to specify the difference value.

According to the encoding device of the present invention, it is preferable that the decoded image consists of a plurality of second unit regions, and each of the second unit regions consists of the unit regions, with respect to each of unit regions which are included in a plurality of unit regions constituting the decoded image as a whole and which are other than specific regions predetermined respectively for the second unit regions, the specifying means specifying a difference value for said each of unit regions from an integer for said each of unit regions according to the information, and with respect to the specific unit regions, the specifying means specifies the integers generated by the integer generation means themselves as difference values.

With the arrangement, the decoding device of the present invention specifies a difference value for each of the unit regions other than specific regions from an integer for said each of unit regions according to the information in which n integers and n difference values for quantization parameters are related to one by one. When the encoding device which supplies encoded data regards a region constituted by unit regions having similar image characteristics (i.e. it is appropriate to have similar quantization parameters) as a second unit region (e.g. enlarged macroblock) and reduces the number n of candidates for difference values to be determined for the unit regions other than specific regions, the decoding device of the present invention can save a storage region in which the information is to be stored.

Encoded data including the information in which n integers are related to n difference values regarding quantization parameters, respectively, is also encompassed in the scope of the present invention.

The encoding device of the present invention may be arranged such that the third unit region is a coding unit (CU) or a transform unit (TU).

Furthermore, the encoding device of the present invention may be arranged such that the third unit region is a CU, the unit regions are LCUs, and the encoding device further comprises second determination means for determining, in accordance with a predetermined standard, whether an image in each of the LCUs is to be quantized according to the value of the quantization parameter calculated by the calculation means, or an image in each of CUs constituting each of the LCUs is to be quantized according to the value of the quantization parameter of said each of CUs.

Also with the above arrangements, the encoding device of the present invention can reduce an amount of codes in a quantization parameter, compared with the conventional art.

It is desirable to arrange the encoding device of the present invention such that the third unit region is a CU, the encoding device further comprises judgment means for judging whether a prediction mode for a CU firstly selected by the selection means in each of a plurality of fourth unit regions constituting the unit region is an intra-prediction mode or not, and the calculation means calculates a value of the quantization parameter to be referred to when an image in each CU to be quantized in a fourth unit region for which the prediction mode is judged as an intra-prediction mode is quantized, the calculation being made based on a difference value of a quantization parameter of the CU firstly selected in the fourth unit region instead of the difference value of the quantization parameter determined by the determination means with respect to a unit region to which the fourth unit region belongs.

With the arrangement, when the prediction mode for a CU firstly selected in each fourth unit region is an intra-prediction mode, the encoding device of the present invention can quantize an image in the fourth unit region by using quantization parameters with different difference values between the fourth unit region and other fourth unit region in a unit region to which the fourth unit region belongs.

In other words, in the encoding device of the present invention, the number of difference values of quantization parameters to be outputted to a decoding device is relatively higher when the input image includes many CUs for which the prediction mode is an intra-prediction mode than when the input image includes many CUs for which the prediction mode is an inter-prediction mode.

It is known that when the input image includes many CUs for which the prediction mode is an intra-prediction mode, increasing quantization accuracy allows greatly reducing an amount of codes in encoded data compared with when the input image includes many CUs for which the prediction mode is an inter-prediction mode.

Therefore, the encoding device of the present invention can appropriately reduce an amount of codes in encoded data according to a ratio of a CU in the input image for which the prediction mode is an intra-prediction mode to a CU for which the prediction mode is an inter-prediction mode.

It is desirable to arrange the encoding device of the present invention so as to further include: judgment means for judging a slice type of each of a plurality of slices constituting the input image; and unit region setting means for setting sizes of unit regions constituting each of the plurality of slices to sizes according to the slice type judged by the judgment means.

With the arrangement, the encoding device of the present invention can reduce an amount of codes in encoded data by appropriately setting the size of a unit region to be quantized using quantization parameters with the same difference value, according to the slice type of a slice to which the unit region belongs.

It is desirable to arrange the encoding device of the present invention so as to further include: transform means for transforming the difference value determined by the determination means with respect to each unit region into a corresponding integer in accordance with a transform rule by which the difference value of the quantization parameter is related to an integer one by one so as to provide n sets of the difference value of the quantization parameter and the integer; and binary sequence generation means for generating a binary sequence having a length corresponding to a size of an absolute value of the integer obtained by transform by the transform means, a total of absolute values of n number of the integer being smaller than a total of absolute values of n number of the difference value.

With the arrangement, the encoding device of the present invention transforms the absolute values of integers transformed from difference values of quantization parameters into binary sequences. The total of absolute values of n number of the integer is smaller than the total of absolute values of n number of the difference value. Therefore, it is often that the total of the lengths of the binary sequences as a result of the above transform is statistically smaller than the total of the lengths of binary sequences to which absolute values of difference values of quantization parameters have been transformed.

Therefore, the encoding device of the present invention can reduce an amount of codes in a difference value of a quantization parameter.

Furthermore, the decoding device of the present invention may be arranged such that the third unit region is a coding unit (CU) or a transform unit (TU).

Furthermore, the decoding device of the present invention may be arranged such that the third unit region is a CU, the unit regions are LCUs, and the decoding device further comprises determination means for determining, in accordance with a predetermined standard, whether a quantization image in each of the LCUs is to be inverse-quantized according to the value of the quantization parameter specified by the specifying means, or a quantization image in each of CUs constituting each of the LCUs is to be inverse-quantized according to the value of the quantization parameter of said each of CUs.

Also with the above arrangements, the decoding device of the present invention can specify, with a smaller load, quantization parameters to be used in inverse-quantization.

It is desirable to arrange the decoding device of the present invention such that the third unit region is a CU, the encoding device further comprises judgment means for judging whether a prediction mode for a CU firstly selected by the selection means in each of a plurality of fourth unit regions constituting the unit region is an intra-prediction mode or not, and the specifying means specifies a value of the quantization parameter to be referred to when a quantization image in each CU to be inverse-quantized in a fourth unit region for which the prediction mode is judged as an intra-prediction mode is quantized, the specifying being made based on a difference value of a quantization parameter of the CU firstly selected in the fourth unit region instead of the difference value of the quantization parameter read out by the reading means with respect to a unit region to which the fourth unit region belongs.

With the arrangement, the encoding device of the present invention can generate a decoded image by decoding encoded data with a smaller amount of codes which is transmitted from the encoding device of the present invention including judgment means for judging whether a prediction mode for each CU is an intra-prediction mode or not.

It is desirable to arrange the decoding device of the present invention so as to further include: judgment means for judging a slice type of each of a plurality of slices constituting the input image; and unit region setting means for setting sizes of unit regions constituting each of the plurality of slices to sizes according to the slice type judged by the judgment means.

With the arrangement, the decoding device of the present invention can generate a decoded image by decoding encoded data transmitted from the encoding device of the present invention having similar judgment means.

It is desirable to arrange the decoding device of the present invention such that the reading means reads out, instead of the difference value of the quantization parameter, an integer corresponding to the difference value from the encoded data, the decoding device further comprises: transform means for transforming the integer read out by the reading means with respect to each unit region into a corresponding difference value in accordance with a transform rule by which the difference value of the quantization parameter is related to the integer one by one so as to provide n sets of the difference value of the quantization parameter and the integer; and the specifying means specifies a value of the quantization parameter to be referred to when inverse-quantizing a quantization image in each of the third unit regions to be inverse-quantized in each of the unit regions, the specifying being made based on the difference value of the quantization parameter obtained by the transform means transforming the integer read out by the reading means in the unit region, and a total of absolute values of n number of the integer is smaller than a total of absolute values of n number of the difference value.

With the arrangement, the decoding device of the present invention can generate a decoded image by decoding encoded data transmitted from the encoding device of the present invention having transform means for transforming a difference value of a quantization parameter into an integer by the transform rule.

INDUSTRIAL APPLICABILITY

The present invention is preferably applicable to an encoding device for encoding an image to generate encoded data, and to a decoding device for decoding encoded data generated by such an encoding device.

REFERENCE SIGNS LIST

1 Video decoding device (decoding device)
11 Variable-length code inverse-multiplexing section
12 Side information decoding section (extraction means, specifying means)
13 MB setting section (specifying means)
14 MB decoding section
15 Frame memory
2 Video encoding device (encoding device)
21 Side information determination section (setting means, transform means, calculation means)
22 Side information encoding section (binary sequence generation means)
23 MB setting section
24 MB encoding section
25 Variable-length code multiplexing section
26 MB decoding section
27 Frame memory
3 Video decoding device
31 Variable-length code inverse-multiplexing section
32 Side information decoding section (selection means, reading means)
33 CU setting section
34 CU decoding section (specifying means)
4 Video encoding device
41 Side information determination section (selection means, determination means)
42 Side information encoding section
43 CU setting section
44 CU encoding section (calculation means)
46 CU decoding section
7 Video decoding device
74 CU decoding section (judgment means)
8 Video encoding device
81 Side information determination section (determination means)
9 Video decoding device
92 Side information decoding section (determination means)
10 Video decoding device
101 Side information determination section (second determination means)
111 Video decoding device
1112 Side information decoding section (judgment means, unit region setting means)
112 Video encoding device
1121 Side information determination section (judgment means, unit region setting means)
113 Video decoding device
1133 CU setting section (reading means, transform means)
114 Video encoding device
1141 Side information determination section (transform means)
1142 Side information encoding section (binary sequence generation means)

The invention claimed is:

1. An image decoding device for decoding a coded data, the image decoding device comprising:
a side information decoding section that decodes a delta syntax in a picture parameter set, wherein the delta syntax specifies a difference between a minimum delta quant coding unit size and a LCU size and is used to derive the minimum delta quant coding unit size; and a CU decoding section that derives a quantization parameter using the minimum delta quant coding unit size and a QP delta value, which is a difference value between a quantization parameter of a coding unit and its prediction, wherein:

in a case that a value of a first variable is equal to a first value and a value of a data present flag specifying whether a QP delta syntax being present is equal to one, the side information decoding section is configured to decode the QP delta syntax;

in a case that the QP delta syntax is present, the side information decoding section sets the value of the first variable to a second value and derives the QP delta value using the QP delta syntax; and the delta syntax is a syntax coded using a variable codeword length coding.

2. An image encoding device for encoding an image data, the image encoding device comprising:

a side information encoding section that encodes a delta syntax in a picture parameter set, wherein the delta syntax specifies a difference between a minimum delta quant coding unit size and a LCU size and is used to derive the minimum delta quant coding unit size; and a CU encoding section that derives a quantization parameter using the minimum delta quant coding unit size and a QP delta value, which is a difference value between a quantization parameter of a coding unit and its prediction, wherein:

in a case that a value of a first variable is equal to a first value and a value of a data present flag specifying whether a QP delta syntax being present is equal to one, the side information encoding section is configured to encode the QP delta syntax;

in a case that the QP delta syntax is present, the side information encoding section sets the value of the first variable to a second value and derives the QP delta value using the QP delta syntax; and the delta syntax is coded using a variable codeword length coding.

3. An image decoding method for decoding a coded data, the image decoding method including:

decoding a delta syntax in a picture parameter set, wherein the delta syntax specifies a difference between a minimum delta quant coding unit size and a LCU size;

deriving the minimum delta quant coding unit size using the delta syntax;

deriving a quantization parameter using the minimum delta quant coding unit size and a QP delta value, which is a difference value between a quantization parameter of a coding unit and its prediction;

decoding a QP delta syntax, in a case that a value of a first variable is equal to a first value and a value of a data present flag specifying whether the QP delta syntax being present is equal to one; and setting the value of the first variable to a second value and deriving the QP delta value using the QP delta syntax, in a case that the QP delta syntax is present, wherein the delta syntax is a syntax coded using a variable codeword length coding.

* * * * *